United States Patent [19]
Johnston et al.

[11] Patent Number: 5,287,478
[45] Date of Patent: Feb. 15, 1994

[54] DIGITAL DATA TAPE STORAGE SYSTEM UTILIZING PLURALITY OF READ/WRITE HEADS WITH SYSTEM DIAGNOSTIC CAPABILITY

[75] Inventors: Ross W. Johnston, Santa Cruz; Theodore D. Rees, Mountain View; Edward J. Rhodes, San Jose, all of Calif.

[73] Assignee: R-Byte, Inc., San Jose, Calif.

[21] Appl. No.: 741,783

[22] Filed: Aug. 6, 1991

[51] Int. Cl.$^5$ .................. G06F 12/00; G06F 13/10; G11B 21/02
[52] U.S. Cl. ...................... 395/425; 360/75; 364/DIG. 1
[58] Field of Search ... 364/200 MS File, 900 MS File; 395/425

[56] References Cited

U.S. PATENT DOCUMENTS

| | | | |
|---|---|---|---|
| 3,828,271 | 8/1974 | Schwanauer | 331/1 A |
| 3,940,147 | 2/1976 | Hunt et al. | 395/575 |
| 4,020,282 | 4/1977 | Halpern | 375/34 |
| 4,255,807 | 3/1981 | Cosby | 371/21.1 |
| 4,395,741 | 7/1983 | Kobayuashi et al. | 360/77.16 |
| 4,467,421 | 8/1984 | White | 395/425 |
| 4,500,965 | 1/1985 | Gray | 364/400 |
| 4,723,181 | 2/1988 | Hickok | 360/72.2 |
| 4,833,549 | 5/1989 | Yoshimoto et al. | 360/19.1 |
| 4,847,716 | 7/1989 | Kemp | 360/128 |
| 4,918,523 | 4/1990 | Simon et al. | 358/133 |
| 4,928,185 | 5/1990 | Kobayashi et al. | 360/19.1 |
| 4,939,595 | 7/1990 | Yoshimoto et al. | 360/19.1 |
| 4,965,874 | 10/1990 | Yamazaki | 360/70 |
| 4,974,111 | 11/1990 | Platte et al. | 360/14.1 |
| 4,974,150 | 11/1990 | Long et al. | 395/575 |
| 5,006,819 | 4/1991 | Buchan et al. | 331/1 A |
| 5,008,764 | 4/1991 | Yoshida et al. | 360/77.15 |
| 5,012,352 | 4/1991 | Yoshimura et al. | 358/343 |
| 5,012,459 | 4/1991 | Odaka et al. | 360/32 |
| 5,057,950 | 10/1991 | Ozaki et al. | 360/72.2 |
| 5,068,757 | 11/1991 | Hughes et al. | 360/77.13 |
| 5,081,548 | 1/1992 | Inazawa et al. | 360/72.2 |
| 5,084,786 | 1/1992 | Konno et al. | 360/13 |
| 5,130,863 | 7/1992 | Yamashita et al. | 360/48 |

OTHER PUBLICATIONS

Flexible Magnetic Media For Digital Data Interchange Secretariat: U.S.A. (ANSI), pp. 1-85 Jun. 1990.

*Primary Examiner*—Joseph L. Dixon
*Assistant Examiner*—Mathew Kim
*Attorney, Agent, or Firm*—Lyon & Lyon

[57] ABSTRACT

A complete digital data storage magnetic tape system for utilization with a host unit comprising a host device, an interface for interfacing the host unit with the DDS system, a controller for encoding and decoding data to and from the magnetic tape, an automatic track follower for performing automatic track following on the magnetic tape, a driver for driving the magnetic tape, a read/write channel for channeling data thereto and therefrom, a read/write head drum for transferring data to and from the magnetic tape, the controller, the automatic track follower, the driver, the read/write channel, and the read/write head drum all being under software programmable control.

46 Claims, 54 Drawing Sheets

Microfiche Appendix Included
(23 Microfiche, 5 Pages)

NOTES
1. C1 IS ONLY CHECKED OVER MAIN DATA
2. IF C1 HAS ONLY ONE (1) ERROR THEN THAT ERROR WILL BE CORRECTED

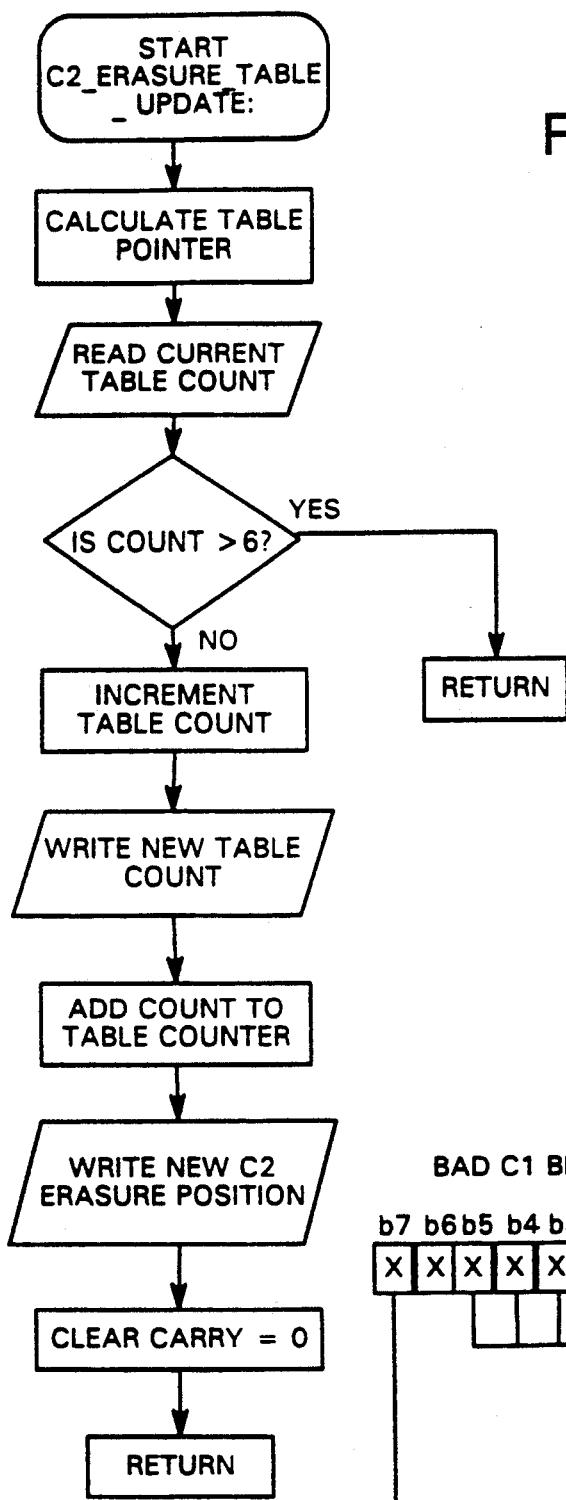
FIG. 12E
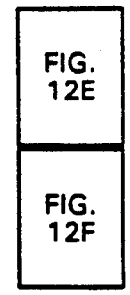
FIG. 12D
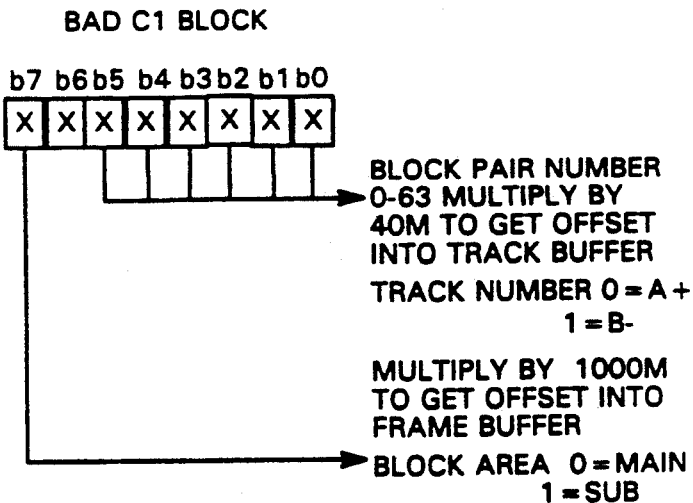

C2 POINTER TABLES*

| 0_1_EVEN | | 0_1_ODD | | 2_3_EVEN | | 2_3_ODD | |
|---|---|---|---|---|---|---|---|
| 0 | COUNT | 0 | COUNT | 0 | COUNT | 0 | COUNT |
| 1 | 0-31 | 1 | 0-31 | 1 | 0-31 | 1 | 0-31 |
| 2 | 0-31 | 2 | 0-31 | 2 | 0-31 | 2 | 0-31 |
| 3 | 0-31 | 3 | 0-31 | 3 | 0-31 | 3 | 0-31 |
| 4 | 0-31 | 4 | 0-31 | 4 | 0-31 | 4 | 0-31 |
| 5 | 0-31 | 5 | 0-31 | 5 | 0-31 | 5 | 0-31 |
| 6 | 0-31 | 6 | 0-31 | 6 | 0-31 | 6 | 0-31 |
| 7 | 0-31 | 7 | 0-31 | 7 | 0-31 | 7 | 0-31 |

* NOTES VALID TABLE VALUES ARE 0-3. C2 CAN ONLY COUNT UP TO 6 ERASURES. IF MORE THAN 6 ERASURES ARE FOUND, THE TRACK MUST EITHER BE RE-READ OR THIS TRACK CAN BE MARKED AS A C3 ERASURE TRACK.

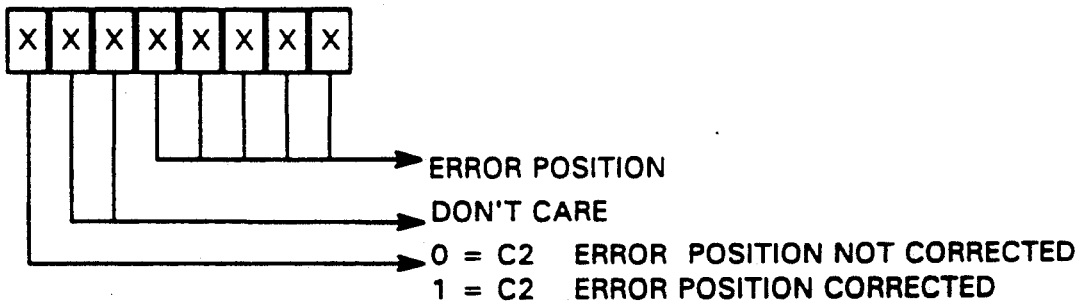

C2 ERASURE
- ERROR POSITION
- DON'T CARE
- 0 = C2 ERROR POSITION NOT CORRECTED
- 1 = C2 ERROR POSITION CORRECTED

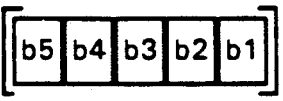

BAD C1 BLOCK NUMBER
C2 POSITION [b5 b4 b3 b2 b1]

BAD C1 BLOCK
C2 TABLE [b] WHERE 0 = 0_1 TABLES  1 = 2_3 TABLE AND CURRENT BAD C1 BLOCK PAIR POINTER b0 = 0 IS EVEN TABLES AND 1 IS ODD TABLES.

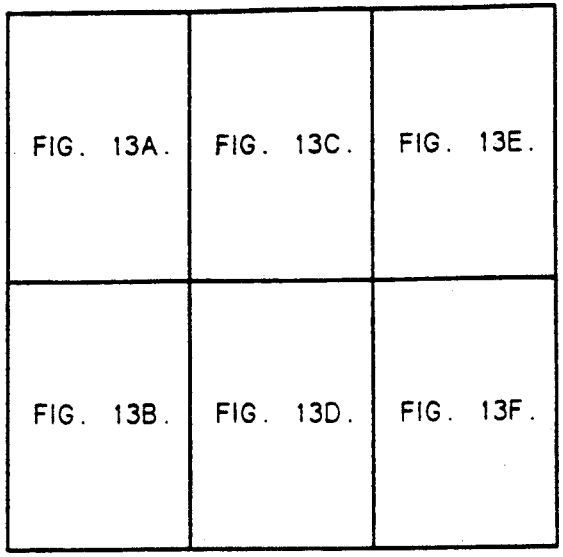

FIG. 13A.

PACK ITEM NO. 1
DATA AREA PARTITIONS 0/1

|     | MSB |   |   |   |   | LSB |
|-----|-----|---|---|---|---|-----|
| PC1 | 0 | 0 | 0 | 1 | 0 | N-POSITION |
| PC2 | GROUP COUNT (MSB) |||||| 
| PC3 | GROUP COUNT (LSB) |||||| 
| PC4 | FILEMARK COUNT (MSB) |||||| 
| PC5 | FILEMARK COUNT ... |||||| 
| PC6 | FILEMARK COUNT ... |||||| 
| PC7 | FILEMARK COUNT (LSB) |||||| 
| PC8 | PARITY ||||||

PACK ITEM NO. 2
DATA AREA PARTITIONS 0/1

|     | MSB |   |   |   |   | LSB |
|-----|-----|---|---|---|---|-----|
| PC1 | 0 | 0 | 1 | 0 | 0 | N-REPEATS |
| PC2 | SAVE-SET COUNT (MSB) |||||| 
| PC3 | SAVE-SET COUNT (LSB) |||||| 
| PC4 | RECORD COUNT (MSB) |||||| 
| PC5 | RECORD COUNT ... |||||| 
| PC6 | RECORD COUNT ... |||||| 
| PC7 | RECORD COUNT (LSB) |||||| 
| PC8 | PARITY ||||||

PACK ITEM NO. 3
DATA AREA PARTITIONS 0/1

|     | MSB |   |   |   | LSB |
|-----|-----|---|---|---|-----|
| PC1 | 0 | 0 | 1 | 1 | AREA-ID |
| PC2 | ABSOLUTE FRAME COUNT (MSB)(AFC) ||||| 
| PC3 | ABSOLUTE FRAME COUNT ... (AFC) ||||| 
| PC4 | ABSOLUTE FRAME COUNT (LSB)(AFC) ||||| 
| PC5 | TRACK 1 CHECKSUM (MSB) ||||| 
| PC6 | TRACK 1 CHECKSUM (LSB) ||||| 
| PC7 | LF-ID ||||| 
| PC8 | PARITY |||||

PACK ITEM NO. 3
SYSTEM AREA PARTITION 1

|     | MSB |   |   |   | LSB |
|-----|-----|---|---|---|-----|
| PC1 | 0 | 0 | 1 | 1 | AREA-ID |
| PC2 | ABSOLUTE FRAME COUNT (MSB)(AFC) ||||| 
| PC3 | ABSOLUTE FRAME COUNT ... (AFC) ||||| 
| PC4 | ABSOLUTE FRAME COUNT (LSB)(AFC) ||||| 
| PC5 | MAXIMUM ABSOLUTE FRAME COUNT (MSB) ||||| 
| PC6 | MAXIMUM ABSOLUTE FRAME COUNT ... ||||| 
| PC7 | MAXIMUM ABSOLUTE FRAME COUNT (LSB) ||||| 
| PC8 | PARITY |||||

PACK ITEM NO. 4
DATA AREA PARTITIONS 0/1

|     | MSB |   |   |   | LSB |
|-----|-----|---|---|---|-----|
| PC1 | 0   | 1 | 0 | 0 | AREA-ID |
| PC2 | ABSOLUTE FRAME COUNT (MSB)(AFC) ||||| 
| PC3 | ABSOLUTE FRAME COUNT ... (AFC) |||||
| PC4 | ABSOLUTE FRAME COUNT (LSB)(AFC) |||||
| PC5 | TRACK 2 CHECKSUM (MSB) |||||
| PC6 | TRACK 2 CHECKSUM (LSB) |||||
| PC7 | LF-ID |||||
| PC8 | PARITY |||||

PACK ITEM NO. 4
SYSTEM AREA PARTITION 1

|     | MSB |   |   |   | LSB |
|-----|-----|---|---|---|-----|
| PC1 | 0   | 1 | 0 | 0 | AREA-ID |
| PC2 | ABSOLUTE FRAME COUNT (MSB)(AFC) |||||
| PC3 | ABSOLUTE FRAME COUNT ... (AFC) |||||
| PC4 | ABSOLUTE FRAME COUNT (LSB)(AFC) |||||
| PC5 | MAXIMUM ABSOLUTE FRAME COUNT (MSB) |||||
| PC6 | MAXIMUM ABSOLUTE FRAME COUNT ... |||||
| PC7 | MAXIMUM ABSOLUTE FRAME COUNT (LSB) |||||
| PC8 | PARITY |||||

PACK ITEM NO. 5
SYSTEM LOG AREA
PARTITION 0
PARTITION 1

|     | MSB |   |   |   | LSB |
|-----|-----|---|---|---|-----|
| PC1 | 0   | 1 | 0 | 1 | P GROUPS WRITTEN |
| PC2 | PREVIOUS GROUPS WRITTEN (MSB+4) |||||
| PC3 | PREVIOUS GROUPS WRITTEN (LSB) |||||
| PC4 | PREVIOUS GROUPS WRITTEN (MSB) |||||
| PC5 | TOTAL GROUPS WRITTEN ... |||||
| PC6 | TOTAL GROUPS WRITTEN ... |||||
| PC7 | TOTAL GROUPS WRITTEN (LSB) |||||
| PC8 | PARITY |||||

PACK ITEM NO. 6
SYSTEM LOG AREA
PARTITION 0
PARTITION 1

|     | MSB |   |   |   | LSB |
|-----|-----|---|---|---|-----|
| PC1 | 0   | 1 | 0 | 1 | P GROUPS READ |
| PC2 | PREVIOUS GROUPS READ (MSB+4) |||||
| PC3 | PREVIOUS GROUPS READ (LSB) |||||
| PC4 | PREVIOUS GROUPS READ (MSB) |||||
| PC5 | TOTAL GROUPS READ ... |||||
| PC6 | TOTAL GROUPS READ ... |||||
| PC7 | TOTAL GROUPS READ (LSB) |||||
| PC8 | PARITY |||||

FIG. 13B.

PACK ITEM NO. 4
SYSTEM AREA PARTITION 0

|     | MSB | | | | | | | LSB |
| --- | --- | --- | --- | --- | --- | --- | --- | --- |
| PC1 | 0 | 1 | 0 | 0 | AREA-ID | | | |
| PC2 | ABSOLUTE FRAME COUNT (MSB)(AFC) | | | | | | | |
| PC3 | ABSOLUTE FRAME COUNT ... (AFC) | | | | | | | |
| PC4 | ABSOLUTE FRAME COUNT (LSB)(AFC) | | | | | | | |
| PC5 | 1 | 1 | 1 | 1 | 1 | 1 | 1 | 1 |
| PC6 | 1 | 1 | 1 | 1 | 1 | 1 | 1 | 1 |
| PC7 | 1 | 1 | 1 | 1 | 1 | 1 | 1 | 1 |
| PC8 | PARITY | | | | | | | |

PACK ITEM NO. 4
DEVICE, REFERENCE, AND EOD AREAS

|     | MSB | | | | | | | LSB |
| --- | --- | --- | --- | --- | --- | --- | --- | --- |
| PC1 | 0 | 1 | 0 | 0 | AREA-ID | | | |
| PC2 | ABSOLUTE FRAME COUNT (MSB)(AFC) | | | | | | | |
| PC3 | ABSOLUTE FRAME COUNT ... (AFC) | | | | | | | |
| PC4 | ABSOLUTE FRAME COUNT (LSB)(AFC) | | | | | | | |
| PC5 | 0 | 0 | 0 | 0 | 0 | 0 | 0 | 0 |
| PC6 | 0 | 0 | 0 | 0 | 0 | 0 | 0 | 0 |
| PC7 | 0 | 0 | 0 | 0 | 0 | 0 | 0 | 0 |
| PC8 | PARITY | | | | | | | |

PACK ITEM NO. 7
SYSTEM LOG AREA
PARTITION 0
PARTITION 1

|     | MSB | | | | | | | LSB |
| --- | --- | --- | --- | --- | --- | --- | --- | --- |
| PC1 | 0 | 1 | 0 | 1 | 0 | 0 | 0 | 0 |
| PC2 | TOTAL REPEATED FRAMES (MSB) | | | | | | | |
| PC3 | TOTAL REPEATED FRAMES ... | | | | | | | |
| PC4 | TOTAL REPEATED FRAMES (LSB) | | | | | | | |
| PC5 | TOTAL 3RD ECC RETRY COUNT (MSB) | | | | | | | |
| PC6 | TOTAL 3RD ECC RETRY COUNT ... | | | | | | | |
| PC7 | TOTAL 3RD ECC RETRY COUNT (LSB) | | | | | | | |
| PC8 | PARITY | | | | | | | |

PACK ITEM NO. 8
SYSTEM LOG AREA
PARTITION 1 OF A TWO PARTITION TAPE
PARTITION 0 OF A ONE PARTITION TAPE

|     | MSB | | | | | | | LSB |
| --- | --- | --- | --- | --- | --- | --- | --- | --- |
| PC1 | 0 | 1 | 0 | 1 | 0 | 0 | 0 | 0 |
| PC2 | LOAD COUNT (MSB) | | | | | | | |
| PC3 | LOAD COUNT (LSB) | | | | | | | |
| PC4 | PREVIOUS REPEATED FRAMES (MSB) | | | | | | | |
| PC5 | PREVIOUS REPEATED FRAMES (LSB) | | | | | | | |
| PC6 | PREVIOUS 3RD ECC RETRY COUNT (MSB) | | | | | | | |
| PC7 | PREVIOUS 3RD ECC RETRY COUNT (LSB) | | | | | | | |
| PC8 | PARITY | | | | | | | |

FIG. 13D.

AREA-ID                         FIG. 13E.
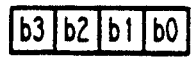
PARTITION 0
- 1001 = REFERENCE AREA
- 1010 = SYSTEM AREA
- 1100 = DATA AREA
- 1101 = END-OF-DATA AREA
PARTITION 0
- 0001 = REFERENCE AREA
- 0010 = SYSTEM AREA
- 0100 = DATA AREA
- 0101 = END-OF-DATA AREA
0000 = DEVICE AREA
ALL OTHERS = RESERVED
PACK BLOCKS
DATA AREAS
| PACK ITEM NO.1 | PACK ITEM NO.2 | PACK ITEM NO.3 | ALL 0s OR NO.3 OR NO.4 |
|---|---|---|---|
| PACK ITEM NO.1 | PACK ITEM NO.2 | PACK ITEM NO.3 | C1 PARITY |

REFERENCE AREAS EOD AREAS
AND PARTS OF THE SYSTEM AREAS

| PACK ITEM NO.3 | PACK ITEM NO.3 | PACK ITEM NO.3 | ALL 0s OR NO.3 OR NO.4 |
|---|---|---|---|
| PACK ITEM NO.4 | PACK ITEM NO.4 | PACK ITEM NO.4 | C1 PARITY |

SYSTEM LOG AREAS

| PACK ITEM NO.5 | PACK ITEM NO.7 | PACK ITEM NO.3 | ALL 0s OR NO.3 OR NO.4 |
|---|---|---|---|
| PACK ITEM NO.6 | PACK ITEM NO.8 | PACK ITEM NO.4 | C1 PARITY |

PACK ITEM NO. 8
SYSTEM LOG AREA
PARTITION 1 OF A TWO PARTITION TAPE

| | MSB | | | | | | | LSB |
|---|---|---|---|---|---|---|---|---|
| PC1 | 0 | 1 | 0 | 1 | 0 | 0 | 0 | 0 |
| PC2 | RESERVED |||||||||
| PC3 | RESERVED |||||||||
| PC4 | PREVIOUS REPEATED FRAMES (MSB) |||||||||
| PC5 | PREVIOUS REPEATED FRAMES (LSB) |||||||||
| PC6 | PREVIOUS 3RD ECC RETRY COUNT (MSB) |||||||||
| PC7 | PREVIOUS 3RD ECC RETRY COUNT (LSB) |||||||||
| PC8 | PARITY |||||||||

FIG. 13F.

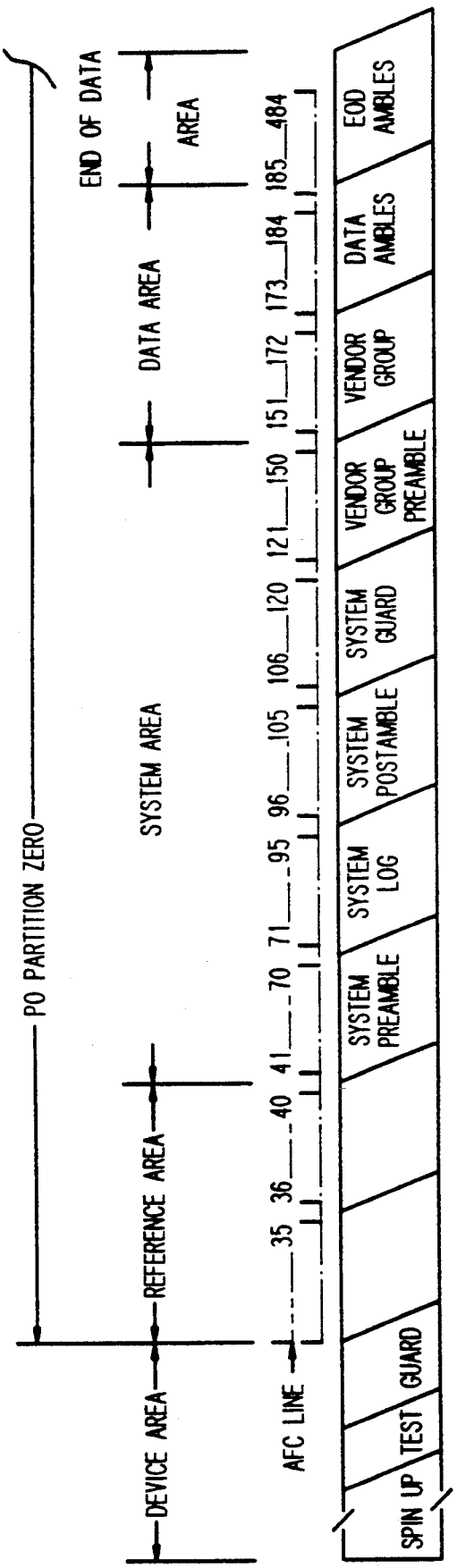
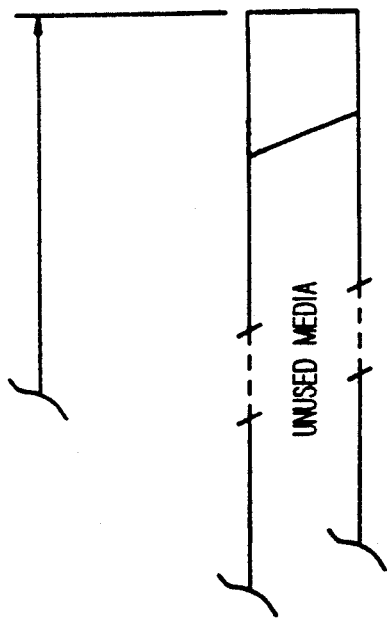
FIG. 14.

FIG. 15.

| FIG. 15A. |
|-----------|
| FIG. 15B. |

FIG. 15A.

DATA IN HEX ASCII

| BYTES | 0 | 1 | 2 | 3 | 4 | 5 | 6 | 7 | 8 | 9 | A | B | C | D | E | F | 10 | 11 | 12 | 13 | 14 | 15 | 16 | 17 | 18 | 19 | 1A | 1B | 1C | 1D | 1E | 1F | FIELD DESCRIPTION |
|---|---|---|---|---|---|---|---|---|---|---|---|---|---|---|---|---|---|---|---|---|---|---|---|---|---|---|---|---|---|---|---|---|---|
| 0 – | 52 | 2D | 42 | 59 | 54 | 45 | 2C | 20 | 49 | 6E | 63 | 2E | 2C | 20 | 53 | 61 | 6E | 20 | 4A | 6F | 73 | 65 | 2C | 20 | 43 | 61 | 6C | 69 | 66 | 6F | 72 | 6E | NAME OF MANUFACTURE (128 BYTES) |
|  | R | - | B | Y | T | E | , | | I | n | c | . | , | | S | a | n | | J | o | s | e | , | | C | a | l | i | f | o | r | n | |
| 20 | 69 | 61 | 2C | 20 | 55 | 53 | 41 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | |
|  | i | a | , | | U | S | A | | | | | | | | | | | | | | | | | | | | | | | | | 3F | |
| 40 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | ←5F |
| 60 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 7F |
| 128 – 159 | 52 | 42 | 31 | 39 | 39 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | MODEL NUMBER (32 BYTES) |
|  | R | B | 1 | 9 | 9 | | | | | | | | | | | | | | | | | | | | | | | | | | | 9F | |
| 160 – 191 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | SERIAL NUMBER (32 BYTES) |

(row header at 128: 80 81 82 83 83)

FIG. 15B.

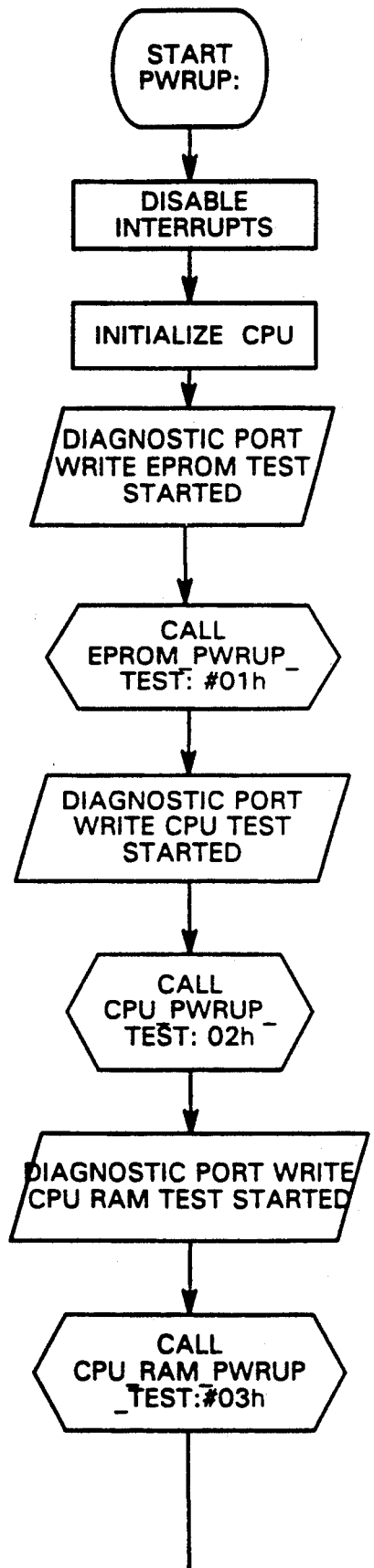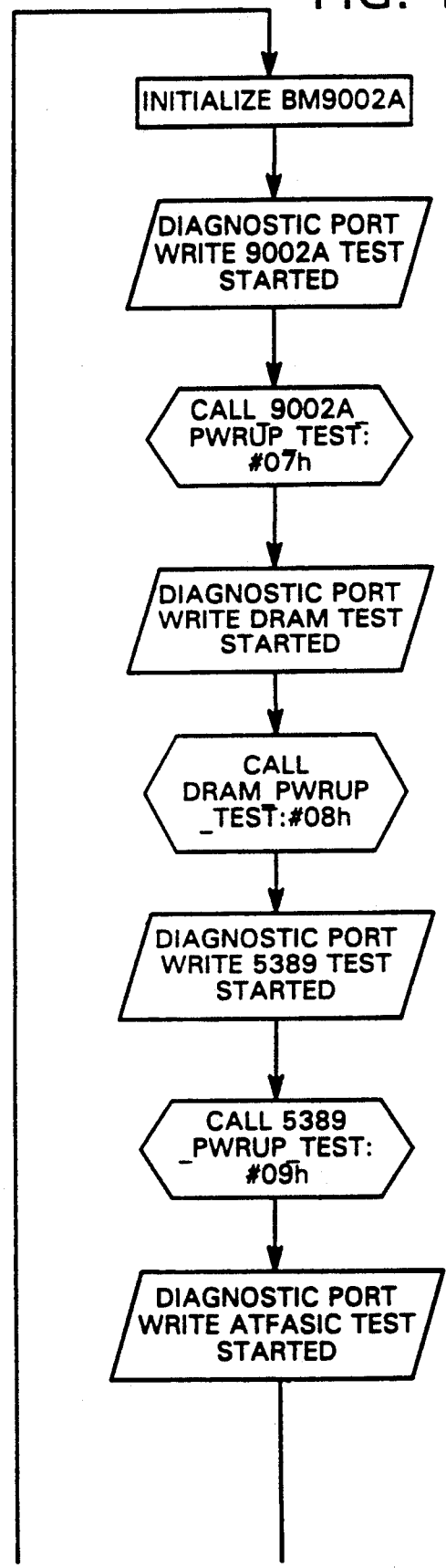
FIG. 18A

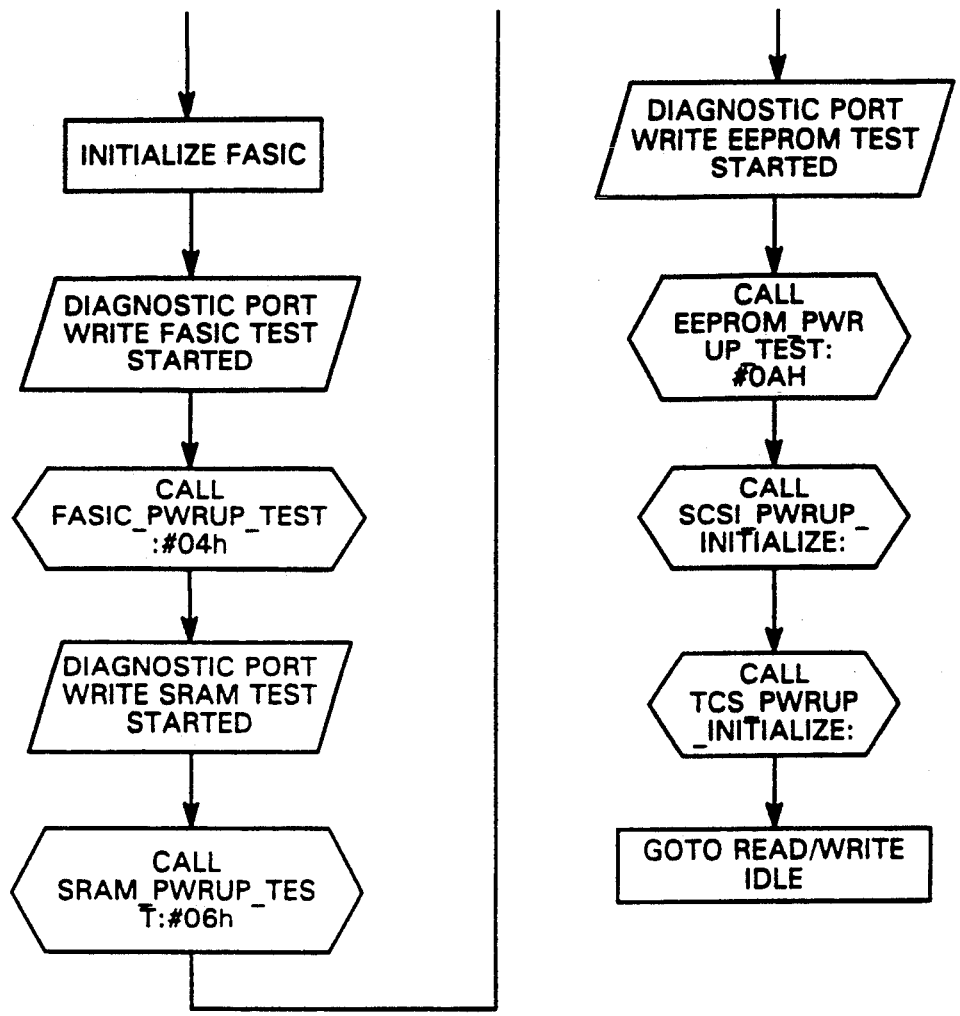
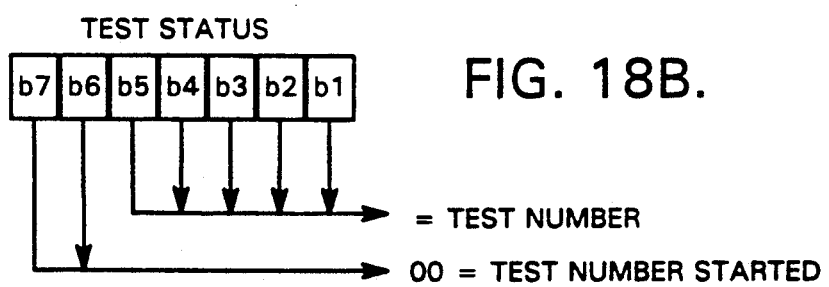
FIG. 18B.
= TEST NUMBER
00 = TEST NUMBER STARTED
01 = TEST FAILED
10 = TEST COMPLETED OK
11 = TEST FAILED AND THE NEXT BYTE IS THE COUNT OF ERROR STATUS BYTES COMING AFTER THIS BYTE
FIG. 18.
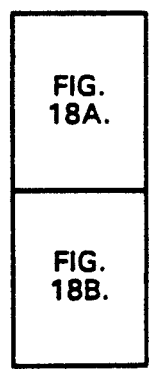

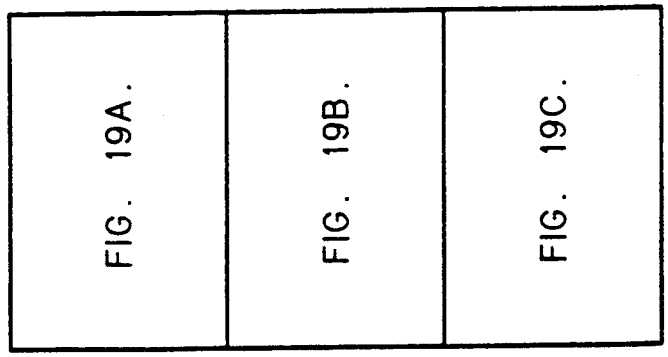

| WORD NUMBER | BIT POSITIONS bF bE bD bC bB bA b9 b8 b7 b6 b5 b4 b3 b2 b1 b0 | | |
|---|---|---|---|
| 00h | ** | SPARE | ** | W-PTR | MS 6 BITS |
| 01h | LSH NO. 1 POWER ON TIME |
| 02h | LSH NO. 2 POWER ON TIME |
| 03h | LSH NO. 3 POWER ON TIME |
| 04h | LSH NO. 4 POWER ON TIME |
| 05h | ** | SPARE | ** | W-PTR | MS 6 BITS |
| 06h | LSH NO. 1 HEAD LIFE TIME |
| 07h | LSH NO. 2 HEAD LIFE TIME |
| 08h | LSH NO. 3 HEAD LIFE TIME |
| 09h | LSH NO. 4 HEAD LIFE TIME |
| 0Ah | ** | SPARE | ** | W-PTR | MS 6 BITS |
| 0Bh | LSH NO. 1 NEW HEAD BECAME OPERATIONAL |
| 0Ah | ** | SPARE | ** | W-PTR | MS 6 BITS |
| 0Ch | NUMBER OF LOAD/UNLOAD CYCLES |
| 0Dh | ** | SPARE | ** | W-PTR | MS 6 BITS |

| | | |
|---|---|---|
| 0Fh | SCSI PARITY AND ID H | SCSI PARITY AND ID S |
| 10h | TENSION ARM SET POINT | |
| 11h | TEMPERATURE SET POINT | |
| 12h | HEAD DRUM INDEX OFFSET | |
| 13h | HUMIDITY SET POINT | |
| 14h | MANUFACTURING SYSYTEM TESTS PERFORMED | |
| 15h | DRIVE | |
| 16h | SERIAL NUMBER | |
| 17h | | |
| 18h | DRIVE REVISION NUMBER | |
| 19h | LAST CRITICAL ERROR | BEFORE LAST ERROR |
| 1Ah | ** SPARE ** | TIME FINAL TEST COMPLETE 0000 - 2359 |
| 1Bh | DATA FINAL_TEST COMPLETE | |
| | M M 00 - 12 | D D 00 - 31 | Y Y 00 - 99 |

SCSI PARITY AND ID H/S - SCSI PARITY 1 BIT, SCSI ID 3 BITS, H IS COPY OF JUMPERS AND S FRONT PANEL

TENSION ARM HALL SENSOR SET POINT - SET POINT FOR TENSION ARM HALL SENSOR

HEAD DRUM INDEX OFFSET - OFFSET FROM DRUM INDEX TO FIRST HEAD

TEMPERATURE SET POINT - TEMPERATURE SENSOR CALIBRATION SET POINT

HUMIDITY SET POINT - HUMIDITY SENSOR CALIBRATION SET POINT

FIG. 19B.

| Addr | Field |
|---|---|
| 1Ch | MANUFACTURING POWER ON TIME |
| 1Dh | NUMBER OF POWER ON CYCLES |
| 1Eh | MAXIMUM HUMIDITY |
| 1Fh | MAXIMUM TEMPERATURE |
| 20h | PARITY BITS FOR THE NEXT 36 BITS \| LOGICAL PTR |
| 21h | SAFETY NO. 0 BYTE 0 |
| 22h | SAFETY NO. 0 BYTE 1 |
| 23h | PARITY BITS FOR THE NEXT 36 BITS \| LOGICAL PTR |
| 24h | SAFETY NO. 1 BYTE 0 |
| 25h | SAFETY NO. 1 BYTE 1 |
| 26h | PARITY BITS FOR THE NEXT 36 BITS \| LOGICAL PTR |
| 27h | SAFETY NO. 2 BYTE 0 |
| 28h | SAFETY NO. 2 BYTE 1 |
| 29h | PARITY BITS FOR THE NEXT 36 BITS \| LOGICAL PTR |
| 2Ah | SAFETY NO. 3 BYTE 0 |
| 2Bh | SAFETY NO. 3 BYTE 1 |
| 2Ah | RESERVED FOR SERVO |
| 2Ch ... | CALIBRATION PARAMETERS |
| 7Eh | SPARE  ** |
| 7Fh | ** EEPROM CHECKSUM |

MAXIMUM TEMPERATURE – MAXIMUM TEMPERATURE DETECTED

PARITY BITS – PARITY TO DETECT FAILURE DURING UPDATE OF THE LOGICAL POINTER AND DATA BYTES

LOGICAL PTR – 0 TO 14 = LOGICAL FIELD UPDATED
15 = THIS UPDATE SPACE HAS EXPIRED

BYTE 0 – FIRST DATA BYTE TO BE UPDATED AT LOGICAL FIELD

BYTE 1 – SECOND DATA BYTE TO BE UPDATED AT LOGICAL FIELD

NOTE: THESE FIELDS EXPIRE WHEN THE POWER ON FIELDS EXPIRE

FIG. 19C.

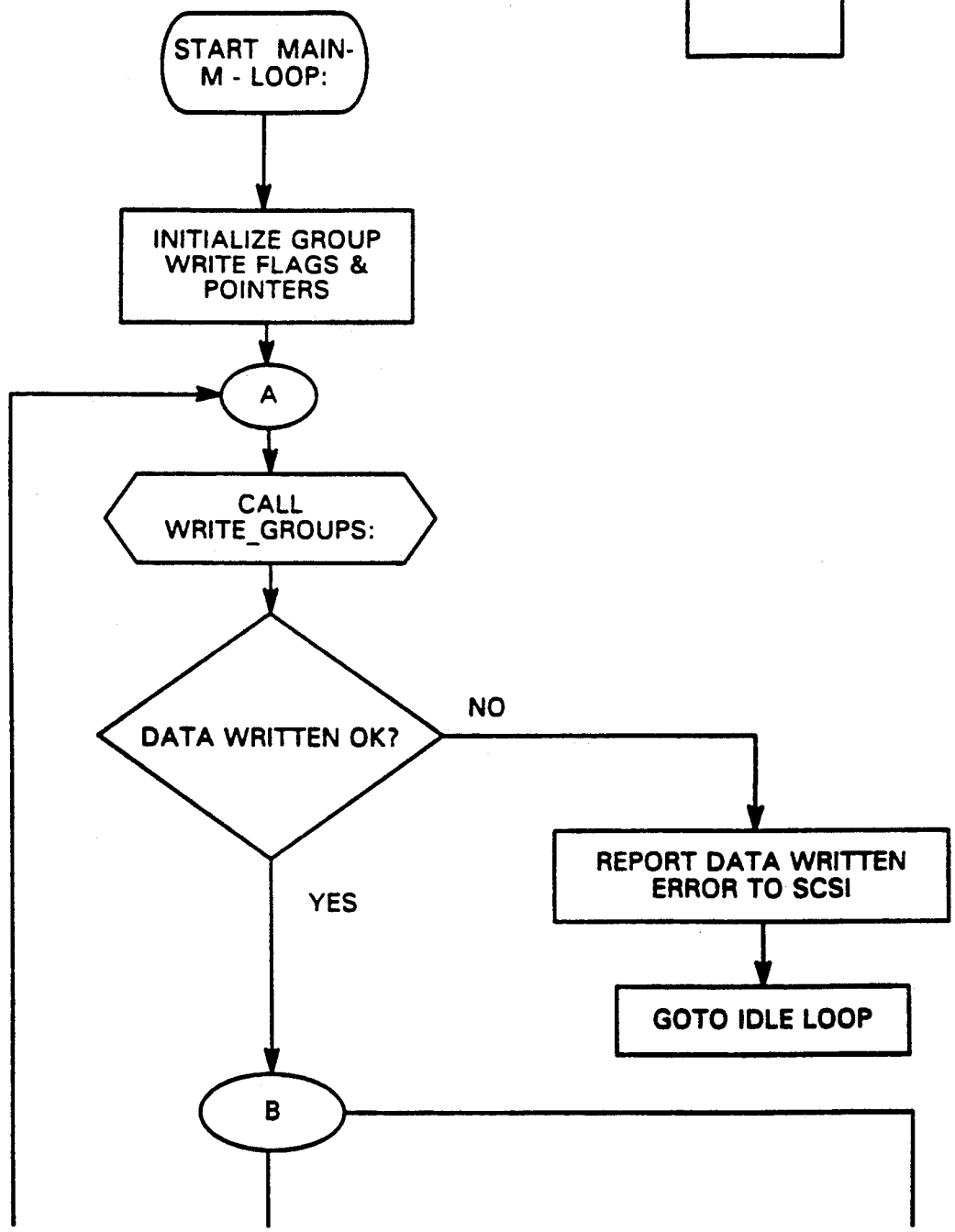

FIG. 24B.

SEAM POINT BEFORE (GROUP (0 + 1) READ INTO DRAM)

| GROUP (0 + 0) LF - ID 07h N + 3 | GROUP (0 + 1) LF - ID 01h N + 4 | GROUP (0 + 0) LF - ID 07h N + 5 | GROUP (0 + 1) LF - ID 01h N + 6 | GROUP (0 + 1) LF - ID 02h N + 7 | GROUP (0 + 1) LF - ID 03h N + 8 |

SEAM POINT AFTER

| GROUP (0 + 0) LF - ID 07h N + 3 | GROUP (0 + 1) LF - ID 01h N + 4 | GROUP (0 + 0) LF - ID 07h N + 5 | GROUP (0 + 1) LF - ID 01h N + 6 | AMBLE (0 + 0) LF - ID 00h N + 7 | AMBLE (0 + 0) LF - ID 00h N + 8 |

READ

| GROUP (0 + 0) LF - ID 07h N + 5 | GROUP (0 + 1) LF - ID 01h N + 6 | AMBLE LF - ID 00h N + 7 | AMBLE LF - ID 00h N + 8 |

WRITE

| AMBLE (0 + 0) LF - ID 00h N + 7 | AMBLE (0 + 0) LF - ID 00h N + 8 |

WRITE

| AMBLE (0 + 0) LF - ID 00h N + 8 | GROUP (0 + 1) LF - ID 01h N + 9 |

| SRAM BUFFERS | | |
|---|---|---|
| 0 | 1 | 2 |
| H + 7 | H + 8 | H + 9 |
| H + 10 | H + 11 | H + 12 |

FIG. 24H.

DIGITAL DATA TAPE STORAGE SYSTEM UTILIZING PLURALITY OF READ/WRITE HEADS WITH SYSTEM DIAGNOSTIC CAPABILITY

Reference is made to a microfiche appendix A comprising twenty-two frames of electronic schematic drawings including gate logic diagrams showing an embodiment of this invention.

FIELD OF THE INVENTION

The present invention relates generally to the field of tape storage devices and more particularly to a magnetic tape system for the storage of digital data on audio tape.

BACKGROUND OF THE INVENTION

Magnetic tape is an inexpensive and compact media for data storage, particularly useful for the storage of large volumes of data and the sequential processing thereof. Standardization has rendered magnetic tape very useful for data exchange.

Writing on magnetic tape involves producing magnetic flux reversals of a ferromagnetic material to denote binary states, usually on multiple tracks with gaps disposed between records or blocks for searching and reading. An electromechanical drive moves the tape past a read/write head in two directions under control instructions. A typical digital audio tape (DAT) recorder has magnetic tape wound on a supply reel, transported over a read/write head having a cylindrical surface contour to a take-up reel supplying torque to move the tape. The tape is threaded through and driven by a motorized capstan and pinch roller disposed downstream of the head. Tape tension is provided by spring-loaded arms disposed upstream of the head. A transducer is typically disposed between the head and the capstan to sense and control tape tension.

There are many different types of information coding used in the prior art, varying according to polarities (return to zero or not during a transition), bit train compression, and clocking capability. The most common coding schemes for high-performance tapes are non-return-to-zero-inverted (NRZI), phase encoding (PE), and group coded recording (GCR) which is a combination of NRZI and PE. A code is self-clocking if a signal pulse is generated for every stored bit.

Characters are recorded on tape by tracks with each character stored in a column across the tape with embedded parity bits for error checking. Typically, each track has one write head and usually one read head. To limit errors, information written on tape is often read immediately after being written (so-called read-after-write or RAW) by a separate read head mounted closely to the write head. On a typical tape there is a stored addressing information (SAI) section for locating a record and a data section which may also provide additional addressing information. The SAI typically includes (in sequence) a postamble immediately adjacent the previous data record, an interrecord gap (IRG) providing a space interval for tape motion changes, beginning and end of tape characters, various other markers, clocking and deskewing information, and a preamble immediately adjacent the next data record. The preamble utilizes sync marks to synchronize detection circuits for distinguishing bits. The postamble signals the end of a data record or block. To save space and access time, IRGs may be placed between blocks (IBGs) rather than records and related blocks may be grouped into a file and designated by an end of file marker. "Load point" and an "end of reel" markers indicate the beginning and end of the tape respectively and are typically reflective for detection by a photocell in the tape drive unit.

A standard format for digital data storage (DDS) using 3.81 mm digital audio tape (DAT) magnetic tape is set forth by the European Computer Manufacturers Association in the document "Flexible Magnetic Media for Digital Data Interchange" (ISO/IEC JTC 1/SC 11 N 1026, hereinafter "DDS standard", 1990-07-13).

Briefly, DDS format data has two types of separator marks indicating logical separations of the data. Separator 1 is a "file mark" and separator 2 is a "set mark". User data, separator marks, and associated information are formed into groups occupying groups of tracks in a "main zone" of the track. Additional information about the contents of the group, the location of the tracks and the contents of the tracks is recorded in two parts of each track called "sub zones". The two sub zones constitute the "sub data" area of the track. In addition, there are margin zones at the extreme ends of the tape and Automatic Track Finding (ATF) zones between the sub zones and the main zone. Each zone in a track is further segmented into blocks called margin blocks (in the margin zone), preamble, sub data, and postamble blocks (in the sub zones), spacer and ATF blocks (in the ATF zone), and preamble and main data blocks (in the main zone). A "frame" is a pair of adjacent tracks with azimuths of opposite polarity (where the azimuth is the angle between the mean flux transition line with a line normal to the centerline of the track). Data to be recorded is grouped into "basic groups" of 126632 bytes. Each basic group is identified by a running number from 1 to 65535. Data and separator marks are grouped into the basic groups starting with basic group no. 1. Error Correction Codes (ECC), termed C1 and C2, are computed bytes added into the data fields. ECC C3 is one extra frame added to the 22 frame groups and is capable of correcting any two tracks in a group which are bad.

Write data channel functions, including coding and error correction code, are typically performed by a controller operating through a write amplifier positioned near the write head. The write amplifier drives the write current through the write head.

Read data channel functions, including amplification and equalization of the read signals and data retrieval, are typically performed by automatic track-oriented gain-adjustment by a read amplifier and timing, deskewing, decoding, error detection and correction by a controller. The fundamental function of readback is to accurately convert the amplified read signal waveform into its binary equivalent. During writing, an external clock (oscillator) spaces recorded bits. An accurate readback therefore must be synchronous, and a code which inherently strobes the readback signal is desirable, such as self-clocking pulse generation in PE and GCR. One form of coding used in digital data audio tape storage is so-called 8–10 conversion GCR.

Video recorders and some audio cartridges utilize a rotating head for read and write. A typical rotating head-helical scan head is embedded between stationary upper and lower mandrels with the tape helically wrapped around the mandrels. The tape moves at a lower angular velocity than the rotating head to produce helically-written data of very high spatial density because of close track spacing. Addressing the closely-spaced tracks then requires accurate control of the linear positions of the tape around the head unit. By pressurizing the mandrels the tape is hydrostatically supported over the head by an air film at higher tape speeds. Tape speeds may be as high as 40 m/s in rotating head-helical scan systems. At such high data densities and tape speeds, accurate sensing requires precise head and tape speeds control and tape tracking control.

Digital audio tape (DAT) provides flexible, high performance storage applicable to a wide variety of tasks. However, prior art DAT drives are primarily designed for audio systems and thus do not provide the required performance, reliability, error correction, or diagnostics necessary for computer data storage. Prior art DAT systems for computer storage typically use audio mechanisms and electronics with adapter chips to operate with the computer. Computer peripheral application of tape drives requires many more start/stop and high-speed search operations than audio tape drives, which were designed primarily for the continuous play of music or voice. Because of the more strenuous and more stringent requirements of computer data storage, such prior art systems do not provide the required performance and are not sufficiently reliable for such use.

SUMMARY OF THE INVENTION

Accordingly, the present invention provides a complete digital data storage (DDS) magnetic tape system for utilization with a host unit. The invention comprises a host device interface for interfacing the host unit with the DDS system, a controller/formatter for encoding and decoding data from and to the magnetic tape, an automatic track follower (ATF) for performing automatic track following on the magnetic tape, a driver for driving the magnetic tape, a read/write (R/W) channel for channeling data thereto and therefrom, a read/write (R/W) head drum for transferring data to and from the magnetic tape, and the controller/formatter, the ATF, the driver, the R/W channel, and the R/W head drum all being under software programmable control.

The preferred embodiment of the present invention includes the following features: (1) use of American National Standard, helical-scan digital computer tape cartridge, 3.81 mm, digital data storage (DDS) recorded format, (2) read-after-write (RAW), (3) one intervening frame in RAW, (4) C1 ECC single error correction on the fly, (5) C2 ECC single error correction on the fly, (6) C3 ECC parity generation, (7) C3 ECC syndrome generation and error correction, (8) seamless append, (9) filling of partially full groups during append, (10) buffering of two or more data groups, (11) buffering of three data frames, (12) assembly language programming, (13) built-in diagnostics capability.

The present invention achieves these functions utilizing programmable software processor-embedded as firmware to achieve high-quality performance, reliability, and ease of manufacture. The read/write channel utilizes integrated circuits typically used for Winchester disks, resulting in better noise margins and lower costs. Manual electrical adjustments have been eliminated either by the operation of the components or by self-calibrations.

A high-density rotating drum with four read/write heads is employed with a seamless append write/read system. The use of a single microprocessor reduces the number of parts required, the electronic complexity, physical volume, and costs. The microcontroller used in the preferred embodiment does not need a dedicated RAM, but rather uses internal memory and part of the frame buffer for a scratchpad. A high speed serial expansion bus assures rapid data transfer and reduces the load on other connections.

A further understanding of the nature and advantages of the present invention may be realized by reference to the Detailed Description of the Invention and the attached drawings.

BRIEF DESCRIPTION OF THE DRAWINGS

FIGS. 12, 12a, 12b, 12c, 12d, 12e, and 12f are a flowchart of the C1 ECC main subroutine according to the present invention.

FIGS. 13, 13a, 13b, 13c, 13d, 13e, and 13f are a chart showing the DDS pack items organization according to the present invention.

FIG. 14 is a chart illustrating a DDS format 1 partition tape according to the present invention.

FIGS. 15, 15a, and 15b are a chart showing the vendor group layout according to the present invention.

FIGS. 18, 18a, and 18b are for a flowchart of the power-up sequence according to the present invention.

FIGS. 19, 19a, 19b, and 19c show the EEPROM memory map according to the present invention.

FIGS. 21, 21a, and 21b are a flowchart of the main write loop according to the present invention.

FIGS. 24, 24a, 24b, 24c, 24d, 24e, 24f, 24g, 24h, 24i, and 24j shows the detailed timing sequence according to the present invention.

DETAILED DESCRIPTION OF THE INVENTION

Figure 1:
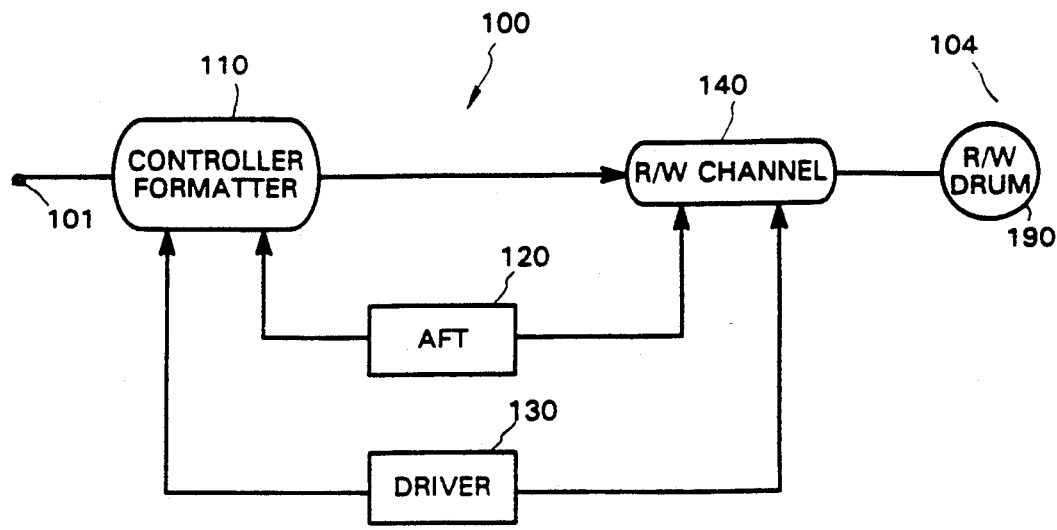
FIG. 1 is a schematic block diagram of a Digital Data Storage/Digital Audio Tape (DDS/DAT) system according to the present invention.

FIG. 1 is a schematic block diagram of the Digital Data Storage/Digital Audio Tape (DDS/DAT) system 100 of the present invention. A host unit (for example a computer, but it could be any device requiring data storage) is coupled at 101 to controller/formatter 110 which is coupled to an automatic track follower (ATF) 120. ATF 120 is coupled to a driver 130 which includes the motors, sensors, and encoders for the tape drive functions. ATF 120 is further coupled to a read/write (R/W) channel 140 which in turn is coupled to a read/write (R/W) head drum 190. R/W head drum 190 is in electronic communication with a magnetic tape 104. Each component shown in FIG. 1 will be described in increasing levels of detail in the following.

In operation, data to be stored in system 100 or communicated to a host unit from system 100 are written on or read from a magnetic tape in communication with R/W head drum 190. System 100 produces fast and accurate write/read operations on large amounts of data by means of software/firmware-controlled direct-drive motors in driver 130 which precisely control tape motion, speed, and tension through R/W head drum 190 served by R/W channel 140, ATF 120, and controller/formatter 110.

Briefly, a host unit formats data according to its own application program. The data is translated into DDS format by read/write software of the present invention, which is transparent to the host unit. During writing of the data, data integrity is provided by (a) user-selectable C3 ECC parity generation, (b) C2 ECC parity generation, C1 ECC parity generation, track checksums, and C1 ECC parity generation of every tack of user data written with frame rewrite if necessary. During reading of the data, all of the ECC information can be used to recover data reliably. Data is streamed (written to tape without physically stopping) from host to tape as long as the host provides data at an acceptable rate.

User data goes through three stages of formatting: SCSI interface, DDS groups, and DDS/DAT frames.

Figure 2:
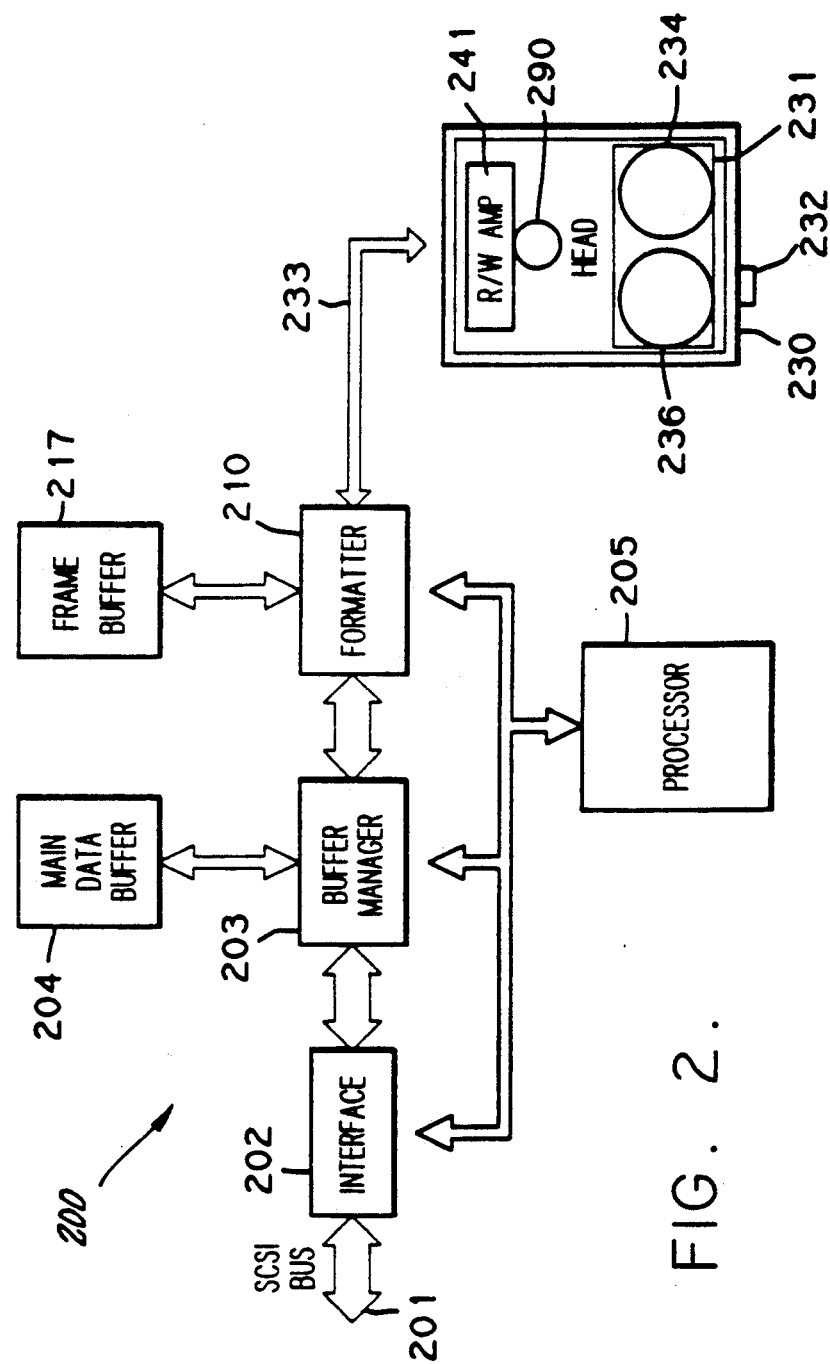
FIG. 2 is a schematic block diagram of a software data and control flow system according to the preferred embodiment of the present invention.

FIG. 2 is a schematic block diagram of a software data and control flow system 200 according to the preferred embodiment of the present invention. User data from a host unit (not shown) at 201 communicates with system 200 through interface 202. Data is routed through a buffer manager 203 into a main buffer 204 and converted into the DDS group format. When a group is ready to be written to tape, the group is segmented into DDS frames and transferred from main buffer 204 to a frame buffer 217 through a formatter 210. Formatted data is then communicated to driver 230 over high-speed serial data bus 233. Bus 233 is coupled to a R/W amp 241 connected to a R/W head drum 290. A driver 230 includes a tape cassette 231 having a supply reel 234 and a take-up reel 236 to hold the tape. An eject button 232 ejects cassette 231. The above sequence is reversed for data being read from tape in cassette 231 in driver 230. Control is exercised over the system by a processor 205.

Figure 3:
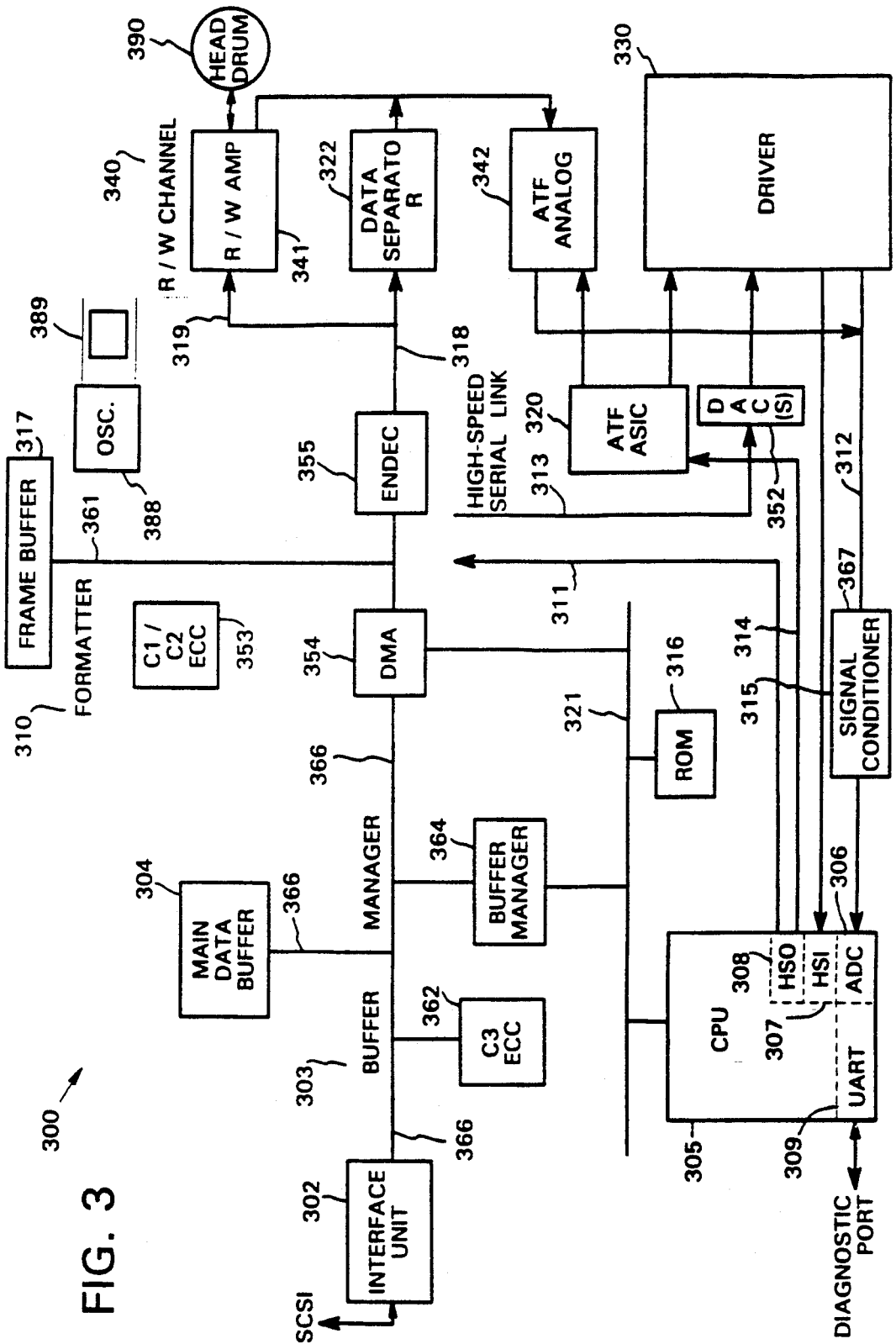
FIG. 3 is a schematic block diagram of the preferred embodiment of a DDS/DAT system according to the present invention.

FIG. 3 is a schematic block diagram of the preferred embodiment of DDS/DAT system 300. An interface unit 302 is for communication with a host unit (not shown), and is coupled to a buffer manager 303 which in turn is coupled to a main buffer 304 (which is a DRAM in the preferred embodiment) and to a microcontroller 305 via bus 321. Microcontroller 305 is coupled to driver 130 via line 312 through an analog-to-digital converter (ADC) 306 and through a high-speed input (HSI) 307 through bus 315. Microcontroller 305 is further coupled to an automatic track follower (ATF) 320 through a high-speed output (HSO) 308 via bus 314, and to a formatter 310 via bus 311. Formatter 310 is coupled to a frame buffer 317. Microcontroller 305 is further coupled to formatter 310 via bus 321 and has a diagnostic port 309.

Microcontroller 305 is further coupled to a read-only memory (ROM) 316 via bus 321. A data separator 322 is coupled to formatter 310 via bus 318. Formatter 310 is also coupled to driver 330 through digital-to-analog converter(s) 352 and to ATF 320 through a high-speed serial expansion bus 313. Formatter 310 is further coupled to a R/W amp 341 which is coupled to bus 318 between formatter 310 and data separator 322 via bus 319.

ATF 320 is further coupled to microcontroller 305, driver 330, and to an ATF analog channel 342. ATF analog channel 342 is also coupled to bus 312 which connects driver 330 and microcontroller 305. Finally, R/W amp 341 is coupled to a R/W head drum 390. R/W amp 341, data separator 322, and ATF analog channel constitute R/W channel 340.

In operation, microcontroller 305, formatter 310, and ATF 320 provide digital servo-control for system 300 to move data and control tape transport. In an embodiment of the present invention, a single microprocessor implements the controller, formatter, and ATF functions. This microprocessor controls all system 300 functions for data movement, tape transport, host interface communications, error correction, and diagnostics. The implementation of the functions by a single microprocessor has the advantage of reducing the number of parts required, the electronic complexity, and costs.

Preferred embodiments of the formatter, the ATF, the driver servo-control systems, head drum calibration, capstan motor commutation, and beginning/end-of-tape systems are described in detail in related patent applications Ser. Nos. 07/740,755, 07/741,088, 07/741,089, 07/740,791, 07/741,787, 07/740,800, respectively and are hereby incorporated by reference.

In an embodiment of the present invention, formatter 310, and ATF 320 are all application specific integrated circuits (ASIC).

In an embodiment of the present invention, microcontroller 305 includes a large internal memory and utilizes part of the frame buffer as a scratchpad RAM. This eliminates the prior art requirement of a dedicated RAM for control functions.

The implementation of high-speed serial expansion bus 313 between formatter 310 and ATF 320 and driver 330 allows very short and lightly loaded buses 313 and 321.

Formatter 310 includes a C1/C2 error correction code (ECC) unit 353, a direct memory access (DMA) unit 354, and an encode/decode (ENDEC) unit 355. C1/C2 ECC unit 353, DMA unit 354, and ENDEC 355 are coupled to each other and to frame buffer 317 via high-speed parallel bus 361. ENDEC 355 is coupled to bus 318. Microcontroller 305 is coupled to DMA 354 of formatter 310 by bus 321.

Buffer manager 303 includes a C3 ECC unit 362. The connections of buffer manager 303 are shown as a buffer manager sub unit 364 which is coupled to bus 366 which also couples interface 302 to DMA 354 and main buffer 304.

An analog signal conditioner 367 is coupled between driver 330 and ADC input 306 of processor 305 to condition the analog signals from driver 330.

In the preferred embodiment, formatter 310 serially interfaces R/W channel 340 through ENDEC 355 via bus 318. Main buffer 304 and buffer manager 303 are parallel interfaced via bus 366 to DMA 354. Microcontroller 305 is parallel interfaced through bus 321 by high-speed memory mapped control interface. Frame buffer 317 is parallel interfaced through bus 361. Internal data path via bus 361 links DMA 354 to main buffer 304 and frame buffer 317. Microcontroller 305 is interfaced directly to formatter 310 internal registers (not shown) and there is arbitrated access from microcontroller 305 to frame buffer 317. A serial to parallel path from read channel 340 to frame buffer 317 is achieved via bus 318 from R/W amp 341 to bus 361 (through ENDEC 355) and thence to frame buffer 317. A parallel to serial path from frame buffer 317 to write channel 340 is achieved via bus 361 to bus 318 to R/W amp 341. Finally high-speed parallel bus 361 links frame buffer 317 through C1/C2 ECC unit 354 and back to frame buffer 317. For diagnostic convenience, all data paths include loop back capability.

Figure 4:
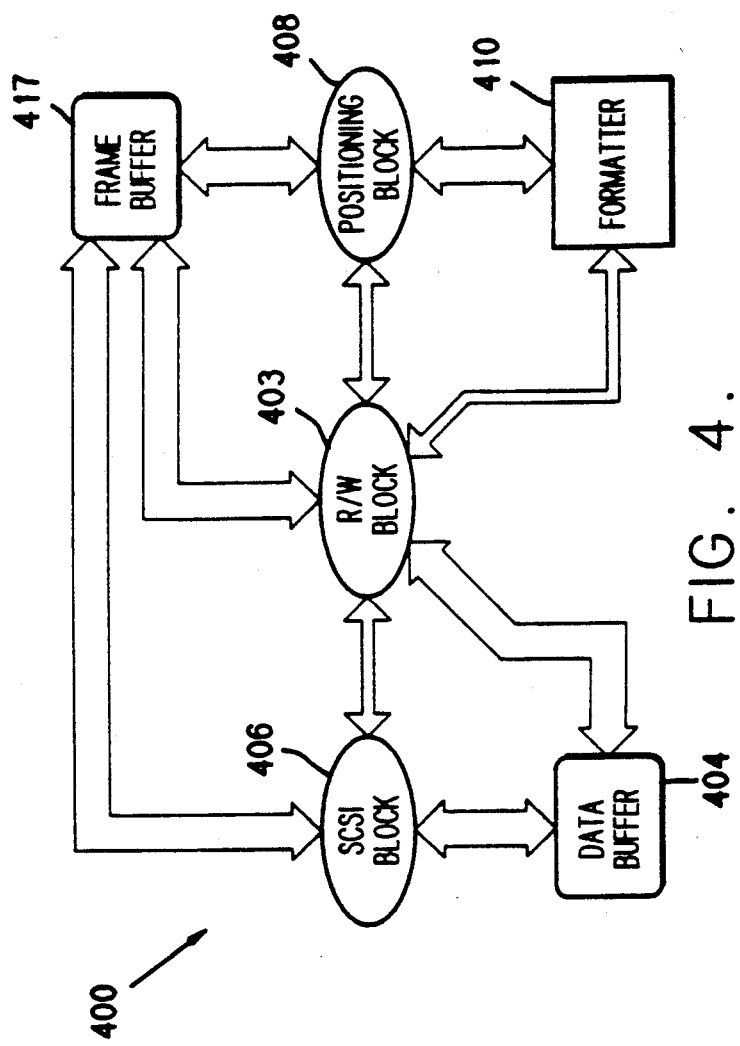
FIG. 4 is the preferred embodiment of a data flow system according to the present invention.

FIG. 4 is the preferred embodiment of a data flow system 400 according to this invention. Read/write (R/W) software block 403 10 communicates with an interface software block 406 (for example, a SCSI) and positioning block 408 software through subroutine calls, variable passing, and global variables. As described above, data is transferred and formatted from a data buffer 404 to a frame buffer 417 under the control and formatting of a formatter 410.

There are two types of protocol for subroutine calls. The first is where a call to a subroutine modifies the state of a particular variable or returns the current status of that variable. The second is where a call to a subroutine causes an action to take place. In both types of calls, parameters are passed in either register set or through global variables, but never on the stack. Calls also return status when appropriate. This status is in the form of "OK" if carry is 0 and "ERROR" if carry is 1 and an error code can be returned in register 0. Global variables are always available for reading. Changing of global variables can be done by the same software block only, or one software block can set the global variable only and another software block can reset the global variable only.

Read/write block 403 is in one of four states: format, read, write, or idle, with block states as shown in Table I. Four types of stimuli causes read/write block 403 to take an action: external, SCSI, position, and formatter. Any combination of stimuli can be occurring. Read/write block 403 prioritizes the stimuli and takes the proper action.

External stimuli are initiated by a user, causing an interrupt to processor 205 (of FIG. 2). In one embodiment of the present invention, there are only two types of external stimuli: cassette tape insertion and eject button pushed. When a user inserts a cassette 231 (FIG. 2), an external interrupt notifies processor 205 that a cassette has been loaded. The cassette is guided to engage reel motors (not shown) and the tape is pulled out, threaded, and tensioned. Beginning of media is found and tape length calculated. At this point, the tape is checked for data. If the tape is found to have data, a system area 1 of partition 0 is read into global frame buffer 417 space. If data is not found, a blank tape flag is set. When a user pushes an eject button 232, an external interrupt is generated notifying processor 205 that a cassette tape eject is being requested. There are several different embodiments of the software of the present invention depending on user interfaces, including: SCSI remove media denied flag set (eject pushed—abort current command; eject pushed—do nothing) and SCSI removed media denied flag clear (eject pushed—abort current command and execute eject sequenced; eject pushed—wait for current command to complete, then execute eject sequence). Before cassette tape 231 is ejected, if an end of data (EOD) space has not been written since the last data area write, then the EOD will be written. Next, the current partition's system log is updated (a continuous write of the system preamble (30 frames in this embodiment), system (25 frames), and system postamble (10 frames)). If the current partition is not the first partition, then the first partition's system log must also be updated. The tape must then be rewound to the beginning of media (BOM) before cassette tape 231 can be ejected.

SCSI STIMULI

SCSI 406 requests three types of motion states: position tape, write data, and read data. All SCSI stimuli is either by flag bits or subroutine calls.

Status

When SCSI 406 requests status from read/write block 403, the data is made available in a global memory area. This allows SCSI block 406 to access and format the data at its convenience. This also keeps interface 302 (FIG. 3) separated from read/write block 403. Table II shows the status memory data structure.

Position

SCSI 406 requests two different types of positioning. Space is a request to position relative to the current position of the tape. Locate is a request to position to an absolute position on the tape. The space position request is relative to the current position with a 24 bit 2's complement number. The locate position request is an absolute 24 bit number and is from the start of the partition in the request. When SCSI 406 requests a positioning of the tape from read/write block 403, three position possibilities can occur: first, the tape is already at the position requested; second, the position requested is within the current partition; third, the position requested is in the other partition. Positioning can be to one of six different resolutions: (1) The positioning can be to an absolute frame count (AFC) in the current partition, the finest resolution; (2) block number in the current partition; (3) file mark in the current partition; (4) save-set mark in the current partition; (5) EOD in the current partition; and (6) position to the other partition at a block number. If the position requested by SCSI block 406 is the current tape position, then position complete message can be returned immediately and no other action is required. If the position requested by SCSI block 406 is in the current partition, a positioning command is sent to positioning block 408. If the new position is estimated to be greater than two groups away, then high speed tape transport commences. During high speed tape transport, the position likely will be passed. Once passed, the tape stops and repositions at the point requested, at which point position complete message is returned. If the position is not in the current partition, the current partitions's system log must be updated before the tape can be moved into the other partition. Once the current system log is updated, the tape can be moved into the other partition. The first time a partition is entered, the system log must be read into memory. Then the positioning is as described above for positioning in the current partition.

Write Data

The only SCSI data requested to be written is user data. User data is always written one group at a time. Once interface 302 (FIG. 3) has transmitted a group of data, that group is written at the current tape position. After every SCSI write to a group, a user-settable timer starts decrementing. If the timer reaches zero before the next SCSI write of data to the group, that group is padded and written to tape. If SCSI restarts writing, the group is filled and appended over its previous copy. If a group is written to the tape and there is no group to follow, as in the time timeout, that group is written with twelve amble frames following the group. Then a user-settable time starts decrementing. If the time reaches zero before another SCSI write command, an EOD is appended to the end of the twelve amble frames.

Read Data

The only SCSI data requested to be read is user data. The data will always be dona one group at a time. Once the group with the data requested by SCSI is read correctly, that data is available for SCSI block 406 to send to the host unit.

POSITION STIMULI

Positioning block 408 can be in one of three modes: searching motion, 1× motion, and stopped. Searching motion is either physical or logical; during 1× motion, positioning is determined by reading the subcodes.

Search Speed

During search speed, positioning is determined by either reel motor position, capstan motor position, or by information in the subcodes. The most accurate positioning is by reading the information in the subcodes. The subcodes read is a subset of the two sub data areas on a track. The distance between the subcodes read depends on the search speed. The search speed does not allow the reading of all of the subcode data on the track or any of the user data on a track.

Normal Speed

Normal speed 1× motion of the tape is used to either position the tape accurately or to read and write data. For positioning, all of the sub data areas and the main data areas of the tape can be read. This type of positioning is used when performing an append operation. This type of positioning is also used to locate and update the system log. The only time main data can be read or written is when the tape speed is at normal speed 1×. For details on tracking during normal speed, see related ATF patent application Ser. No. 07/741,088.

Stopped

Positioning block 408 stops motion if the servo-control system cannot lock or if either end of the tape is reached. Otherwise, if the position requested is reached, positioning block 408 switches to forward 1× read mode and returns status OK.

FORMATTER

Formatter 410 controls the flow of data, performs DDS data structure formatting, and DDS data error correction assistance.

Formatter 410 controls the flow of direct memory access (DMA) frames of data between main buffer 404 (groups of data) and frame buffer 417 (frames and tracks of data). For a detailed description of formatter 410 see related patent application Ser. No. 07/740,755. Only an overview of formatter 410 functions is presented here. Formatter 410 controls calculations of C2 ECC parity bytes and syndrome bytes for a frame of data. Formatter 410 also calculates three different track checksums: (1) Track checksum is calculated when a frame is DMA'ed from main buffer 404 to frame buffer 417 during a write to tape, whereby checksums for both tracks of a frame are calculated. (2) Track checksum is calculated when a frame is DMA'ed from main buffer 404 to frame buffer 417 during a read from tape. (3) Track checksum is calculated when a track is transferred in from the read channel during a read for RAW, whereby only a checksum for a single track is performed.

Formatter 410 can be programmed to control the flow of data and the operation of the read/write head(s) 390 (FIG. 3). Some data areas may have different meanings depending of the formatter 410 read/write mode. Details can be found in the related formatter patent application referenced above. Formatter 410 may be programmed to calculate either C2 ECC parity or C1 ECC syndromes. Parity is calculated only on tracks being written to tape. Syndromes are calculated when tracks are being read from tape during reading or during RAW. RAW is performed only when writing to tape. A track that was just written is read and its C1 ECC syndromes and checksum is calculated to verify that the track has been properly written. For C1 ECC, in memory, for each block of the track being read, there is stored any non-zero syndromes plus the block number. The memory holds up to 14 bad blocks worth of syndromes and block numbers in one embodiment. If the number of bad blocks and the severity of the error is minimal, the frame is not rewritten. To verify that the RAW checksum is correct for the track, the C1 ECC correction bytes of the user data blocks is XORed with the RAW checksum. For track checksum, as each track is being read during RAW, that track's checksum is also calculated. This checksum is used to verify that previously written data is not being read if there was a head clog during the write. If the number of bad blocks and the severity of the error is minimal, then the correction bytes of the user data bytes are XORed with the RAW checksum. This corrected checksum is then compared to the checksum that was supposed to be written.

READ/WRITE DATA FLOW

Figure 5:
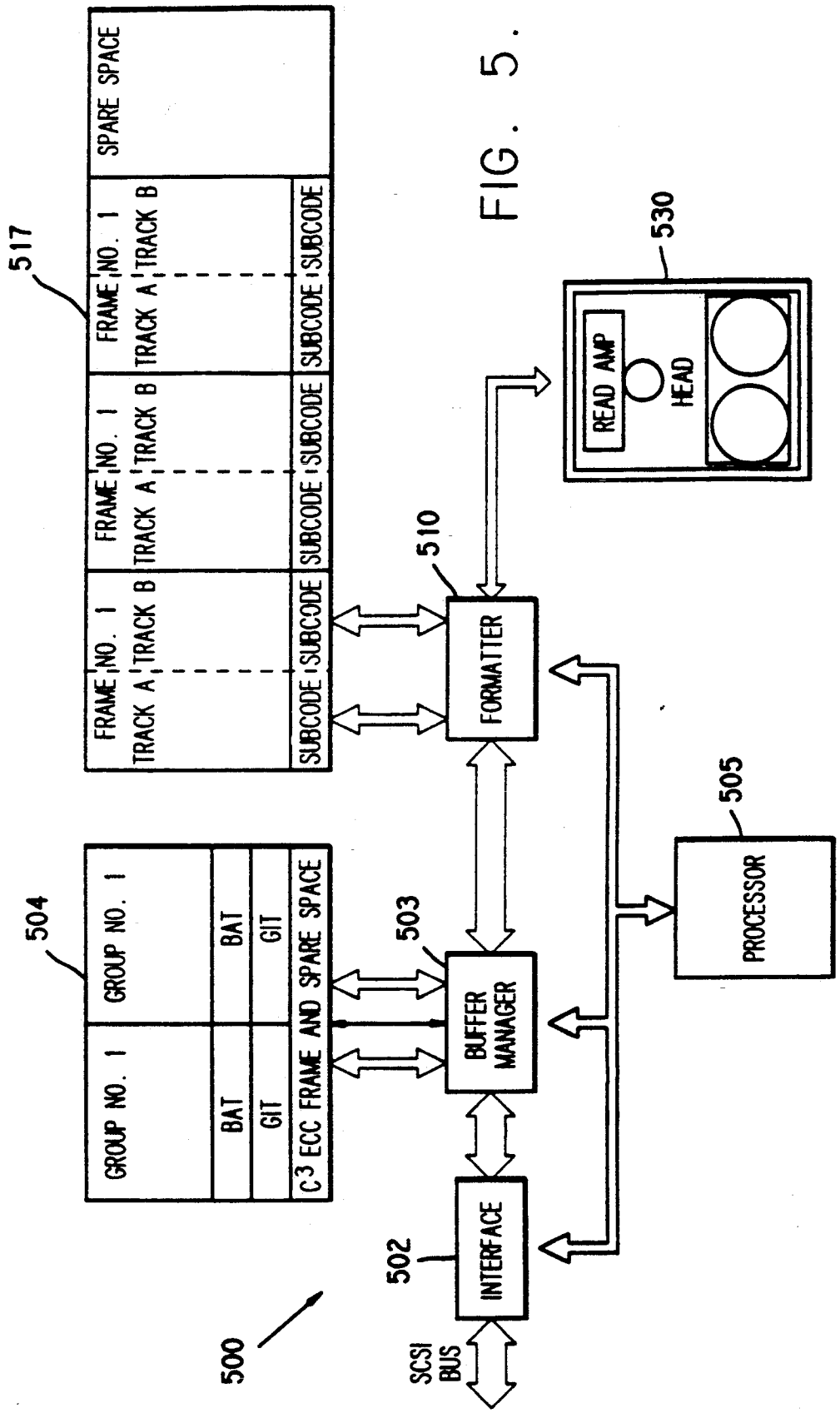
FIG. 5 is a schematic block diagram illustrating a read/write data flow according to an embodiment of the present invention.
Figure 6:
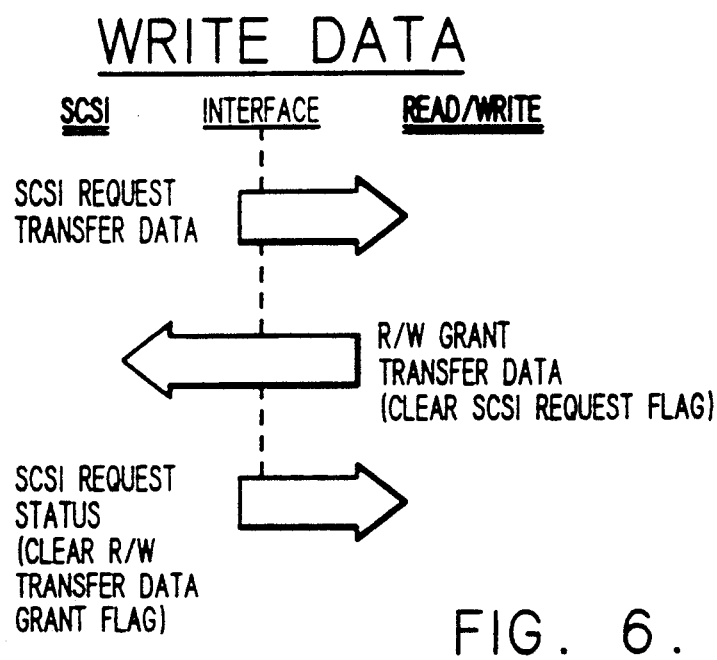
FIG. 6 illustrates the SCSI write protocol for the read/write data flow according to the present invention.
Figure 7:
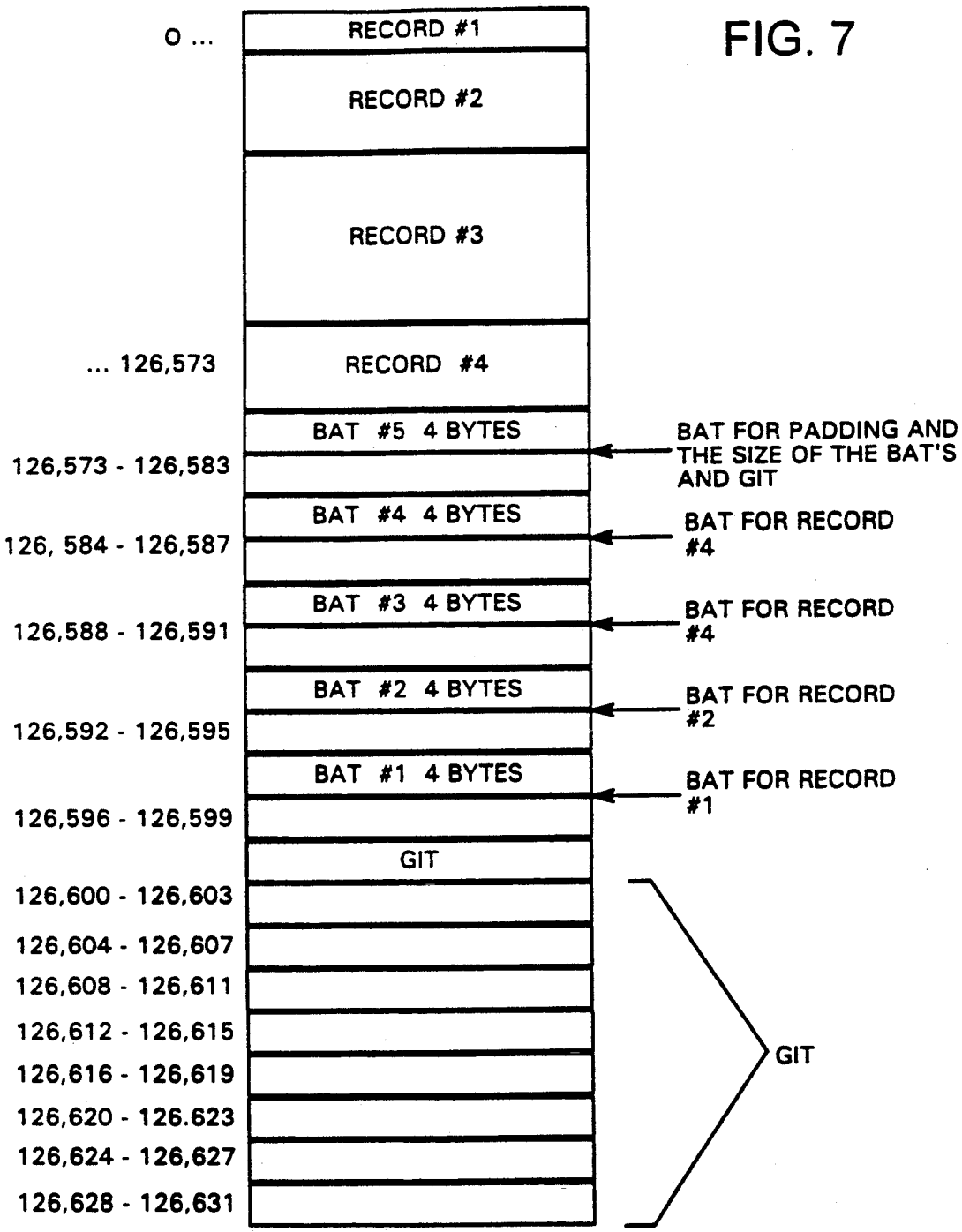
FIG. 7 shows the DDS group construction for the read/write data flow according to the present invention.

FIG. 5 is a schematic block diagram illustrating a read/write data flow 500 according to this embodiment of the invention. FIG. 6 illustrates the SCSI write protocol and FIG. 7 shows the DDS group construction. The data flow between interface 302 (FIG. 3) and driver 330 is controlled by read/write block 403. Data blocks are transmitted from a host unit to system 400 for storage as DDS groups. The groups can have C3 ECC parity frame appended to the end. The group is then subdivided into DDS frames. The frames of data are moved from the main buffer 404 to frame buffer 417 and again subdivided into DAT tracks. Each track has C2 ECC parity data inserted into the track and each track has its checksum calculated. The subcode data and block IDs are written to the memory space in the track. When the track is written to tape, C1 ECC parity is appended to each track's data block pairs.

SCSI Blocks

SCSI blocks transmitted to system 400 fit into three categories: A SCSI block can completely fit but not fill the current group in main buffer 404, the block can completely fit and fill the current group in main buffer 404 such that the group is completely full and the last byte of the block is in the group, and the block can completely fill a group without transferring any blocks. The second case is when a block occupies more than one group. This is where a block's data is in more than one group which is possible with a block of just two bytes where the first byte is the last byte of group N and the second byte is the first data byte of group N+1. SCSI blocks can range in size from one byte to 16,777,215 (16M−1) bytes. The third case is when SCSI writes file marks and save-set marks. For each mark written, an entry into the group's block access table is made. This takes up four bytes of the group for each one these marks while no user data is transferred or stored in the group.

The communication between SCSI block 406 and read/write block 403 is through subroutine calls and global data blocks. When SCSI wants to write user data or marks, SCSI sets a flag signalling read/write block 403. Before setting this flag, SCSI checks if there is any free space in the group buffers and then SCSI sets up its SCSI data block. When the flag is set, read/write block 403 uses the information in SCSI dat block 406 to decide how much data SCSI can actually transfer into the current group. Read/write block 403 then updates its status flags in its R/W data block. This tells SCSI just how much data can actually be DMA'ed from the host unit into the current group.

SCSI Data Block

SCSI data block 406 has three parts: the status flag filed (1 byte), the number of records, file marks, or save-set marks field (3 bytes), and the record size (3 bytes). The status flag has eight status bits. Bit 0 is the transfer complete/aborted flag which informs read/write block 403 of the status of the last DMA operation. If this bit is set, R/W data block data will not change, and the status of the group is the same as it was before the last transfer data grant. Bit 1, when set, informs R/W block 403 that the data in SCSI dat block 406 refers to records. Bit 2, when set, informs R/W block 403 that the data in SCSI dat block 406 refers to file marks. Bit 3, when set, informs R/W block 403 that the data in SCSI data block 406 refers to save-set marks. Bit 4, when set, informs R/W block 403 that the current transfer data request is a continuation of the previous SCSI request. Bit 5, when set, informs R/W block 403 that when the current transfer is done, pad the rest of the group so the group is full and will be written to tape. Bit 6 is the transfer status/data flag. When bit 6 is cleared SCSI data block 406 contains transfer data request information. Bit 7 is the SCSI request flag, which when set, is requesting service from R/W block 403.

The number of records of file mark or save-set mark field is the count of records, file marks, or save-set marks to DMA. Which information this field pertain to is indicated in the status flag bits b1, b2, and b3. An error condition results if more than one of these bits is set. The record size field is either the size of a variable length record or the size of a record in a fixed block transfer. in either case, this field is the record size. In variable length record transfers, this value is the size of the DMA transfer requested by SCSI block 406. In the fixed block transfers, this field times the number of record field is the size of the DMA transfer requested by SCSI block 406. R/W block 403 signals SCSI that the current request has been received and acted upon by clearing the SCSI request flag. At this point, SCSI should read the updated information R/W data block 403.

Read/Write Data Block

R/W data block 403 has six parts: the status flag 0 field (1 byte), the status flag 1 field (1 byte), the DMA start address field (3 bytes), the transfer size field (3 bytes), the total transfer request size field (4 bytes), and the transfer size remainder field (4 bytes). The status flag 0 has six status bits and two unused reserved bits. Bit 0 is the transfer data grant flag. This flag, when set, informs SCSI block 406 that it can DMA data into the current group. Bit 1 is the R/W block busy flag. When this bit is set, SCSI block 406 should not make any DMA requests. Bit 2 is set by SCSI to inform R/W block 403 that there is a new SCSI command. This flag is being read while R/W block 403 is in its idle loop waiting for a SCSI command. Bit 3 is 0 and reserved. Bit 4, when set, informs SCSI block 406 that the current transfer request exceeded the maximum byte count. In this embodiment, this occurs whenever the number of records field in the SCSI data block times the record size field in SCSI data block 406 exceeds $2^{32}-1$. Bit 5 is 0 and reserved. Bit 6 is the transfer requested size flag. When this flag is set, the SCSI transfer fits in the current group buffer. When this flag is cleared, the SCSI transfer crosses groups and the allowable transfer is less than that requested. For very large transfers, this flag is cleared for all but the transfer that does not fill a group, which is the last transfer of the sequence. Bit 7 is the transfer space is/is NOT available flag. When this bit is set, there is currently no space available for any SCSI data, meaning all group buffers are full. When this bit is set there is at least sufficient buffer memory for one byte of SCSI data. If this bit is cleared, SCSI may set its SCSI request flag in SCSI dat block 406. If this bit set, SCSI must hold off making any transfer data requests to R/W block 403, which may mean that SCSI block 406 will perform a SCSI disconnect from the host unit. Once the flag is cleared, SCSI performs a SCSI reconnect with the host unit (see FIG. 6).

The status flag 1 has two status bits and six unused bits reserved bits. Bit 0 is the record continues into the next group flag. This flag, when set, informs R/w block 403 that the current DDS record when finished will have an extra BAT entry for the record size. Bit 1 is the current transfer continues into the next group flag. This flag, when set, informs R/W block 403 that the current SCSI block transfer will be crossing group boundaries. This helps R/W block 403 calculate the end of the current SCSI transfer.

The DMA start address is the absolute main buffer address of the next user data start. This address is the same as the DMA address of buffer manager 303. This value could also be a check for SCSI block 406 that buffer manager 303 has the proper DMA address.

The transfer size is the maximum number of user data bytes that can be stored in the current group in main buffer 304. At the start of a group, this value is [(group size)−(group information table size)−(2×(block access table entry size))] (which is 126,592 bytes in this embodiment). Note that the block access table entries are accessed through the MPU port of buffer manager 303. A simple calculation for the transfer size is [(MPU buffer address)−(DMA start address)−7]. An example is if the group started at DRAM (main buffer 304) address 0, the MPU buffer address is 126,599 (note that the MPU buffer address is decrementing), the end of the first block access table entry. The maximum transfer count would be [(126,599)−(0)−7]=126,592, which is the most user data in any group (see FIGS. 6 and 7). If the DDS record ends in a group, but did not start in that group, then there is an additional block access table entry. This additional entry is the byte count of the entire DDS record from start to finish, which can be a maximum value of 16,777,215 (16M−1) and a minimum value of 2 (see FIG. 9, Block Access Table (BAT) fields).

The total transfer request size is the number of bytes requested by the SCSI block. This number is either the SCSI data block record size for variable length record transfers or the SCSI data block number of records count time the SCSI data block record size for fixed length record transfers. If this value exceeds $2^{32}-1$, then the transfer request BAD flag is set.

The transfer size remainder field is the amount of data still waiting to be transferred by the host unit. An example of this value for a variable length record transfer is the difference between the record size field of the SCSI data block and the transfer size field of R/W data block 403 (see FIG. 6).

A write record request uses all of the above data fields. A write file mark and write save set mark request only uses and modifies the transfer size field, which changes by four bytes for each requested mark. A group could be filled with block access table entries and have no user data. This would happen if the total number of marks (the sum of the file marks and save-set marks) were to be equal to or greater than 31,650.

DDS GROUP

A DDS group is made up of two parts: The first part is for data, and consists of three sections which total 126,632 bytes. The second part is for C3 ECC parity data, and totals 5,756 bytes. The first section of the first part are: user data SCSI blocks/DDS records, the DDS format block access table (BAT), and the DDS format group information table (GIT) (FIG. 7).

A record is a single unit of user data. When reading or writing, a record of data is the smallest unit of user data that is passed between SCSI and the rest of data flow system 400. Blocks are either fixed size or variable size for SCSI transfers. The blocks of data are stored in a group starting at the lowest available address of the group. Each subsequent block is stored at the next available lowest address of the group. Blocks are stored, incrementing logically into the group. For each block stored, R/W block 403 writes a block access table entry into the group. Thus for every block that has at least one byte in a group, there is a block access table entry in the group for that block's data. If the block ends, but did not begin in the current group, then there are two block access table entries in the group for that block. The first entry is for the number of bytes of the block that are in the current group. The second entry is for the total number of bytes of the block from start to finish (FIG. 7).

The group information table (GIT) makes up the last 32 bytes of a group. The GIT has 13 parts. Two of these parts are reserved and other are: the group count, the block access table count, the record count, the filemark count, save-set mark count, the number of records in the group, the previous record group count, the number of filemarks in the group, the previous filemark group count, the number of save-set marks in the group, and the previous save-set mark group count (see FIG. 7). The reserved areas must always be filled with zeros. For a complete description of these fields, see ANSI Proposed American National Standard, Helical-Scan Digital Computer Tape Cartridge, 3.81 mm Digital Data Storage (DDS) Recorded Format (ASC X3 Project Number 688-D) 7th Draft (hereinafter "ANSI Helical-Scan Standard").

Figure 8:
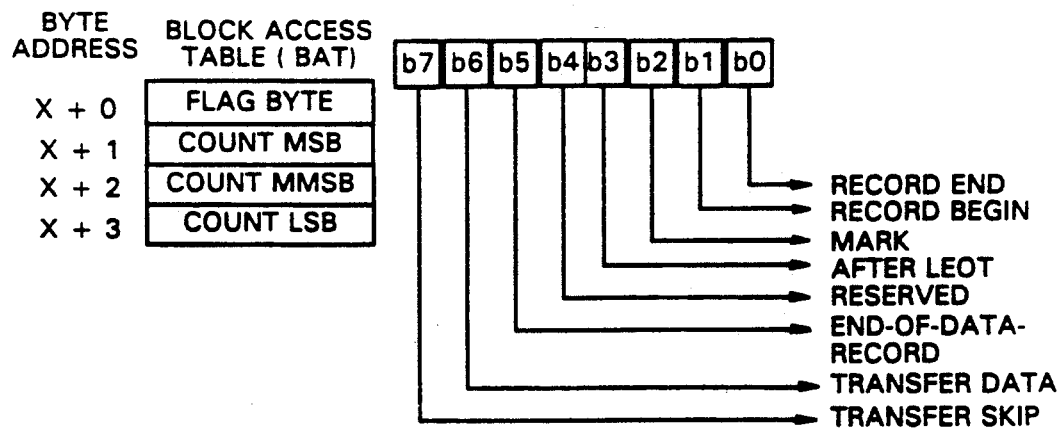
FIG. 8 shows the layout of the BAT entry for the read/write data flow according to the present invention.
Figure 9:
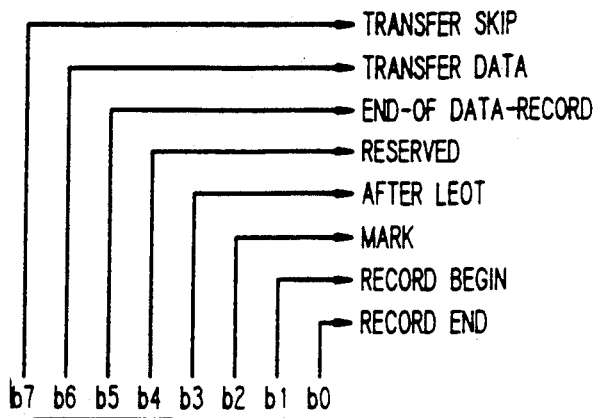
FIG. 9 shows the different meanings of the count field for the read/write data flow according to the present invention.

The block access table (BAT) entries are of two types. For each record that has at least one bye in the current group, there is a BAT entry. When a group is to be written to tape, a special BAT entry is made which marks the last BAT entry for the group. Sometimes groups are written which are not completely full of user data. This unused space is called padding. This last BAT entry counts this padding, the space used by the BAT entries, the GIT, and puts this total byte count into the count bytes. A BAT entry has two parts, the flag byte and the count. The count field of all of the BAT entries, with transfer data bit set or transfer skip bit set, added together will always add up to the size of a group, which is 126,632 bytes. The flag byte is one byte and count is three bytes for a total of four bytes for each BAT entry. FIG. 8 shows the layout of the BAT entry and FIG. 9 shows the different meanings of the count field. Each of the flag byte bits is described in detail in the ANSI Helical-Scan Standard referenced above.

The flag byte describes either physical or logical information. Logical information is the placement of a mark. Physical information is data from a SCSI block or group padding. Such a definition control the meaning of the count bytes. The flag byte has two information parts: the content of the information in the group and the transfer of data into the group. The content information bits are: record end, record begin, mark, and after logical end of tape (LEOT).

The record end bit signifies that the record has ended in the current group but did not necessarily start in the current group and this is the last BAT entry for the record. If the end-of-data-record bit is also set, then the record is entirely contained in the current group. In either case, the count bytes will be the total size in bytes of the entire record. The record begin bit signifies that the record has started in the current group. If the record end bit is also set, then the record is entirely contained in the current group, and the count bytes will be the total size in bytes of the record. If only the record begin bit is set, then the count bytes will be the total size in bytes of the amount of the record that is in the current group. A mark (file or save-set) will always begin and end in the same group. When the mark bit is set, the record end and record begin bits are also set. Because a mark transfers no data, the transfer data and transfer skip bits must be zero. To distinguish between file marks and save-set marks, the count bytes are used, the mark being a filemark if the count is 0, and the mark being a save-set if the count is 1. No other values in the count bytes are allowed for a mark. The after LEOT bit is used to signal SCSI that when reading data, the record was written after a LEOT message was sent to the host unit. The reserved bit should always be cleared to zero.

The transfer information bits are: end-of-data-record, transfer data, and transfer skip. The end-of-data-record bit signals that the record ends in the current group. When this bit is set, the count bytes are the number of bytes of the record that are contained in the current group. This could be the entire record or the end of a record that spans multiple groups. The transfer data bit signals that the count bytes count the bytes of the record that are in the current group. This could be for the start, middle, or end of a record. This bit is used to calculate the number of bytes of the record that are in the current group. The summation of all count fields with this bit set in the flag byte is the total amount of user data in the group. The transfer skip bit signals the amount of non-user data in the current group. When this bit is set, the count bytes are the accumulated count of bytes of the GIT, all of the BAT entries, and all unused bytes after the last record in the current group. The count bytes as explained above have different meanings depending on the state of the flag byte bits. The count can have four different meanings: (1) The count byte can be the number of bytes of a DDS record in the current group. If the record begins and ends in the current group, then this count is the SCSI block size. If the record ends but does not begin in the current group, then this count is the number of bytes of the record that are in the current group. (2) The count byte can be the total number of bytes of a DDS record which ends in the current group but does not start in the current group. This BAT entry would be the last BAT entry for a record. Only records that span groups and end in the current group have more than one BAT entry. (3) The count byte can be the number of bytes of the current group which are not part of a DDS record. This would be padding bytes (BAT entries, the GIT, and any left over bytes in the group not being used for records). (4) The count byte can be a flag for the type of mark being used (as described above).

DDS FRAME

Figure 10:
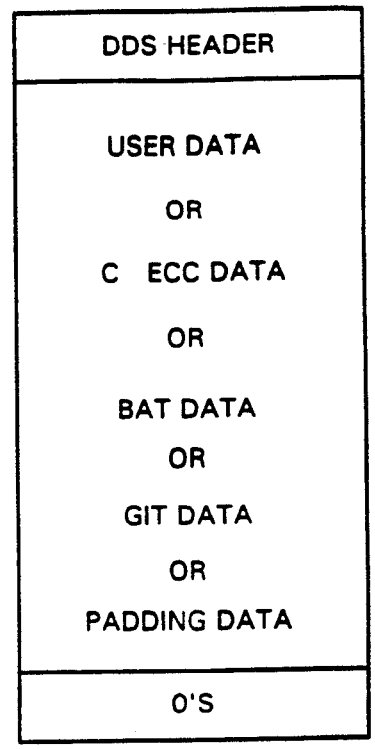
FIG. 10 shows the organization of a DDS frame for the read/write data flow according to the present invention.

FIG. 10 shows the organization of a DDS frame. A DDS frame is the smallest logical unit of data on the tape. A group is divided into 22 frames of data. A 23rd frame of C3 ECC parity data is appended to the end of a group if C3 ECC is desired to be performed on the group. A frame is made up of three parts: the header, user data, and padding. Only the user data is randomized; the entire frame is interleaved.

Figure 11:
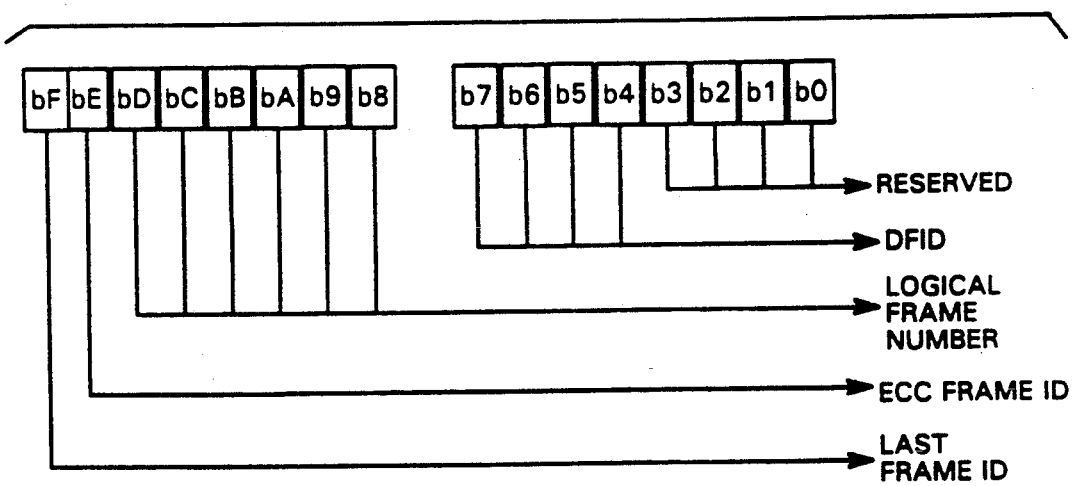
FIG. 11 shows the organization of a DDS frame header for the read/write data flow according to the present invention.

FIG. 11 shows the organization of a DDS frame header. The header of a frame is a repeated two byte field. Each copy is for each track. The least significant four bits are reserved and always zero. The next four bits are the data format ID (DFID), which specifies the logical format of the current data. All zeros is for the DDS format. The least significant six bits of the second byte is the logical frame ID (LFID), which is used to keep track of the logical frames of a group as well as non-group frames (ambles). The next bit is the ECC frame ID bit and is used to signal that the current frame is the C3 ECC frame. The most significant bit of the header is the last frame ID bit, which signals that the current frame is the last frame in the group. The DDS frame header is added to the frame data after the frame has been DMA'ed over into frame buffer 417. Frame boundaries are not present in a group and C3 ECC is not calculated on the header.

The information in a group is divided into frames and the data in these frames are one of three types of data: user data from SCSI block 406, padding data, including unused space, BAT entries, and the GIT, and C3 ECC data. All three types of data are indistinguishable from any other data in a frame.

A DAT frame has space for 5,824 bytes of which DDS uses only the first 5,760 bytes. To maintain DAT format compatibility, 64 zero filled bytes are logically added to the end of each DDS frame. To do this, at the start of every append operation, these 64 bytes are DMA'ed (with the randomizer turned off) after each frame when the two amble frames and the frame of the group are DMA'ed into frame buffers zero, one, and two, respectively. Once these zero-fill are written, they will not change for each entire write sequence. These bytes are only modified during a read sequence. When switching from read to write, these bytes must be re-written with zeros. Further, formatter 410 must be programmed with interleave and randomize enabled for the 5,756 bytes of group data, and with interleave enabled and randomize disabled for the 64 bytes of zeros. This adds approximately 60 microseconds for DMA'ing a frame of data from main buffer 404 to frame buffer 417. Randomizing and interleaving are performed by formatter 410 as described in the related formatter patent application and the ANSI Helical-Scan Standard referenced above. FIG. 10 further shows the frame area to be randomized and interleaved.

DDS TRACK

Figure 12:
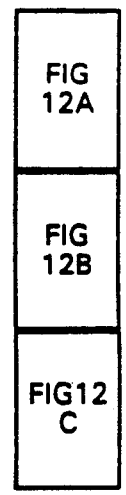
Figure 12A:
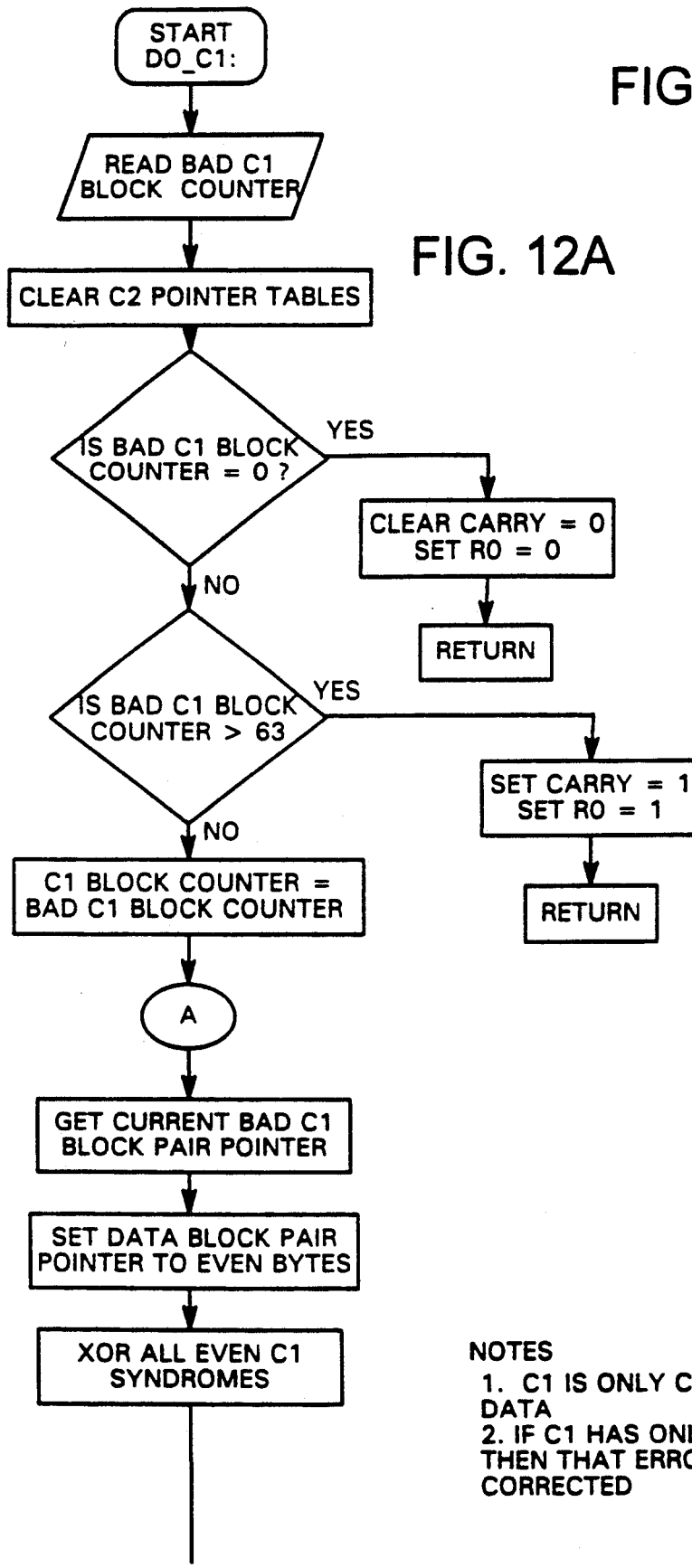
Figure 12B:
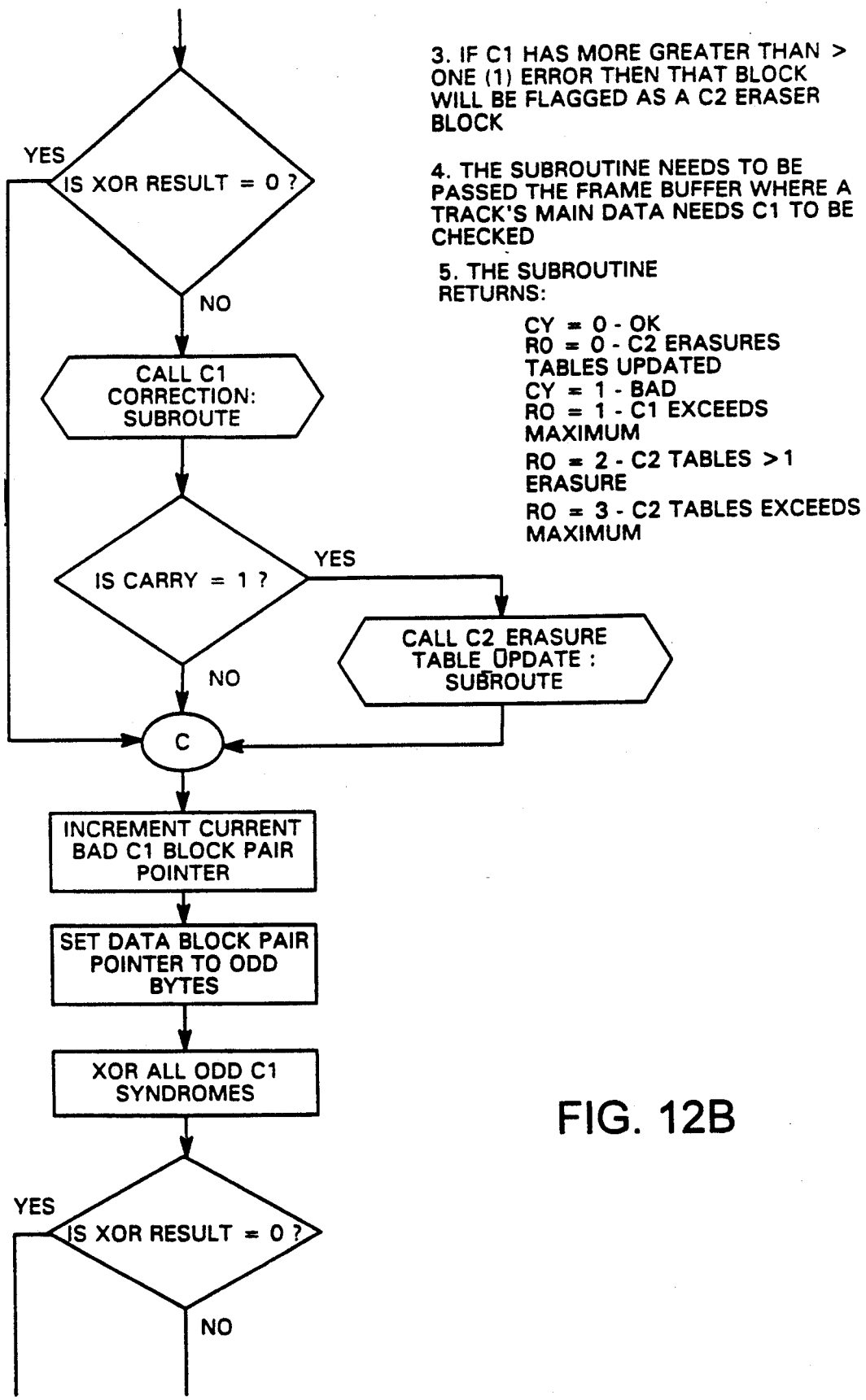
Figure 12C:
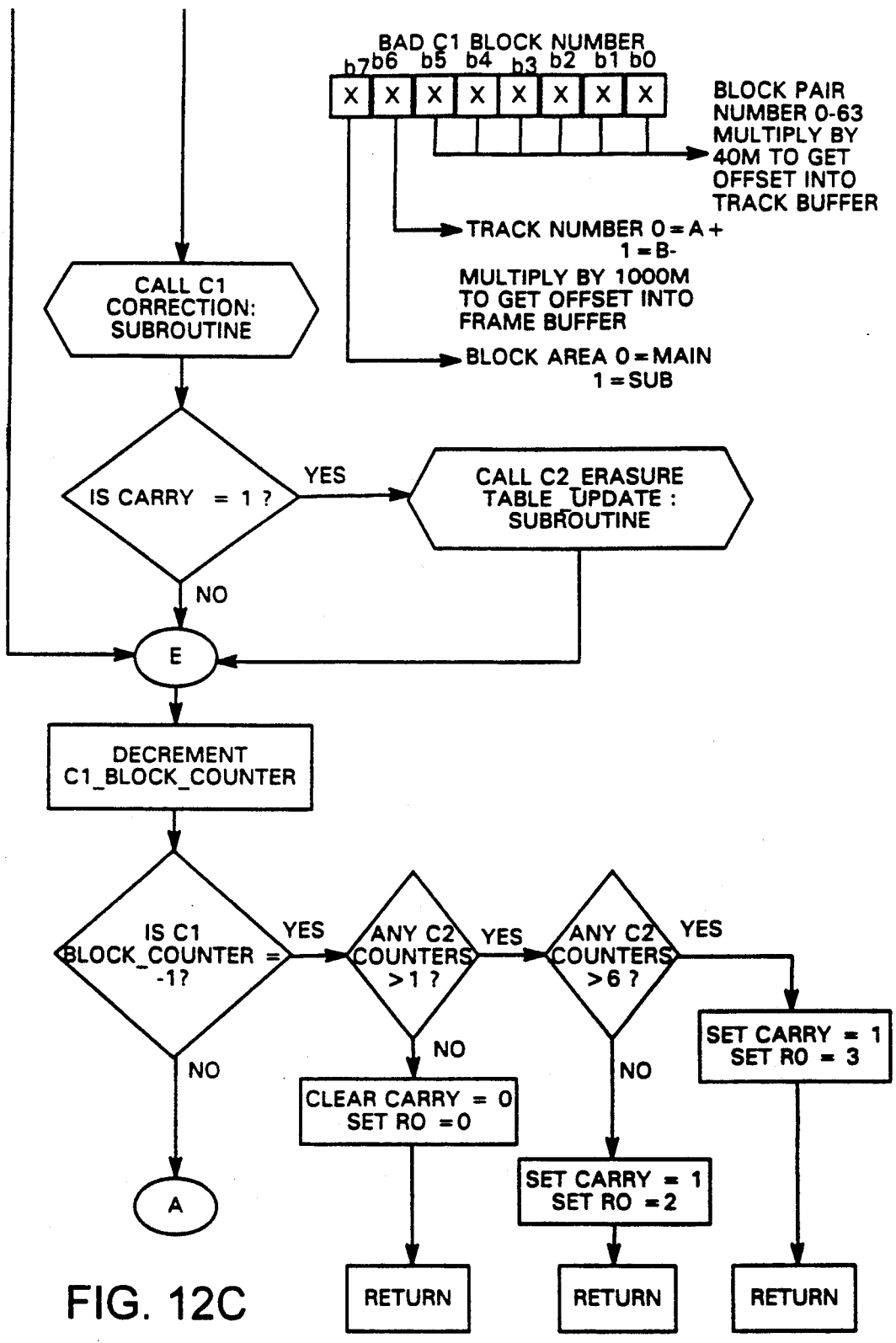

In the preferred embodiment, a frame of data is written onto the tape with two write heads. The write heads are aligned such that their azimuth angles are opposite each other. One is a positive azimuth angle, track A, and the other is a negative azimuth angle, track B. Each track is divided into six areas and are written onto the tape in the order according to Table III. The main data is written in the middle of the track, where the user data is stored. The main data has three checking mechanisms that apply at the track level: C1 ECC, C2 ECC, and track checksum. Track checksum is not stored in the main data. Sub code is written before and after the main data on a track. The sub code data information is repeated eight times, four times before the main data and four times after the main data. The unique sub code information is organized as seven eight-byte packs. An extra eight bytes are used for C1 ECC for the seven packs. FIG. 12 is a flowchart of the C1 ECC main subroutine. The type of packs stored in the subdata depends on what area of the tape is currently being written. The main data track checksum is a sixteen bit exclusive OR of the main data and header data of a track. The C2 ECC is calculated only over the main data and header of a track. The C1 ECC is calculated over the sub code data and main data areas. This error correction also covers the C2 ECC data.

READ FUNCTIONS

During normal operation, only the system log and the data area of the tape are read at normal speed. Only the sub code data in the system log has useful information while both the sub code and main data of the data area have useful information. In search mode, only the sub code data can be read. The search speed determines the distance between sub code tracks that can be read successfully. The fastest search speed is limited by the requirement to always capture a sub data read when passing the EOD area.

Figure 13C:
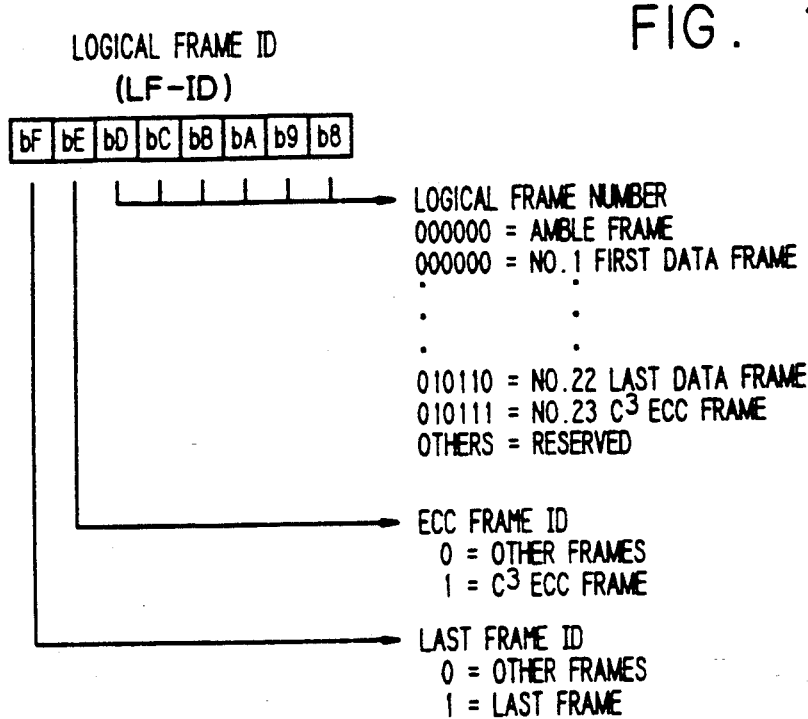

FIG. 13 is a chart showing the DDS pack items organization. FIG. 14 is a chart illustrating a DDS format 1 partition tape. The system log is located at 1402 and contains pack items #3 through #8. Pack items #3 and #4 have different meanings for bytes PC5-PC7 depending on which partition the packs are located. Pack items #5 through #8 for the first partition are statistics for the entire tape. While in the second partition of the tape, the statistics are only for that partition. FIG. 13 shows the data field definitions in the different pack items. Further detail may be found in ANSI Helical-Scan Standard referenced above. The system log will be read only once for each partition. The first time the tape is positioned within a partition, the system log of that partition is read into memory. To insure that the sub code data is valid, the read will be done three times at three different places in the system log area. The data will be valid when any two sub code data block pairs from different areas match. The memory version of the system log is continuously updated. Whenever the tape is positioned out of the current partition, that partition's system log will be written, but does not need to be read again because the information is always in memory. Thus a copy of each partition's system log is being saved in memory. Each system log is stored in memory as shown in Table IV.

The sub code data area in the data area is used to find physical positions on the tape from logical position requests. The main data area contains the user data and user marks. As shown in FIG. 14, the user data starts after the vendor group and is stored one DDS group at a time.

Figure 15B:
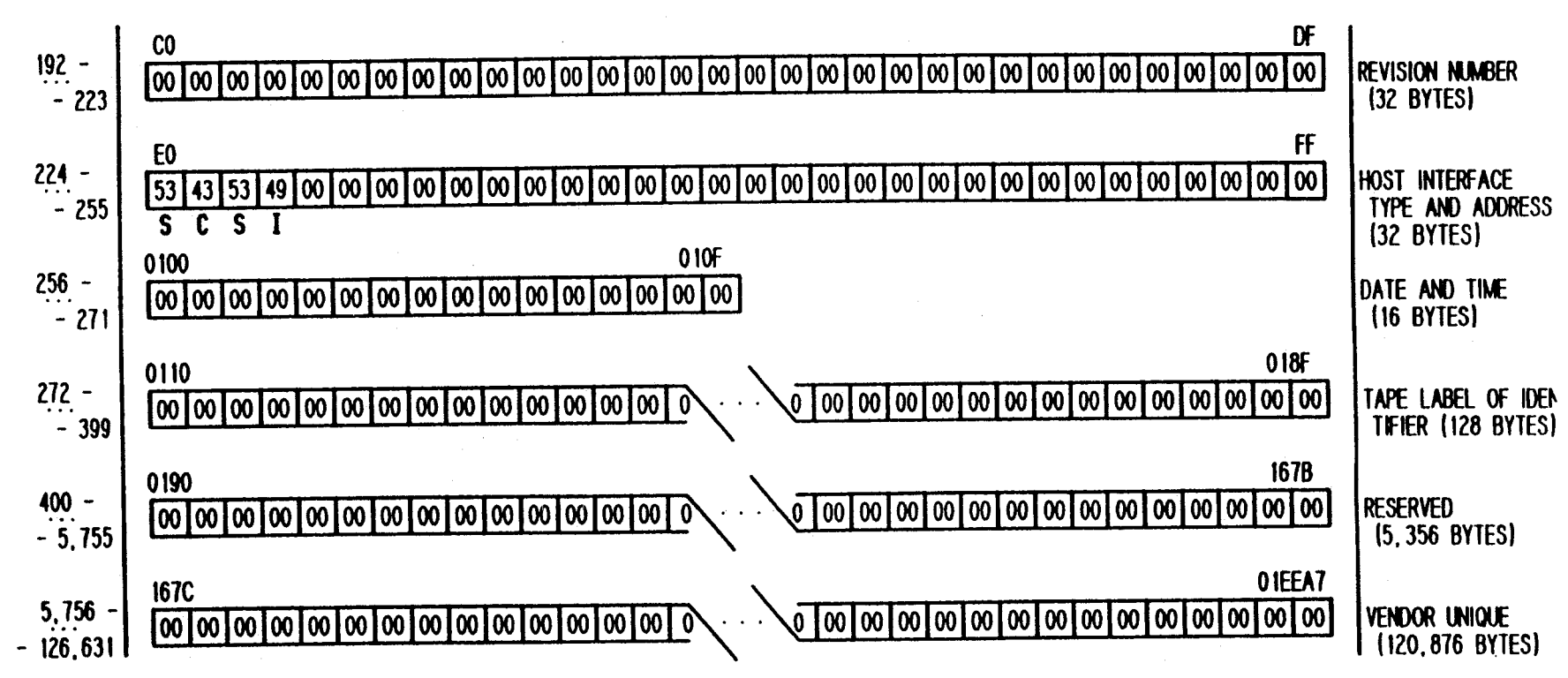

FIG. 15 is a chart showing the vendor group layout. The vendor group is written onto he tape only when its partition is first initialized. When writing the vendor group, there are no N-group writing, no GIT, no BATs, the first frame is always at AFC equal to 151, and all unused space is filled with 00H.

Figure 16:
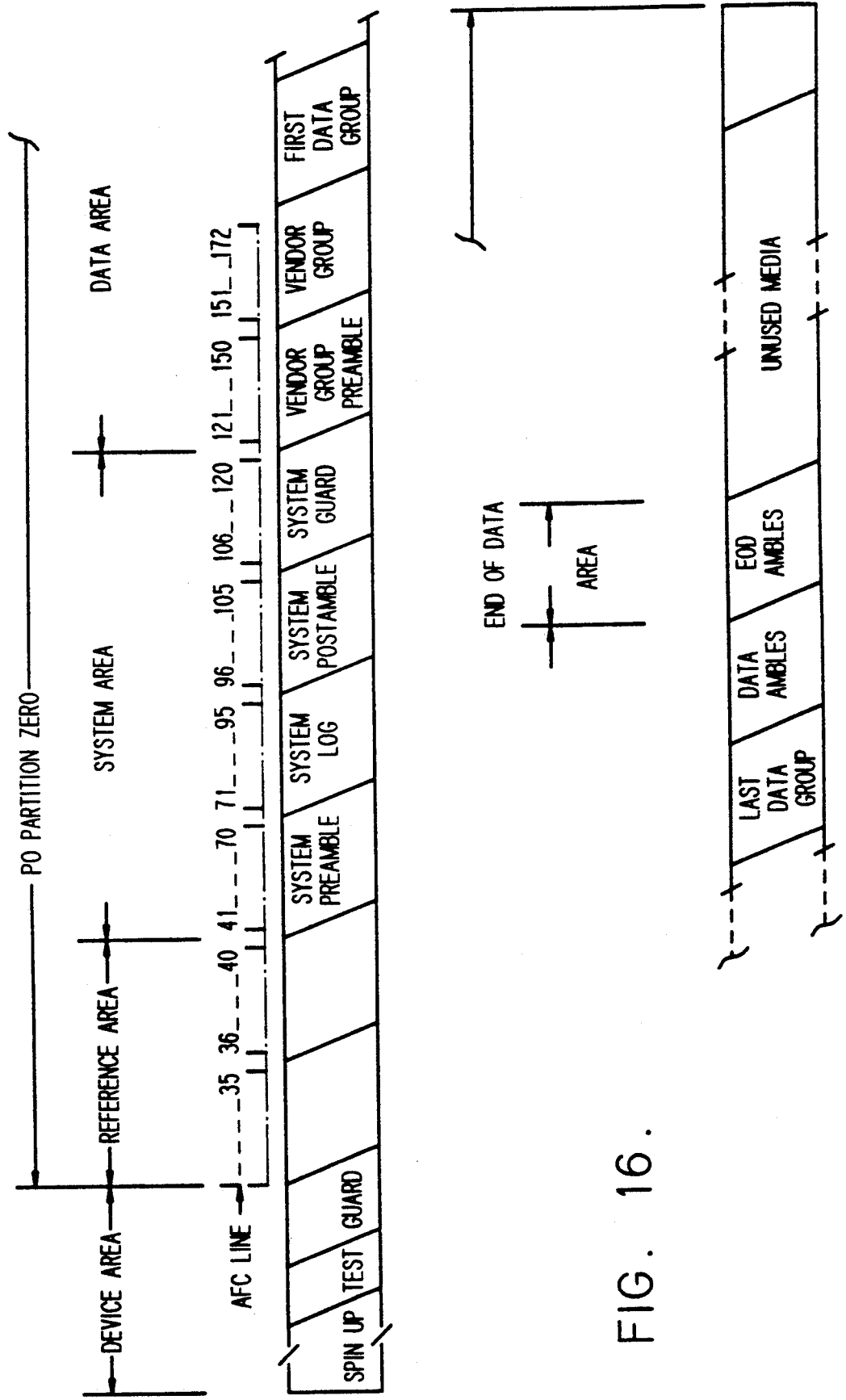
FIG. 16 is a chart showing the location of the data area according to the present invention.

All groups in the data area which are not vendor groups are user groups. FIG. 16 is a chart (7) showing the location of the data area. The DDS format adds a GIT, a BAT, and an optional C3 ECC frame. The group information table (GIT) has information about the tape up to this group which is redundant with sub code data. The GIT also has information describing the contents of the current group, which is used to physically locate the logical information requested by the host unit. FIG. 7 shows the GIT layout and further detail can be found in ANSI Helical-Scan Standard referenced above.

Each sequential BAT entry describes the sequence of user information stored in the group. The BAT entries indirectly point to the start and end of user data and user marks. FIG. 8 shows the BAT layout, FIG. 9 shows the BAT entry structure, and further detail can be found in ANSI Helical-Scan Standard referenced above.

After a group of user data has been read into main buffer 204, C3 ECC can be performed by buffer manager 303. A maximum of two tracks from any of the 23 frames can be corrected. If the bad tracks are known, buffer manager 303 can be programmed to correct all of the data in error, which can be done without stopping tape streaming. If unknown bad tracks exist, or there are more than two bad tracks, tape streaming must stop unless that group is repeated with N-group writing. R/W block 403 must always wait until six frames have been read beyond the C3 ECC frame to insure that the C3 ECC is not repeated because of RAW. If none of the six frames beyond the C3 ECC frame are a re-write of the C3 ECC, then buffer manager 203 can start its C3 ECC syndrome generation. Whenever a C3 ECC frame is detected, C3 ECC syndrome generation is initiated and the results processed.

R/W block 403 never knows that RAW has been employed over the current area of the tape being read. RAW is the only part of the DDS format that does not have status about its use. R/W block 403 reads each frame of data as if it is the only occurrence of that frame on the tape. When a frame is found to be repeated on the tape, the DMA pointers into main buffer 404 will reset back to the beginning of the start of the repeated frame. This resetting of the DMA pointers will continue until a frame is no longer repeated. The last frame of a RAW sequence is the frame that R/W block 403 saves. All previous occurrences of the frame are discarded.

In one embodiment of the invention, N-group writing is a selectable option. N-group writing is treated just oppositely of RAW. The first good occurrence of a group is saved. The subsequent repetitions are skipped over. Unlike RAW, N-group writing status is recorded in the sub codes. It is known which repeated group has been successfully read. This information could be used to actually skip over the other repeated groups at a greater than 1× speed until the last group in the sequence is reached. Normal speed is then switched back on to read the next group.

WRITE FUNCTIONS

Many different areas of the tape can be written. During normal operation, only three areas are written: the system area, data area, and end-of-data area. All writing to the tape is done at normal 1× speed. In the system area and end-of-data area, information is stored in frames, while in the data area, information is stored in groups and frames. Anywhere on the DDS tape where data is being stored in frames only, the main data area of the frame must be all zeros.

The system log has slightly different meanings between the first partition and the second partition. DDS tapes can have either one or two partitions. The last partition on the tape is always partition 0. Two partition tapes frequently have index information in the first partition and user data in the second partition. So a one partition tape has only partition 0. A two partition tape has the first partition as partition 1 and the second partition as partition 0. The system log is written whenever system log data in memory has changed since the last time that partition's system log has been written and it is time to update the system log. There are three different cases when the system log will be updated. The current partition's system log is updated whenever the system log update timer time-outs and the system log has changed. The current partition's system log is updated whenever the tape is positioned to the other partition. All partition system logs are updated whenever the cassette is ejected.

The system log contains pack items #3 through #8. See FIG. 14 for where the system log is located on a single partition tape. Pack items #3 and #4 have different meanings for bytes PC5-PC7 depending on which partition the packs are located. Pack items #5 through #8 for the first partition on the tape are statistics for the entire tape. PC5-PC7 of pack items #3 and #4 on the first partition, of a two partition tape, contain the AFC of the last frame of the first partition, called the maximum absolute frame count. The frame after this frame is the synthetic beginning of tape for the second partition, partition 0. From the maximum absolute frame count, the synthetic end of media AFC can be calculated. On a one partition tape, this field is set to all ones. For the data field definitions in the different pack items, see FIG. 13. For a description of each data field, see ANSI Helical-Scan Standard referenced above.

The system log area contains pack items #3 through #8. See FIG. 17 for where the system log is located on a two partition tape. Pack items #3 and #4 have different meanings for bytes PC5-PC7 depending on which partition the packs are located. Pack Items #5 through #8 for the second partition on the tape are statistics for the second partition only. PC5-PC7 of pack items #3 and #4 on the second partition like a one partition tape are all set to ones. For the data field definitions in the different pack items, see FIG. 13. For a description of each data field, see ANSI Helical-Scan Standard referenced above.

The data area for the DDS format has the same requirements on all partitions. A DDS tape has two types of groups. One type of group is the vendor group, which is written only once per partition as the first group of that partition. The second type of group is the user data group, which makes up the rest of the groups in the partition. The user group has three parts, the user's data, the BAT, and the GIT. The C3 ECC frame is an appendage to the end of a DS group and not a part of the user's information. The user's information, SCSI blocks, are stored as DDS records. Each record is stored sequentially starting at the lowest address of the group. The user can also mark logical positions on the type with file marks and save-set marks. For each mark or record there is a corresponding BAT entry into the group. The user deals with the tape only on a logical basis. The user is unaware of the DDS format or how the user's information is physically being stored onto the tape.

The group information table (GIT) is used to keep a count on the information in the current group, information about the previous groups, and an accumulation of information up to this point on the tape. See FIG. 7 for the location of the GIT and its fields. For a detailed explanation of the GIT fields, see ANSI Helical-Scan Standard referenced above. The GIT is the last information to be written into a group. A group will not be completed until the GIT is completed.

The block access table (BAT) is used to locate the user's data within the group. Each BAT entry corresponds to a SCSI block or mark. There are two exceptions to this rule. If a record ends in the current group but did not begin in the current group, and additional BAT entry will be added to the group. This is the record length BAT entry. The other exception is the padding BAT entry. This BAT entry is the last BAT entry of a group, and is the county of bytes of nonuser data in the group. For a more detailed description of the BAT entries, see the section on the BAT above and FIGS. 8 and 9.

C3 ECC is user selectable. When selected, only the user data, the BAT, and the GIT of a group have the error correction applied. (See FIG. 10) The generation of the C3 ECC parity and syndrome correction bytes is all done by buffer manager 303. After a group is completed in DRAM 404, the C3 ECC can be calculated. The C3 ECC fill an entire DDS frame. This frame is appended to the end of the group. As a frame of data, the C3 ECC frame is treated the same as any other frame in the group.

Read after write (RAW) is user selectable. When RAW is selected, only group data frames will be checked for read errors. Amble frames are not checked for read errors. For RAW, a track's worth of data is checked for errors. First, the number of C1 errors over the main data is checked. The error checking is done by comparing the track checksum of the track read with the checksum of the track that was written. Also, the number of C1 ECC errors are counted. Table V shows the criteria used to decide if a frame needs to be re-written or not re-written, while doing single byte C1 corrections over the user data area for checksum adjustment.

When a track has enough errors to enable RAW, a flag will be set in memory signaling R/W block 403 that there has been a RAW error. Before track A+ of each frame is to be written, the RAW flag is checked. If the flag is set, track A+ data will come from the buffer that had the RAW error. Otherwise, the track A+ data will come from the next buffer to be written. If the RAW flag is set after track A+ has started writing, then the frame with the RAW error will not be re-written until the start of the next track A+. This means that a RAW error can have only one intervening frame. Note that the intervening frame will not have its RAW checked. Until a frame has passed the RAW check, no other frames will be checked for RAW errors. If a frame fails the RAW check 127 times, a fatal error will have occurred and the R/W block 303 will stop writing data.

The C1 ECC data and the checksums are computed by formatter 410. If there are single C1 ECC errors in the user data, then the computed checksum must have the C1 ECC corrected data XORed with the proper byte of the computed checksum. The user data can be thought of as odd bytes and even bytes. The C1 ECC syndrome bytes correct either the even user data bytes or the odd user data bytes. So the even syndrome corrected bytes are XORed with the checksum byte PC5 (checksum MSB), and the odd syndrome corrected bytes are XORed with the checksum byte PC6 (checksum LSB).

The amble frames in the data area on the tape can only be between groups. There is one case where it appears that the amble frame is mixed in with the last frames of a group. This is when RAW is being employed and the last frames and amble frames at the end of the group get re-written. A sequence is observed where the last frame of the group is written, then an amble frame is written, then the last frame of the group is found to have a RAW and is re-written after the amble frame, then the amble frame is re-written. The amble frame has the main data set to all zeros. The sub code fields have the same data as the sub codes in the preceding group's sub codes.

The end of data (EOD) is written to the tape whenever R/W block 403 gets a nonwrite data command after any write data commands. So after writing data, if the next command passed to R/W block 403 from SCSI is anything other than another write command, R/W block 403 will start writing an EOD before executing the next SCSI command. The EOD will always start twelve frames after the last frame of the last group in the current partition. The EOD is 300 frames. Each frame's main data is all zeros, and the sub codes are just pack items #3 and #4. For the location of the EOD on a tape with data already written, see FIG. 16. For a description of the data fields in the pack items, see FIG. 13.

After the EOD is written that partition's system log is written also if it needs to be updated.

FORMAT TAPE

A DDS tape can either be formatted as a 1 or 2 partition tape. Before a tape can be used, it must be first formatted. The format process puts information onto the tape which is needed prior to writing any user data onto the tape. The format process also makes any previous data on the tape invalid.

The partitions on the tape are labeled such that the last partition on the tape is always partition number 0. If there are 2 partitions, then the first partition is always labeled partition 1. Partition 0 is always the default partition. All partitions on the tape contain four areas: reference area, system area, data area, and end of data area. The first partition on the tape will always start with an additional area called the Device Area.

To change the number of partitions on the tape, the tape must be reformatted and all previous data will be lost.

When the tape is formatted as a 1 partition tape, the entire length of the tape is used as partition 0. The tape will consist of 5 areas: device area, reference area, system area, data area, and the end of data area. The DDS format does not require that any data be written into the device area. So during the format, only the other four areas will be written. This must be written as a continuum. (See FIG. 14).

The device area starts on the tape at the beginning of media which is just after the tape's leader. The device area consists of three parts: spin up, test, and guard. The spin up space is where the tape should be whenever a tape cartridge is inserted into the mechanism. This area allows the capstan and head drum to rub against the tape without destroying any tape information. The spin up space is 300 mm±8½ mm. The test space on the tape is a place where had and tape read/write performance can be tested prior to reading or writing on a nonwrite protected tape. Any information in this area is user defined. The test space is 40 mm±½ mm. The guard space is the last space of the device area. The guard space is to allow for test space overrun. The guard space separates the device area from the reference area. The guard space is 10 mm±1 mm.

The reference area starts after the guard space of the device area. The reference area consists of two parts, the main reference space and the end of reference space guard. All reference area frames have sub codes of pack items #3 and #4, (see FIG. 13), with the main data area of the frame being all set to zeros. The main reference space is the start of writing DDS formatted data and always starts with an AFC of 1. The main reference space is 35 frames. The end of reference space always starts with an AFC of 36 and is from 0–10 frames, with the nominal number of frames being 5 frames. This guard space allows for update in place of the system area without diminishing the 35 frames of main reference space.

The system area starts after the guard space of the reference area. The system area consists of five parts: the system preamble space, the system log space, the system postamble space, the system guard space, and the vendor group preamble space. When updating the system log of a partition, the system preamble space, the system log space, and the system postamble space are all written during one continuous write motion (see FIG. 16).

The system preamble space is the start of the system area and always starts with an AFC of 41. The system preamble is 30 frames of sub codes, pack items #3 and #4, (see FIG. 13) with the main data area of the frame being all set to zeros. The system preamble space is re-written every time the system log is updated for the current partition.

The system log space is the part of the system area that contains the accumulated statistics on the current partition. The system log space always starts with an AFC of 71 and is 25 frames of sub codes, pack items #3, #4, #5, #6, #7 and #8 (see FIG. 13), with the main data area of the frame being all set to zeros. For a detailed description of the data fields of these pack items, see ANSI Helical-Scan Standard referenced above. The system log space is re-written every time the system log is updated for the current partition.

The system postamble space always starts with an AFC of 96. The system postamble is 10 frames of sub codes, pack items #3 and #4 (see FIG. 13), with the main data area of the frame being all set to zeros. The system postamble space is re-written every time the system log is updated for the current partition.

The system guard space always starts with an AFC of 106. The system guard space is 0–30 system area guard frames after the system postamble space. The nominal number of frames being 15 frames. This guard space allows for update in place of the system area without diminishing the 65 frames of the continuum formed by the system preamble space, the system log space, and the system postamble space.

The vendor group preamble space always starts with an AFC of 121. The vendor group preamble space is 30 frames of sub codes, pack items #3 and #4, (see FIG. 13) with the main data area of the frame being all set to zeros.

The data area of a partition always starts with an AFC of 151 and a vendor group. The vendor group being the first group of the partition. The vendor group is written using the default values for RAW and C3 ECC. The vendor group will not be written using N-group writing. The vendor group will contain the data as described in FIG. 15. The vendor group is the only group in the current partition which does not have a GIT and/or BAT entries. The sub codes have pack items #1, #2, #3, and #4, (see FIG. 13). The vendor group has all of the counting fields in pack items #1 and #2 set to zero.

After the vendor group there must be at least 12 amble frames written if there is no user group ready to be written. These 12 amble frames are required such that a nonseamless append can occur after the vendor group when a user group is ready to be written. In fact, whenever a write operation has completed, there must always be 12 amble frames after the last group in the current partition. These 12 amble frames are the end of the data area.

The end of data area (EOD area) is always at least 12 frames away from the last group in the current partition. EOD frames are appended after the 12th data area amble frame. The EOD is at least 300 frames of sub codes, pack items #3 and #4, (see FIG. 13) with the main data area of the frame being set to zeros.

A tape is formatted by one of two methods. If a blank tape is detected, then the first write to that tape causes the R/W block 403 to first format the tape as a one partition tape before any user data is written. If a two partition tape is detected and the SCSI command is to make the tape a one partition tape, then the R/W block 403 commences to format the tape as a one partition tape. The following is the sequence taken by the R/W block 403 to format a one partition tape:

MOVE TO START OF REFERENCE AREA

PO reference area (AFC 1-40)
    Write 35 reference frames (AFC 1-35)
        Pack item #3
        Pack item #4
    Write 5 guard reference frames (AFC 36-40)
        Pack item #3
        Pack item #4
PO system area (AFC 41-150)
    Write 30 system preamble frames (AFC 41-70)
        Pack item #3
        Pack item #4
    Write 25 system log frames (AFC 71-95)
        Pack item #3
        Pack item #4
        Pack item #5
        Pack item #6
        Pack item #7
        Pack item #8
    Write 10 system postamble frames (AFC 96-105)
        Pack item #3
        Pack item #4
    Write 15 system postamble guard frames (AFC 106-120)
        Pack item #3
        Pack item #4
    Write 30 system vendor group preamble frames (AFC 121-150)
        Pack item #3
        Pack item #4
PO data area (AFC 151-484)
    Write vendor group (AFC 151-172)
        Pack item #1
        Pack item #2
        Pack item #3
        Pack item #4
    Write 12 amble frames (AFC 173-184)
        Pack item #1
        Pack item #2
        Pack item #3
        Pack item #4
    Write 300 EOD frames (AFC 185-484)
        Pack item #3
        Pack item #4

MOVE TO APPEND POINT FOR END OF VENDOR GROUP

When a tape is formatted as a 2 partition tape, the first partition is a fixed length partition, partition 1, and the second partition is the rest of the tape, partition 0 the default partition. If a SCSI write command is issued before a tape has been formatted, then the R/W block 403 will format the tape as a 1 partition tape. If SCSI issues a format command with partition size of zero, then the R/W block 403 will format the tape as a 1 partition tape. If SCSI issues a format command with medium partitions parameter page set up for two partitions, then the R/W block 403 will format the tape as a 2 partition tape with the first partition, partition 1, being the size requested with a minimum value of 2,496 frames. SCSI will request partition 1 sizes in increments of 1 mega-byte (1,048,576). This value will be translated into 256 frames per 1 mega-byte increment. That is, for every mega-byte of partition 1 size requested, the R/W block 403 will add 256 frames to the 2,496 frames minimum value. This all translates into the following:

1 group=245×512 byte blocks=125,440 bytes user data
    9×1 group=1,128,960 bytes user data
    234 frames=9×(23 frames per group+3 append ambles) 256 frames=234 frames+22 RAW frames When the tape is formatted as a two partition tape, the entire length of the first partition, partition 1, will be written. The tape will consist of nine areas: device area P1, reference area P1, system area P1, data area P1, EOD area P1, reference area P0, system area P0, data area P0, and EOD area P0. The DDS format does not require that any data be written into the device area. So during the format, only the other eight areas of the tape will be written. This must be written as a continuum. (See FIG. 17)

The first partition on a DDS tape is the only partition with a device area. The device area is the same as described above for the one partition tapes.

Partition one's reference area is the same as partition zero on a single partition tape explained in the section on one partition tapes.

The system area of the first partition on a two partition tape contains the accumulated history of the entire tape. During a format pass, all of this data is initialized to zero. Whenever a field reaches its maximum value for that field size, the field is no longer updated.

Figure 17:
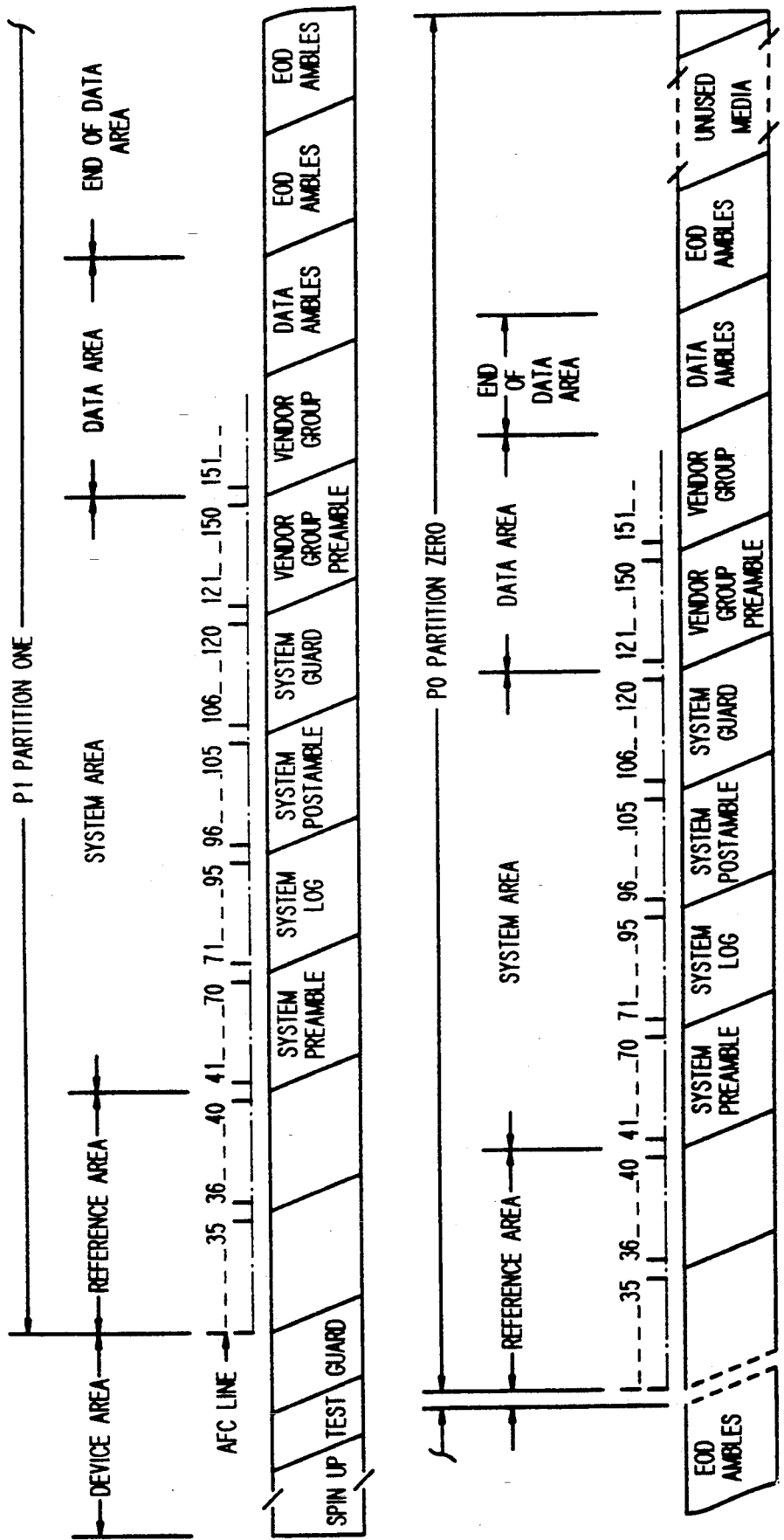
FIG. 17 for where the system log is located on a two partition tape according to the present invention.

The data area of the first partition is specified by the host. A minimum size first partition data area is shown in FIG. 17. For each increment the host unit requests, the first partition's EOD area will increase by 256 frames. When data gets written to the first partition's data area, the frames are taken from the EOD area. When the EOD area becomes less than 2,345 frames, an early warning for logical end of tape is given to the host unit and marked in the BAT entries of all subsequent groups written to the tape in the first partition.

The end of data area (EOD) of the first partition is written to the logical end of that partition. The last frame of the fist partition's EOD is the value used in the maximum absolute frame count in the sub codes. The EOD of the first partition is made up of three parts, the EOD reserved for the data area, the EOD reserved for logical end of tape (LEOT), and the EOD reserved for synthetic end of media (SEOM).

The format operation reserves the user data size requested as EOD frames. As data gets written to the first partition, these EID frames get written over with data area frames.

The LEOT EOD frames are reserved to allow for 500 mm between the data area and the end of the partition. The data area may overrun into this space, but the host unit must be notified that data is being written into the LEOT area. Also, the R/W block 303 will mark the BAT entries of all records written in the LEOT with the after LEOT bit set.

The SEOM EOD frames are never to be written over except when re-formatting the tape. These frames are reserved to allow system 400 to find the start of partition 0 at 200× search speed.

The only differences in the reference areas between partitions is the area-ID in pack items #3 and #4. See FIG. 13 for the pack items and see FIG. 17 for the location of the reference area for partition 0 on a two partition tape.

The only differences in the system areas between partitions is the area-ID in pack items #3 and #4 and count fields are just the accumulation for only the second partition, partition 0.

The only differences in the data areas between partitions is the area-ID in pack items #3 and #4. See FIG. 13 for the pack items and see FIG. 17 for the location of the data area for partition 0 on a 2 partition tape.

The end of data (EOD) area on the second partition, partition 0, of a two partition tape is only 300 frames. The early warning for EOT has to be calculated dynamically.

A tape will be formatted by one of two methods. When SCSI requests a two partition tape format on a blank tape, the R/W block 403 will format the tape as a two partition tape. If a one partition tape is detected and SCSI requested a two partition tape format, the R/W block 403 will format the tape as a two partition tape. The following is the sequence taken by the R/W block 403 to format a two partition tape:

MOVE TO START OF REFERENCE AREA

P1 reference area (AFC 1-40)
  Write 35 reference frames (AFC1-35)
    Pack item #3
    Pack item #4
  Write 5 guard reference frames (AFC 36-40)
    Pack item #3
    Pack item #4
P1 system area (AFC 41-150)
  Write 30 system preamble frames (AFC 41-70)
    Pack item #3
    Pack item #4
  Write 25 system log frames (AFC 71-95)
    Pack item #3
    Pack item #4
    Pack item #5
    Pack item #6
    Pack item #7
    Pack item #8
  Write 10 system postamble frames (AFC 96-105)
    Pack item #3
    Pack item #4
  Write 15 system postamble guard frames (AFC 106-120)
    Pack item #3
    Pack item #4
  Write 30 system vendor group preamble frames (AFC 121-150)
    Pack item #3
    Pack item #4
P1 data area (AFC 151-. . . )
  Write vendor group (AFC 151-172)
    Pack item #1
    Pack item #2
    Pack item #3
    Pack item #4
  Write 23 amble frames (AFC 173-195)
    Pack item #1
    Pack item #2
    Pack item #3
    Pack item #4
  Write 2,045 EOD frames (AFC 196-2240)
  This is start of logical end of tape (LEOT)
    Pack item #3
    Pack item #4
  Write 300 EOD frames (AFC 2241-2540)
  This is start of synthetic end of media (SEOM)
    Pack item #3
    Pack item #4
P0 reference area (AFC 1-40)
  Write 35 reference frames (AFC 1-35)
  This is logical beginning of tape (LBOT)
    Pack item #3
    Pack item #4
  Write 5 guard reference frames (AFC 36-40)
    Pack item #3
    Pack item #4
P0 system area (AFC 41-150)
  Write 30 system preamble frames (AFC 41-70)
    Pack item #3
    Pack item #4
  Write 25 system log frames (AFC 71-95)
    Pack item #3
    Pack item #4
    Pack item #5
    Pack item #6
    Pack item #7
    Pack item #8
  Write 10 system postamble frames (AFC 96-105)
    Pack item #3
    Pack item #4
  Write 15 system postamble guard frames (AFC 106-120)
    Pack item #3
    Pack item #4
  Write 30 system vendor group preamble frames (AFC 121-150)
    Pack item #3
    Pack item #4
P0 data area (AFC 151-. . . )
  Write vendor group (AFC 151-172)
    Pack item #1
    Pack item #2
    Pack item #3
    Pack item #4
  Write 12 amble frames (AFC 173-184)
    Pack item #1
    Pack item #2
    Pack item #3
    Pack item #4
  Write 300 EOD frames (AFC 185-484)
    Pack item #3
    Pack item #4

MOVE TO APPEND POINT FOR END OF VENDOR GROUP OF PARTITION 0

Write Data To Tape

The R/W block 403 will write data to tape only when there is a completed group waiting to be written. Groups are considered completed whenever SCSI has transferred enough user data to fill a group completely or whenever an internal time-out expires and the current group gets padded to its end. When writing data, seven DDS areas are affected. These are: system area, group data area, frame data area, track data area, main data area, sub code data area, and read after write (RAW) data area. The following explains each of these areas. (See Seamless Append Read/Write Head and Software Sequence description below for the software programming sequence.)

The system data on the tape is a log of the tape and partition usage. The R/W block 403 must keep track of and update eleven fields in the system area. These fields are: previous groups written, total groups written, previous groups read, total groups read, total repeated frames, total C3 ECC retry count, load count (first partition only), previous repeated frames (second partition of a 2 partition tape only), and previous C3 ECC retry (second partition of a 2 partition tape only).

The system log is written whenever system log data in memory has changed since the last time that partition's system log has been written and it is time to update the system log. There are three different cases when the system log will be updated.

The current partition's system log is updated whenever the system log updates time-outs and the system log has changed.

The current partition's system log is updated whenever the tape is positioned to the other partition. All partition system logs are updated whenever the cassette is ejected.

The previous groups written field is a 20 bit value which is the number of groups physically written to the tape or partition since the last update, but one, of the system area. Where N-group writing is in force, this count increments for each instance i.e., once for each N-groups. The maximum value for this field is 1,048,575, which does not roll over. (See FIG. 13)

The total groups written field is a 4 byte value which is the total number of groups physically written to the tape or partition since the first time the tape or partition was written. The number accumulates over the life of the tape but is zeroed by the format pass. Where N-Group writing is in force, this count increments for each instance i.e., once for each N-groups. The maximum value for this field is 4,294,967,295, which does not roll over. (See FIG. 13)

The previous groups read field is a 20 bit value which is the number of groups physically read from the tape or partition since the last update, but one, of the system area. The maximum value for this field is 1,048,575, which does not roll over. (See FIG. 13)

The total groups read field is a 4 byte value which is the total number of groups physically read from the time or partition since the first time the tape or partition was written. This does not include any reading as part of a RAW check. The number accumulates over the life of the tape but is zeroed by a format pass. The maximum value for this field is 4,294,967,205, which does not roll over. (See FIG. 13)

The total repeated frames field is a 3 byte value which is the total number of frames on the tape or within the partition that have needed to be repeated because of a RAW check failure since the tape or partition was first written. It is incremented by 1 each time a frame is repeated. This count does not include any frames which are written between the original frame and the repeated frame. The number accumulates over the life of the tape but is zeroed by a format pass. The maximum value for this field is 16,777,215, which does not roll over. (See FIG. 13)

The total C3 ECC retry count field is a 3 byte value which is the number of groups which have been physically read and data has not been recovered without requiring the use of C3 ECC correction since the first time the tape or partition was written. The number accumulates over the life of the tape but is zeroed by a format pass. The maximum value for this field is 16,777,215, which does not roll over. (See FIG. 13)

The load count (first partition only) field is a 2 byte value which is the number of times the tape has been loaded since the first time a tape was written. One load consists of threading the tape around the head drum in the drive, positioning the tape ready for use and later unthreading the tape. The number accumulates over the life of the tape but is zeroed by a format pass. This field is reserved in the system log of partition 0 of a 2-partition tape. The maximum value for this field is 65,535, which does not roll over. (See FIG. 13)

The previous repeated frames (first partition only) field is a 2 byte value which is the number of frames on the tape in partition 1 that have needed to be repeated because of a RAW check failure since the last update, but one, of the system area. It is increment by 1 each time a frame is repeated. This count does not include any frames which are written between the original frame and the repeated frame. The maximum value for this field is 65,535, which does not roll over. (See FIG. 13)

The previous C3 ECC retry (first partition only) field is a 2 byte value which is the number of groups in partition 1 which have been physically read and the data has not been recovered without requiring the use of C3 ECC correction since the last update but one of the system area. The maximum value for this field is 65,535, which does not roll over. (See FIG. 13)

The previous repeated frames (second partition of a 2 partition tape only) group is a 2 byte value which is the number of frames on the tape in partition 0 that have needed to be repeated because of a RAW check failure since the last update, but one, of the system area. It is increment by 1 each time a frame is repeated. This count does not include any frames which are written between the original frame and the repeated frame. The maximum value for this field is 65,535, which does not roll over. (See FIG. 13)

Previous C3 ECC retry (second partition of a 2 partition tape only) group is a 2 byte value which is the number of groups in partition 0 which have been physically read and the data has not been recovered without requiring the use of C3 ECC correction since the last update but one of the system area. The maximum value for this field is 65,535, which does not roll over. (See FIG. 13)

A DDS group is made up of four parts. These are the user data area, the block access table (BAT) entry area, the group information table (GIT) area, and the optional C3 ECC area.

The user data area occupies the lower memory address space of the group. The user data is the SCSI bock data which is sent to the data flow system 400. This data fills the group starting at the lowest address of the group in memory and increments to the highest address of the group. The user data is transferred from the SCSI port into the DRAM 404 through the buffer manager 303 DMA channel number 1. (See FIG. 7)

The BAT always starts 32 bytes from the end of the group, the highest address of the group in memory. Each BAT entry is written into the group decrementing in memory from the highest address to the lowest address. Each BAT entry will be written one byte at a time into the group in DRAM 404 through the buffer manager 303 MPU port. (See FIGS. 7, 8, and 9)

The GIT always occupies the last 32 bytes of a group, at the highest address of the group in memory. While the group is being constructed, the GIT will be assembled in the SRAM 417. When the group is complete, the GIT will be added to the group. The GIT is written one byte at a time into the group in DRAM 404 through the buffer manager 303 MPU port, starting at the end of the group 32 bytes incrementing to the end of the group in memory. (See FIG. 7)

The C3 ECC data is an entire DDS frame's worth of data. A 256K DRAM 404 embodiment has only one C3 ECC frame, which is at a fixed location in DRAM memory. This frame is created by initiating ECC in buffer manager 303. Once buffer manager 303 has created the C3 ECC frame, there is no other preparation needed. The C3 ECC frame is the last frame of a group to be DMA'd from DRAM 404 to SRAM 417.

A DDS frame has three areas that need to be managed. They are the frame header area, the user data area, and the unused zero filled data area. The frame header and user data have to be controlled for every DDS frame written to tape. The unused zero filled data area of the frame only has to be initialized in SRAM 417 memory once, at the start of each write operation. (See FIG. 10)

The frame header is four bytes, two bytes of data for each track. The two bytes are identical for each track. These two bytes are divided into three fields: the data format ID (DFID), the logical frame ID (LF-ID), and the reserved fields (RES). (See FIGS. 10 and 11)

The DFID is four bits and is always 0000b for the DDS format. These bits are initialized in the SRAM 417 memory once, at the start of each write operation. The DFID is the least significant four bits written into the SRAM 417 memory's track buffer, at offset byte two. (See FIG. 11)

The LF-ID is one byte. It is the only part of the frame header that is unique for each frame. The LF-ID is the byte written into the SRAM 417 memory track buffer at offset byte zero. (See FIG. 11)

The RES is four bits and is always 0000b for the DDS format. These bits are initialized in the SRAM 417 memory once, at the start of each write operation. The RES is the most significant four bits written into the SRAM 417 memory's track buffer, at offset byte two. (See FIG. 11)

The user data for a frame is DMA'ed from the group in the DRAM 404. The DMA is from the DRAM memory through buffer manager 303, DMA port 2, into the SRAM 417 memory's frame buffer. During the DMA operation, the formatter 210 will randomize and interleave the user data according to the DDS format. The R/W block 403 will DMA 5, 756 bytes of data for each frame. (For further detail, see ANSI Helical-Scan Standard and the formatter patent application referenced above.)

Each logical DDS frame is 64 bytes less than a DAT physical frame. These 64 bytes are defined by the DDS standard to be all zeros. These bytes are initialized in the SRAM 417 memory once, at the start of each write operation. The R/W block 403 will DMA from a special byte, which will be initialized to zero, in the DRAM 404 memory 64 times into the SRAM 417 memory frame buffer. This is done for the first three frames written at the start of each write operation. (See FIG. 10)

A DDS frame is subdivided into two DDS tracks when data is being written to tape. Each track has seven distinct area. They are the margin 1 marginal area, the sub code data area 1, the automatic track follower area (ATF) Area 1, the main data area, the AFT area 2, the sub code data area 2, and margin marginal area. (See Table III)

Each frame of data is subdivided into two DDS tracks. Each track is written by either the plus Azimuth or the minus Azimuth head. The plus Azimuth head is sometimes denoted by track A and the minus Azimuth head denoted by track B. Every frame consists of one A track and one B track. The data must also be written A track first and B track second. For more details on the tracking parameters, see ANSI Helical-Scan Standard referenced above. Each of these tracks is further subdivided into seven distinct areas. They are the margin 1 marginal area, the sub code data area 1, the automatic track finding (ATF) area 1, the main data area, the AFT area 2, the sub code data area 2, and margin 2 marginal area. (See Table III)

The margin 1 marginal area is the first area on the track. It is made up of 11 blocks of all ones. This area is automatically written by the formatter 410.

The sub code data area 1 is the first sub code data to be written onto the tape. The sub codes are divided in half and the first half is written in sub code data area 1. The software must write one sub code data double block pair. The formatter 410 will automatically write this double block pair four times in the sub code data area 1.

The sub code data double block pair is made up of eight byte pack items. The eighth byte of each pack item is the XOR summation of the other seven bytes. This parity byte is calculated by the software. The eighth pack item is the C1 ECC parity bytes for the other seven pack items. These parity bytes are calculated automatically by the formatter 410.

The C1 ECC parity bytes cover the sub code data areas as well as the main data areas. These bytes are automatically generated and put into the data stream by formatter 410.

Each pack item consists of eight bytes, seven bytes of data and one byte of parity. This parity byte is the exclusive OR of the data bytes. The parity bytes for each pack item must be generated by the software and written to memory with the other data bytes of the pack item.

The automatic track finding (ATF) data pattern is automatically generated by the formatter 410.

The main data area is protected by C1 ECC parity bytes, $C^2$ ECC parity bytes, and a two byte checksum for each track.

Just like the sub code data ares, the parity bytes for the main data area are automatically generated and put into the data stream by formatter 410.

The $C^2$ ECC parity bytes are generated by the formatter 410 one track per command. The C1 ECC parity bytes cover the $C^2$ ECC parity bytes, so the $C^2$ ECC parity bytes must always be generated first. Formatter 410 will automatically generate these parity bytes.

Each track has a two byte checksum. This checksum covers the main data area and the header bytes. The formatter 410 will automatically generate the checksum bytes for the main data during the DMA of each frame from DRAM 404 to SRAM 417, when the formatter 410 is programmed properly. The software must exclusive OR the header bytes with the formatter 410 generated checksums to get the proper values. These values are then stored in the sub code pack items.

The automatic track finding (ATF) data pattern is automatically generated by the formatter 410. Sub code data area 2 is identical to sub code Data area 1.

The margin 2 marginal area is the last area on the track. It is made up of 11 blocks of all ones. This area is automatically written by the formatter 410.

The main data consists of five parts. They are the main data itself, 5,756 bytes: the zero filled data, 64 bytes of all zeros; the track headers, 2 bytes for each track; the C1 ECC parity; and the $C^2$ ECC parity. When writing, the zero fill bytes are written only once to each frame buffer. Only the LF-ID of each track header is written for each frame. The $C^2$ ECC parity is initiated by the software to be generated by the formatter 410, and the same is done for the C1 ECC parity bytes which are written to the tape on-the-fly.

The sub code data consists of eight pack items. One of the pack items is filled with C1 ECC parity bytes which are written to the tape on-the-fly. Another pack item is filled with all zeros. The other six pack items data content are dependent on what area is being written on the tape. (See FIG. 13)

Read after Write (RAW) verifies that during a data write operation to tape that the data being written is recoverable. The system reads the track just after it has been written and C1 ECC error pointers are generated. These pointers are used to locate and correct any main data errors. Also, the formatter 410 will generate randomized track checksum bytes. The main data error correction values are XORed with the track checksum bytes and the results are XORed with the track checksum de-randomizer bytes. This result is compared with the checksum that is in the RAM copy to verify that the main data is recoverable.

READ DATA FROM TAPE

The R/W block 403 will read data from tape in only two situations. Whenever a tape is read for the first time, the system area data has to be read for partition one if it exists, and always from partition zero, the default partition. The other case when the tape is read is when SCSI requests blocks of data. When searching for the data in the two situations above, sub codes are read to locate the data that needs to be read. (See the Read/Write Head and Software Sequence below for the software programming sequence.)

The system data construction is identical to the description above starting at WRITE DATA TO TAPE. The system log is read into the SRAM 417 as shown in Table IV. This data is then updated whenever a field changes. Each partition's system log is written back to the tape whenever the tape is to be moved to the other partition, or whenever the tape is to be unloaded.

The sub code data construction is identical to the description given above. Only one sub code block pair is saved for each track. The block pair stored into the SRAM 417 is either the first block pair with all zero C1 ECC syndrome bytes or the last block pair read. So to verify that the sub code block pair is valid, the R/W block 403 must verify that the C1 ECC syndrome bytes are all zero. When reading data, it is important that the checksum information in the sub code data is available such that the frame just read can be checked for a valid checksum.

The track data construction is identical to the description given above. Each track is read with C1 ECC syndrome bytes generated on-the-fly. Once a track has been completely read, the C1 ECC errors are corrected, if possible, by the software. When the C1 ECC correction is complete, the software initiates $C^2$ ECC syndrome byte generation. When this is complete, the $C^2$ ECC errors are corrected, if possible, by the software. If not all $C^2$ ECC errors can be corrected, the track is marked for C3 ECC erasure correction.

The frame data construction is identical to the description given above. Once $C^2$ ECC error correction has completed for both tracks of a frame, that frame is then DMA'ed from the SRAM 417 to the DRAM 404. This DMA process also generates the checksum bytes for each track. To validate the checksums, the software must add the header bytes from the tracks to their respective checksums. Then these checksums are compared with the checksums in the sub code data. If a frame is known to have $C^2$ ECC errors in either of its tracks, those tracks are marked as C3 ECC erasure tracks. If a frame is found to be repeated (RAW), the DMA pointer into the DRAM 404 will be reset to that frame's start in the group. A frame's start address in a group is the group's start address+the frame number times 5,756 bytes. A frame is repeated whenever the LF-ID count becomes out of sequence.

The group data construction is identical to the description given above. A group is the smallest user data entity that can be read from a DDS tape. So for any SCSI data block request, the groups containing the block's data must be read. The BAT entries in each group provide pointers to the data blocks being requested by SCSI. The R/W block 403 passes these pointers to the SCSI block, such that the SCSI block can DMA the user data blocks to the host.

TIMING REQUIREMENTS

R/W block 403 timing in only critical when the data flow system 400 is either reading SCSI blocks or writing SCSI blocks. The write timing must allow tape streaming continuously during each SCSI write command. The read timing must allow tape streaming continuously during each SCSI read command as long as there is no need for C3 ECC error correction. For more details see the formatter patent application referenced above.

The write timing requirements fall into four areas. Three of these include software: the track timing, the frame timing, and the group timing; the other, the tape byte transfer rate, includes no software control from the R/W block 403.

The write byte transfer rate is 183 Kbytes/second for the DAT audio format. The data flow system 400 is capable of write byte transfer rates exceeding 233 Kbytes/second.

The track timing is regulated by the head speed. For the audio DAT, each head will contact the tape for 7½ milliseconds. For the data flow system 400 at 200 Kbytes/second each head will contact the tape for 6.9 milliseconds. Of this 6.9 milliseconds, the data flow system 400's other software blocks will use about 50%. So this really leaves about 3.45 milliseconds for the R/W block 403 to prepare for the next head sweep. For the sequence of events that must occur for each head sweep, see the Seamless Append discussion below.

C1 ECC parity bytes are calculated and inserted into the data stream on-the-fly by the formatter 410. The formatter 410's normal mode of operation will always be to generate C1 ECC parity and syndromes on-the-fly. This means the R/W block 403 does not have to initiate these two processes.

$C^2$ ECC parity bytes are generated by the formatter 410. This has to be a R/W block 403 initiated process. After the frame has been DMA'ed from the DRAM 404 into the SRAM 417, the LF-ID bytes for each track must be inserted at the start of the track's buffer. After the LF-ID has been stored in the SRAM 417, each track can have its $C^2$ ECC parity bytes generated and stored into that track's buffer. Each track's $C^2$ ECC parity bytes must be generated separately. This takes about 550 microseconds for each track. This allows for the $C^2$ ECC parity bytes to be generated for an entire frame in one head's sweep time.

Once the formatter 410 has been initialized for a read or write operation, the writing to the formatter 410 requires a minimal amount of time at each head sweep. This total time per head sweep does not exceed 50 microseconds.

For each track the R/W block 403 must calculate and write the LF-ID (1 byte per track), the W1 main data IDs (8 bytes per frame), and the SW1 and SW2 of the even and odd blocks for the sub code IDs (4 bytes per frame).

The frame timing is synchronized with the head sweeps. At the start of each Read A head, the next frame is DMA'ed from the DRAM 404 group buffer into the SRAM 417 frame buffer. The DMA process takes about 4.3 milliseconds. So the DMA is started at the start of one head sweep and will be completed prior to the start of the next head sweep. There is not enough time for the R/W block 403 to start a DMA process and act on the process during one head sweep time.

The formatter 410 can DMA one frame (5,756 bytes) in about 4.3 milliseconds. During the DMA process, the frame's data will be interleaved and randomized. Before the start of the DMA, the initialize DMA register must be written to initialize all of the DMA pointers and counters, which includes the checksum registers.

After a frame has been DMA'ed into the SRAM 417, the formatter 410 checksum registers will hold the track checksums for that frame. To make the checksums valid DDS checksums, the high byte of each checksum must be XOR'ed with the LF-ID of the frame. Each checksum byte needs to be read from the formatter 410 and two of the bytes can be written directly into the sub code pack items in the SRAM 417. The other two bytes must be first XOR'ed with the LF-ID and then written into the sub code pack items in the SRAM 417. This will be four formatter 410 register reads, two SRAM 417 reads, two XOR's, and four SRAM 417 writes. This all should take less than 20 microseconds.

On each read head sweep during write operations, RAW will be checked. See the Seamless Append description below for the proper R/W block 403 sequence. At the start of each write head, the formatter 410 is set up for the next read head. This must include the clearing of the formatter 410's status register, the read track checksums, and the BAD C1 block counter. Beginning at the start of the read head, the BAD C1 block counter will be checked for a non-zero value. If it is non-zero, the R/W block 403 will start calculating C1 ECC correction values. If the number of main data C1 errors do not exceed the allowable limits and there is no missing first block detected or bad track detected errors, then a correction checksum will be calculated for the track. The correction checksum is calculated by the XOR of the C1 single error correction values with the read track checksum and the de-randomizer value for that track and checksum byte. See the formatter patent application referenced above for further details.

The de-randomizer bytes are, 0C4h for track A high byte, 2Dh for track A low byte, 02h for track B high byte, and 2Bh for track B low byte. These four values are fixed constants.

The sub code data for each frame consists of eight, eight byte pack items repeated eight times for each track. Six of the pack items have data about the tape, and change along the length of the tape. Each of these six pack items have seven bytes of pack data and one byte, the last byte, a parity byte. The pack data and the parity byte must be updated for each frame. The seventh pack item will always have eight zero bytes written. The eighth pack item is the C1 ECC parity bytes for the sub code block of data. This eighth pack item is generated automatically on-the-fly by the formatter 410. For the complete data structure of the pack items see FIG. 13.

Of the 56 pack item data bytes only 14 bytes are changed for every frame. At the start of each group all 56 bytes could possibly change. This will take about 900 microseconds.

Each group is built up in the DRAM 404 buffer a piece at a time. As each SCSI block of data is DMA'ed into the DRAM 404, the BAT entries and the GIT (SRAM 417) data is updated. Once a group is filled the BAT entries are completed, the GIT in the SRAM 417 is completed and moved into the DRAM 404, and the C3 ECC parity frame is constructed. The completion of the BATs and the GIT must be done before the C3 ECC parity frame can be constructed, but the group can start to be DMA'ed into the SRAM 417 before the C3 ECC parity frame is completed as long as the C3 ECC parity frame is completed before that frame has to be DMA'ed into the SRAM 417.

The GIT will be constructed in SRAM 417 for each group. Once the group is completed, then the GIT will be moved into the group in the DRAM 404. This allows the BAT entries to have exclusive use of the buffer manager 303 MPU port. When the group is completed the MPU port can be changed for the GIT table and the GIT table moved over into the DRAM 404 all at one time.

Before the grant of any SCSI DMAs, the R/W block 403 will write the number of BAT entries into the group corresponding to the number of SCSI blocks transferred. Each BAT entry will be written into the DRAM 404 through the buffer manager 303 MPU port. Each byte write will automatically decrement the MPU memory pointer for the next byte. This allows the BAT entries to grow from high memory to low memory in the group. During the construction of a group, the MPU address only as to be initialized once. Then the MPU address pointer automatically decrements. With this scheme, the MPU address cannot be changed until all of the BAT entries have been written for the current group.

The C3 ECC parity frame will be constructed once a group is complete. That is, once a group has had its GIT written. This process can start any time after the group is complete but before the DMA of the last data frame of the group. The buffer manager 303 takes about 66 milliseconds to completely construct the C3 parity frame.

The read timing requirements fall into four areas. Three of these include software: the track timing, the frame timing, and the group timing; and the other, the tape byte transfer rate, includes no software control from the R/W block 403.

The write byte transfer rate is 183 Kbytes/second for the DAT audio format. The data flow system 400 will be capable of write byte transfer rates exceeding 200 Kbytes/second.

The track timing is regulated by the head speed. For the audio DAT, the head will contact the tape for 7½ milliseconds. For the data flow system 400 at 200 Kbytes/second the head will contact the tape for 6.9 milliseconds. This is the amount of time that the R/W block 403 has to prepare for the next head sweep. Of this 6.9 milliseconds the data flow system 400's other software blocks will use about 50%. This leaves approximately 3.45 milliseconds for the R/W block 403 to prepare for the next head sweep. For the sequence of events that must occur for each head sweep, see the Seamless Append description below.

C1 ECC syndrome bytes are calculated and inserted into the data stream on-the-fly by the formatter 410. The formatter 410's normal mode of operation will always be to generate C1 ECC syndromes on-the-fly. This means the R/W block 403 does not have to initiate this process. Once the syndromes have been calculated the R/W block 403 must correct any single byte errors in the sub code data and the main data.

A single byte correction plus overhead takes about 80 microseconds. If one track needed all corrections to be made, it would take about 10.4 milliseconds. Therefore, the maximum number of corrections that can be done on one track is approximately 50 data blocks out of the total 130, which includes the two sub code data blocks. This is 38.46% of the number of data blocks. The result is that more than 30% of a track may have single byte C1 ECC errors and system 400 will still be able to stream.

C2 ECC syndromes bytes are generated by the formatter 410. This has to be a R/W block 403 initiated process. After the C1 ECC single bytes errors have been corrected, the R/W block 403 can start C1 ECC error correction. At the start of each read head the previous track's C1 ECC correction is completed and the C2 ECC correction will commence.

The C2 ECC syndrome generation will continue until a non-zero syndrome has been calculated. So once the R/W block 403 starts the syndrome calculations, the formatter 410 C2 stopped flag will be polled. When this flag is set either syndrome generation has completed or a non-zero syndrome has been calculated. If there has been a non-zero syndrome calculated, the R/W block 403 must first read the formatter 410 C2 block address register, then restart C2 ECC syndrome generation. To correct a single C2 ECC error takes about 120 microseconds. Each C2 correction window has about 3 milliseconds of time. So 50 C2 ECC single byte errors can be corrected per track on-the-fly and the tape system will continue streaming. Therefore, 44.6% of the C2 ECC blocks can have single byte errors and the R/W block 403 can correct them and not stop the tape from streaming.

The C2 ECC error correction syndromes can correct up to three unknown errors, and six known errors. To do this requires extensive processor time which will stop the tape system from streaming. Therefore this type of correction is done during tape reposition cycles.

Once the formatter 410 has been initialized for a read or write operation, the writing to the formatter 410 requires a minimal amount of time for each head sweep. This total time per head sweep will not exceed 50 microseconds.

The frame timing will be synchronized with the head sweeps. At the start of each read A head the next frame will be DMA'ed from the SRAM 417 frame buffer into the DRAM 404 group buffer. The DMA process takes about 4.3 milliseconds. The DMA will be started at the start of one head sweep and will be completed at the start of the next head sweep. There is insufficient time for the R/W block 403 to start a DMA process and act on the process during one head sweep time.

The formatter 410 can DMA one frame (5,756 bytes) in about 4.3 milliseconds. During the DMA process, the frame's data will be de-interleaved and de-randomized. Before the start of the DMA the initialize DMA register must be written to initialize all of the DMA pointers and counters, which includes the checksum registers.

The checksum for a frame cannot be calculated until the frame has been DMA'ed from the SRAM 417 into the DRAM 404. The checksum values read from the formatter 410 exclude the frame header. So before comparing the frame checksum with the values stored into the sub code, the R/W block 403 must XOR the frame headers with the checksum values read from the formatter 410.

This entire process will be four formatter 410 register reads, two SRAM 417 reads, two XOR's, four more SRAM 417 reads, and two word compares. This should take less than 35 microseconds.

Each group is built up in the DRAM 404 a frame at a time. Once all of the frames are present, a group is complete. If the group includes a C3 ECC frame then C3 ECC syndromes must be generated. Once this process is completed, data in the group can be DMA'ed to the host unit through the SCSI port.

The C3 ECC is started after the R/W block 40 verifies that it has the last copy of the C3 ECC frame is in the DRAM 404. The C3 ECC frame is treated just like any other group data frame. The C3 ECC frame is DMA'ed from the SRAM 417 into the DRAM 404 at a fixed location. The DAAM 404 only has room for one C3 ECC frame.

MISCELLANEOUS

The following items cover subjects that may affect the R/W block 403 but are not necessarily part of the R/W block 403.

The data flow system 400 upon power-up will always go through a fixed sequence. This fixed sequence allows the system to monitor its power up tests. By knowing the power up order, the user can quickly determine at what point a fault might be occurring. During the power up sequence, status information is transmitted out of the serial port. Each test will output its test number signifying the start of that test. At the end of each test, the test will output the results of the test. If a test fails, its results can be variable length. To accommodate this, the byte after the test failed byte will be a binary count of the number of result bytes. The results data can be from zero to 255 bytes.

To accommodate a fast power up sequence, the preferred embodiment is for the serial port be programmed to transmit at 19.2k baud. See FIG. 18 for a flowchart of the power-up sequence.

The power up tests are each autonomous. The order of the tests are shown by the flowchart in FIG. 18. The power up is designed so that each test can be executed individually by special diagnostic commands either through the SCSI port or the serial port.

The data flow system 400 has a method of doing system testing and modular testing. Special commands input on the serial port cause particular tests to be executed. A description of each test lists the inputs and outputs for that test. Each test has a common output structure that enables a universal user interface to be established.

The diagnostic user interface will be consistent for all tests. All inputs and outputs have a common structure.

The data flow system 400 has a front panel that consists of three LEDs and one button.

The serial port is a RS232 serial port without handshake lines. The port's default baud rate is 19.2 K baud. This port is used to display power up test results and used for diagnostics.

An EEPROM, included in this embodiment for storing non-volatile information, can store 1,024 bits of information. The EEPROM is read or written 16 bits per read or write with each bit being closed one at a time. The addresses of the read and write serial data lines are different. The clock into the EEPROM is a software switched signal. One clock cycle is a write one to the clock input and then a write zero to the clock input. This requires two indexed long CPU writes and one AND instruction. This equals about 24 CPU states; at 167 nsec per state with a 12 Mhz CPU; which is 4 microseconds. The interboard serial data communications takes about 3.5 microseconds per transfer. So one clock cycle takes 11 microseconds. Only data words with bits that have changed are written to the EEPROM. The EEPROM memory map will be set up such that the number of data words that have bits that change are kept to a minimum. Before every write to the EEPROM, there must first be an erase command to the address. During normal system operation, the updating of the EEPROM data is queued for periodic writes to the EEPROM at 100 microsecond intervals. The EEPROM is read once on each CPU reset, which makes a shadow copy of the EEPROM in SRAM 417. The shadow SRAM memory words that change are written back to the EEPROM, one bit every 100 milliseconds. Therefore each word takes 2.8 seconds to be written to EEPROM and with a maximum of 10 words needing to be updated at the same time, it would take 28 seconds, which is less than the shortest periodic update rate of once every 2 minutes. The EEPROM memory map is shown in FIG. 19.

The power on time field records the length of time the data flow system 400 has been powered on. This time has a resolution of six minutes. Every six minutes a copy of this field in SRAM 417 is incremented. Once every ½ hour the SRAM 417 copy is written to the EEPROM. This counter is 22 bits long, which equals a maximum count of 4,194,303 at once every six minutes equals 419,430 hours and 18 minutes. There are four 16 bit counters and one 6 bit counter with the 6 bit counter being the most significant bits. The other two bits of this byte are used as a pointer to the current 16 bit counter being used. An EEPROM with 100,000 write cycles will count five times for every write which is 500,000 counts. With four of these counters, the total count will be 2,000,000 counts, which equals 200,000 hours of power on life, about 22 years. So every 500,000 counts will cause the current 16 bit counter pointer to increment and the next 16 bit counter to be the current counter.

The "head life time" field records the length of time the data flow system 400 has been spinning the head drum. This time has a resolution of two minutes. Every two minutes a copy of this field in SRAM 417 is incremented. Once every ½ hour the SRAM 417 copy is written to the EEPROM. This counter is 22 bits long, which equal a maximum count of 4,194,303 at once every two minutes equals 139,810 hours and 6 minutes. There are four 16-bit counters and one 6-bit counter. With the 6 bit counter being the most significant bits. The other two bits of this byte are used as a pointer to the current 16-bit counter being used. An EEPROM with 100,000 write cycles will count 15 times for every write which is 1,500,000 counts. With four of these counters, the total count will be 6,000,000 counts, which equals 200,000 hours of head life, about 22 years. So every 1,500,000 counts will cause the current 16-bit counter pointer to increment and the next 16-bit counter to be the current counter.

The "new head became operational" field records the head life time when a head drum is replaced. A service center will read the head life time and write its value into this field. The current head life is calculated by subtracting this field from the head life time field.

The "time the head was cleaned" field records the current power on time value at the end of a head clean cycle. The value saved is all 24 bits of the power on time. The system can compare this value with the current power on time to signal the next head cleaning.

The head cleaning count records the number of times the current head drum has been cleaned. Whenever a head drum is replaced, this field should be reset to zero.

The "number of load/unload cycles" field is the count of cassette ejects over the life of the data flow system 400.

The manufacturing system tests field have a bit for each of the 24 possible manufacturing system tests. Each bit location from b0 to b23 is the status of tests 1 to 24. The tests that were exercised will have their bit set.

The drive serial number will be ten decimal digits with four bits for each digit displaying 0 to 9 in hexadecimal format.

The drive revision number will be three alphanumeric digits with four bits for each digit displaying 0 to F in hexadecimal format.

The "last critical error" field is an error number from 0 to 255 of the last critical detected by the drive. If this error affects the reading or writing of the EEPROM, this field will not be updated of course.

The before last error field is a copy of the last critical error field before that field is overwritten with a value.

The "time final test complete" field is a 12-bit hexadecimal number between 0000 and 2359, which is the local time of day when all system final tests have been completed. Valid values are only those values which when displayed as a four digit decimal number represent a 24 hour time without the colon between the minutes and the hours. An example of some invalid values would be any numbers with the tens digit greater than 6 and the thousands digit greater than 2.

The "date final test complete" field is 16-bit hexadecimal field, which is the local date when all system final tests have been completed. The 4 MSBits are a hexadecimal representation of the month 0 to 12, with 1 being January and 12 being December. The next 5 bits are a hexadecimal representation of the tens and ones digits of the year 00 to 99, with 90 being 1990 or 2090, whichever seems most appropriate. Any values exceeding the normal limits of each field should be considered invalid.

The "manufacturing power on time" field is the length of time the system was powered on during manufacturing system testing. This time has a resolution of 15 seconds. This time is from 0 to 65,535 which is a maximum of 11 days, 9 hours, 3 minutes, and 45 seconds of manufacturing system testing.

The "power on cycles" field is an incrementing count of the number of times the system in the field has been turned on. The field is 16 bits with a maximum value of 65,535 which once a day would equal about 179 years.

The "maximum humidity" field is a copy of the maximum humidity ever sensed by the system.

The "EEPROM checksum" field is the summation of all of the fields except the power one time and head life time fields. These two fields have been excluded because, updating the checksum every time these timers changed would exceed the write cycle life of the EEPROM for the checksum memory address.

On power up and after all of the power up tests have completed the power on time and the power on cycles fields are incremented and written back to the EEPROM with an updated Checksum. This is three words and adds about 1 msec to the power up time.

There are two types of errors: critical nonrecoverable errors and noncritical nonrecoverable errors. All critical nonrecoverable errors will halt the data flow system 400. The following is a list of all critical nonrecoverable errors which will cause the CPU to turn on all of the front panel LEDs and halt. Also, if possible, the error number will be written to the EEPROM.

| CRITICAL NONRECOVERABLE ERRORS | |
|---|---|
| 1. EPROM checksum error | EEPROM not written |
| 2. CPU RAM error | EEPROM written |
| 3. Formatter 210 error | EEPROM written if possible |
| 4. AT-Formatter error | EEPROM written if possible |
| 5. SRAM test error | EEPROM written |
| 6. 9802 A buffer manager test error | EEPROM written |
| 7. DRAM test error | EEPROM written |
| 8. 5380 SCSI test error | EEPROM written |
| 9. Supply reel motor error | EEPROM written |
| 10. Take up reel motor error | EEPROM written |
| 11. Capstan motor error | EEPROM written |
| 12. Head drum motor error | EEPROM written |
| 13. Load motor error | EEPROM written |
| 14. EEPROM critical parameter checksum error | EEPROM written if possible |
| NONCRITICAL NONRECOVERABLE ERRORS | |
| 1. EEPROM checksum error | All calibration parameters use EEPROM defaults |
| 2. No SCSI response | Reset SCSI chip |

FIG. 18 is a flowchart showing the data flow system 400 power-up sequence. The CPU, FASIC, SRAM, BM9802A, DRAM, SCSI, and ATFASIC are, respectively, the preferred embodiments of processor 505, formatter 510, frame buffer 517, buffer manager 503, main buffer 504, interface 502 of FIG. 5 and ATF 320 of FIG. 3.

Figure 20:
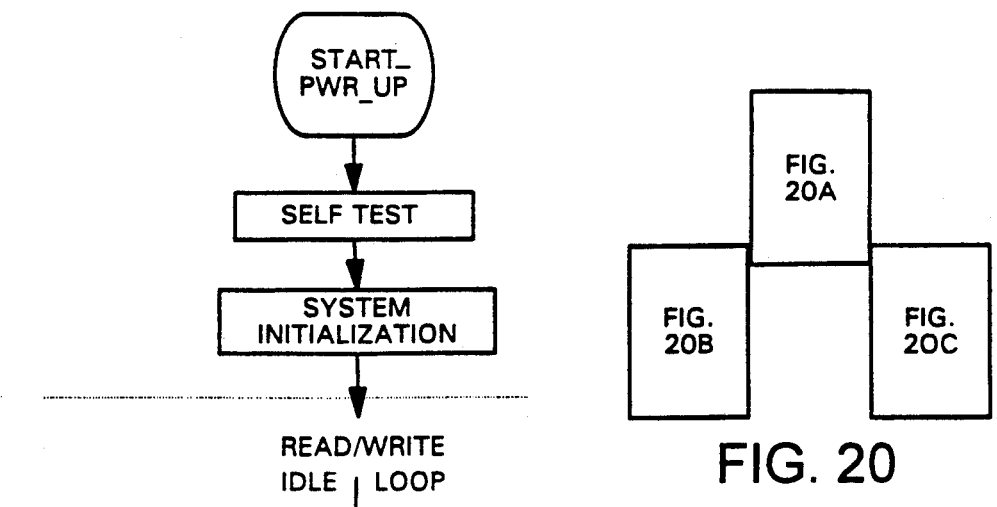
FIGS. 20, 20a, 20b, and 20c are a flowchart of the main foreground loop according to the present invention.
Figure 20A:
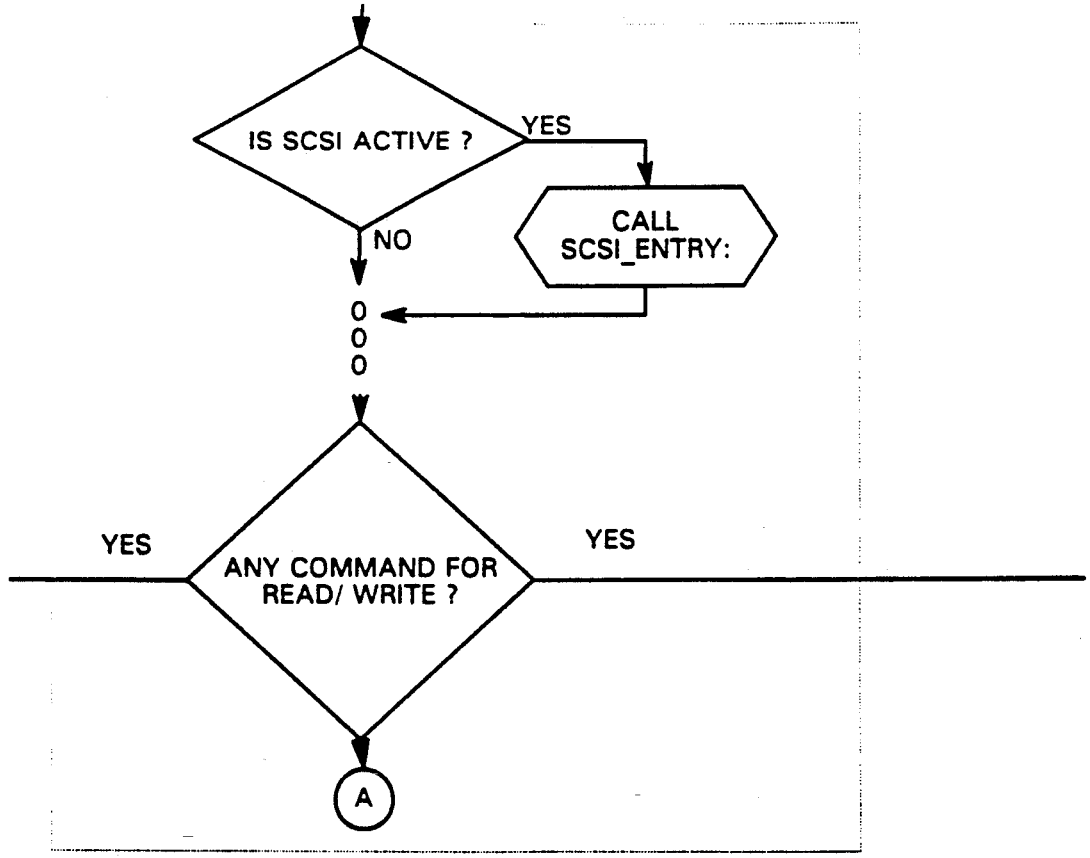
Figure 20B:
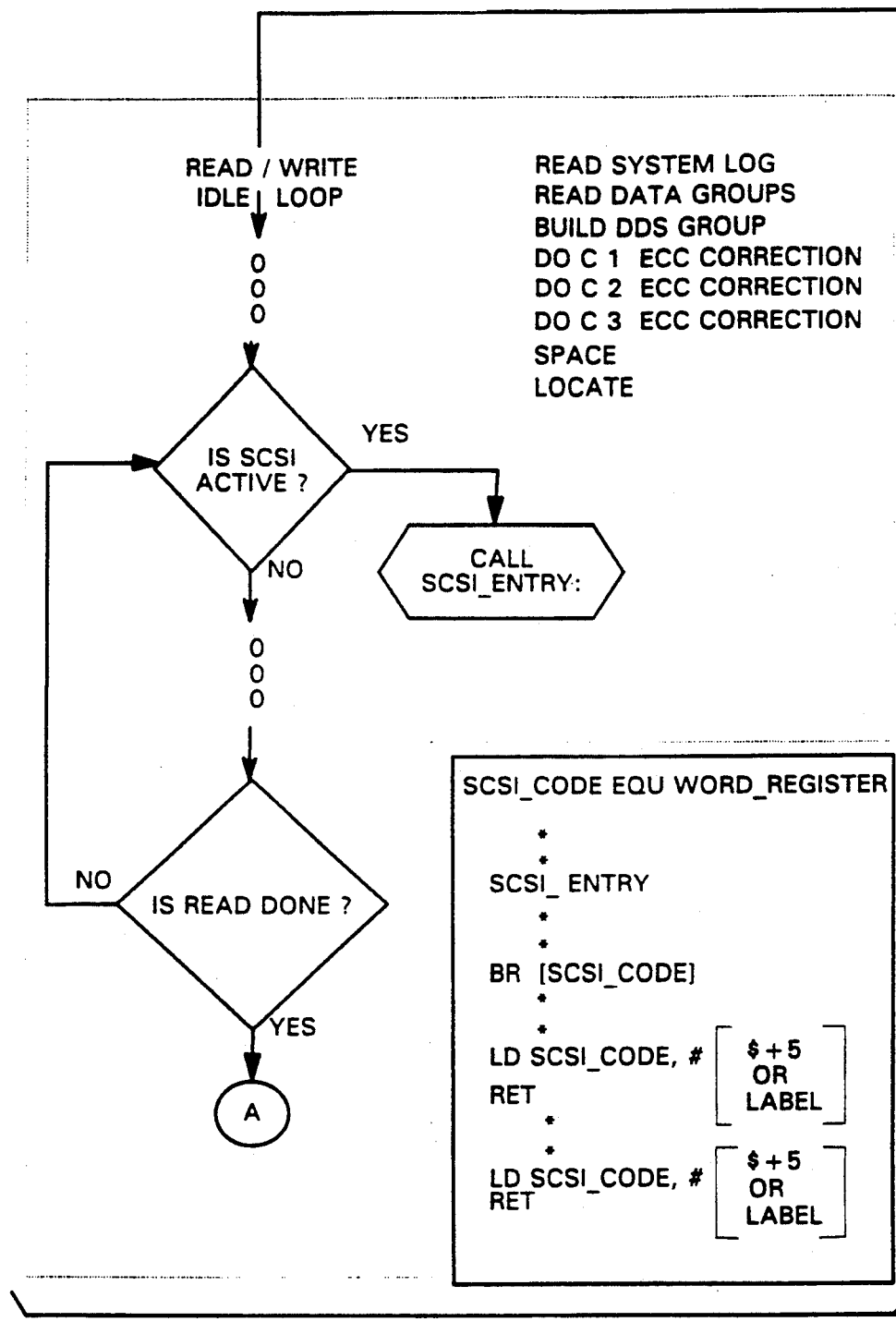
Figure 20C:
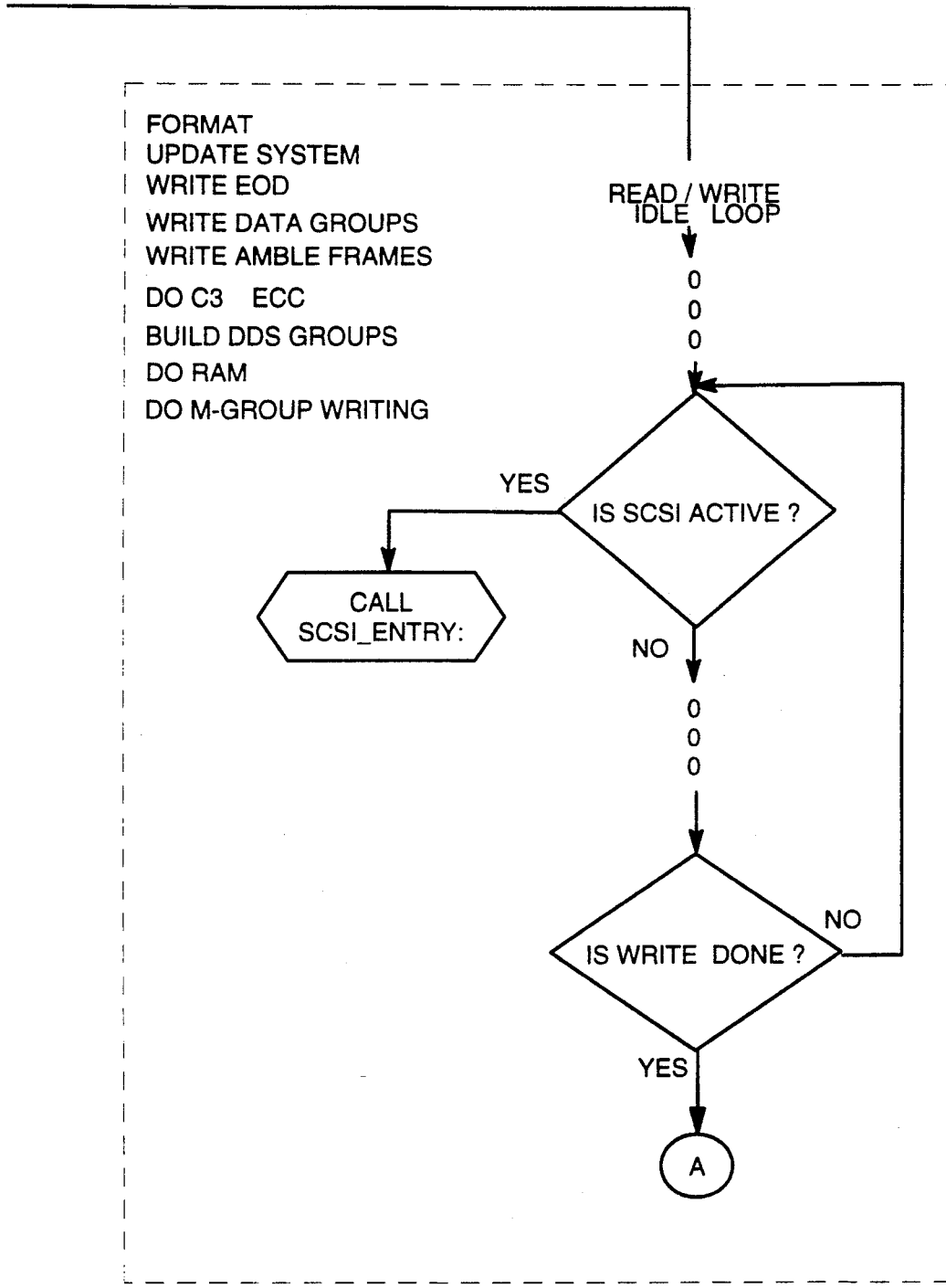
Figure 21B:
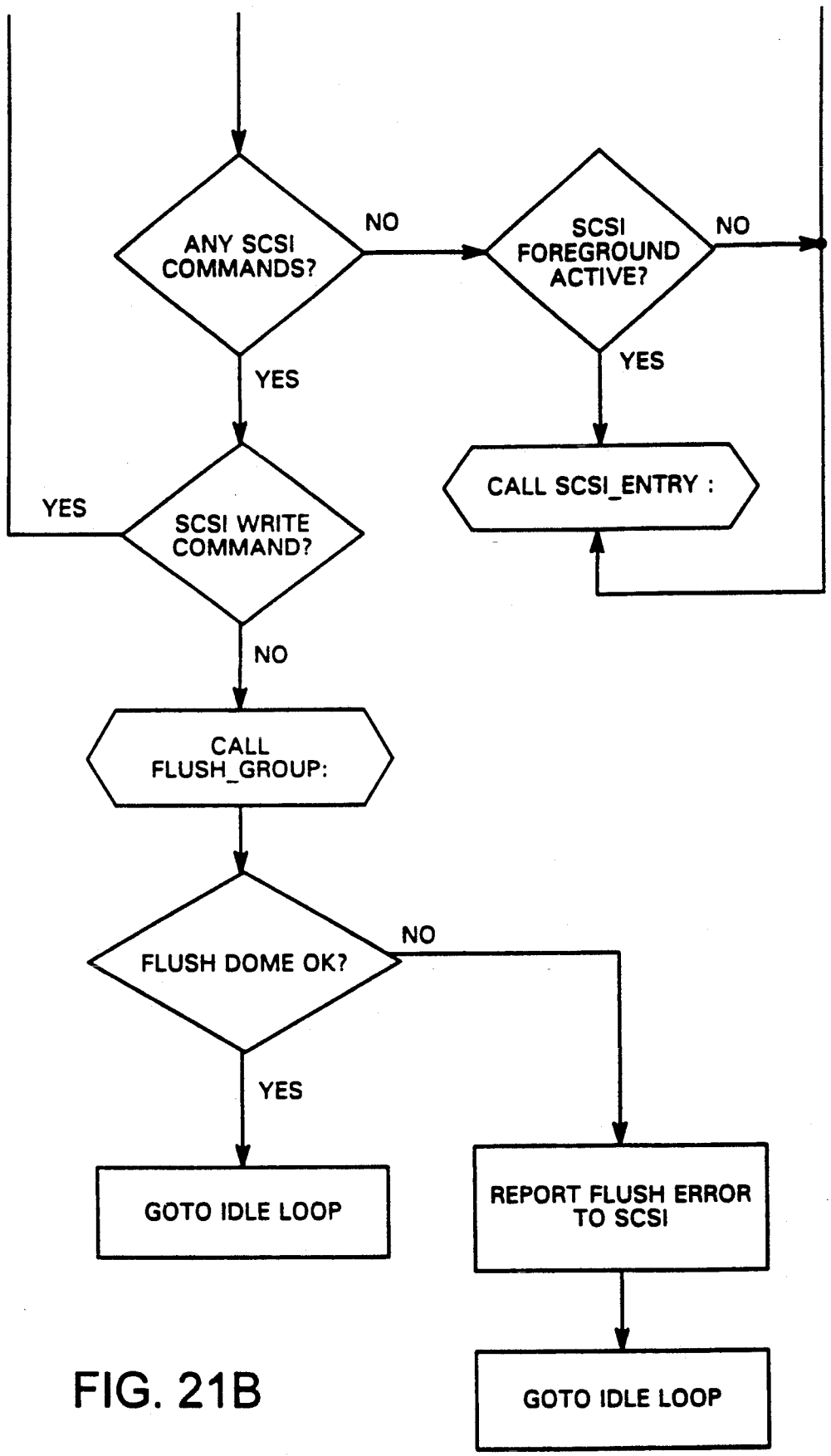
Figure 22A:
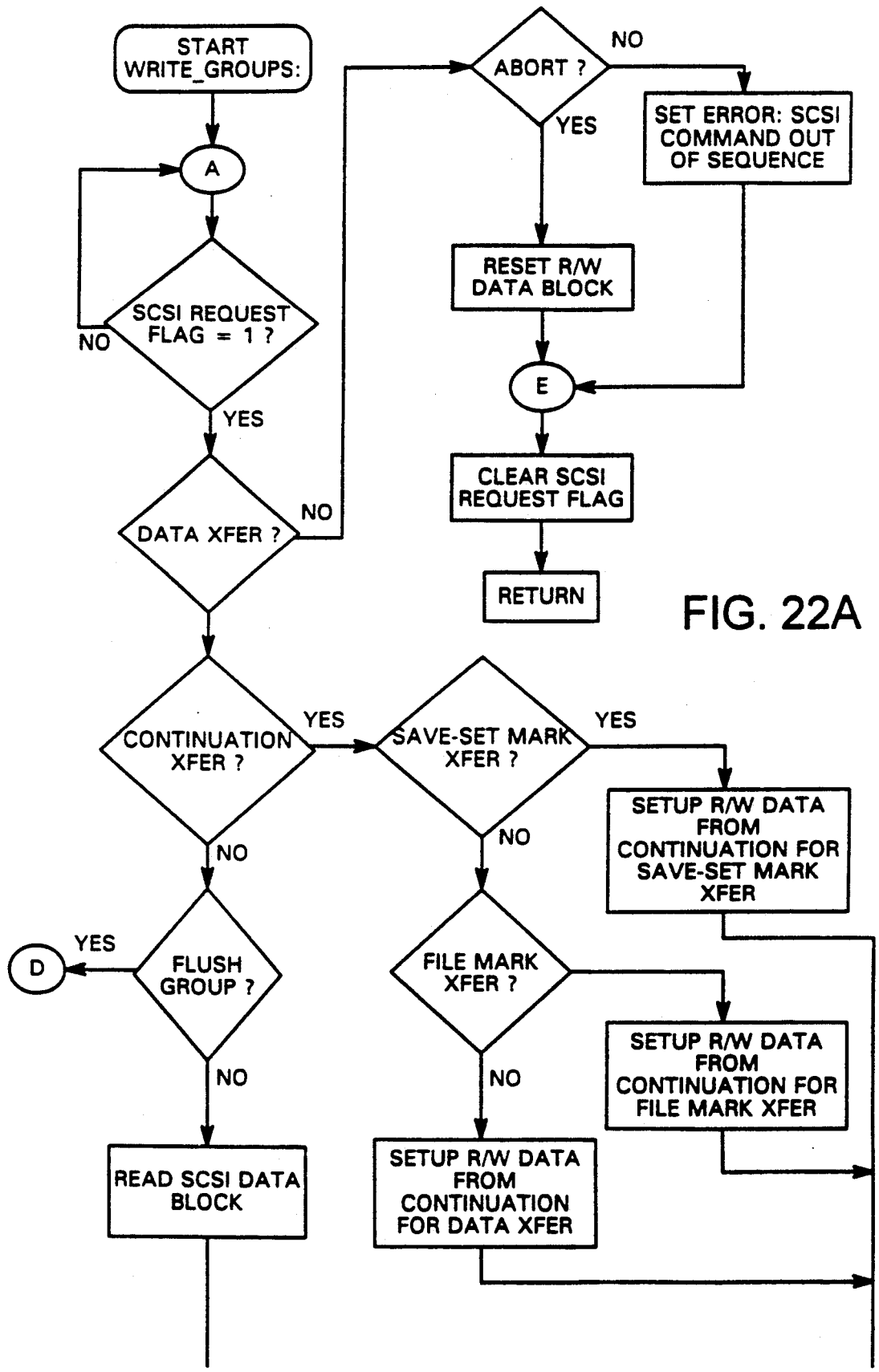
FIGS. 22, 22a, 22b, 22c, and 22d are a flowchart of the write groups subroutine according to the present invention.
Figure 22B:
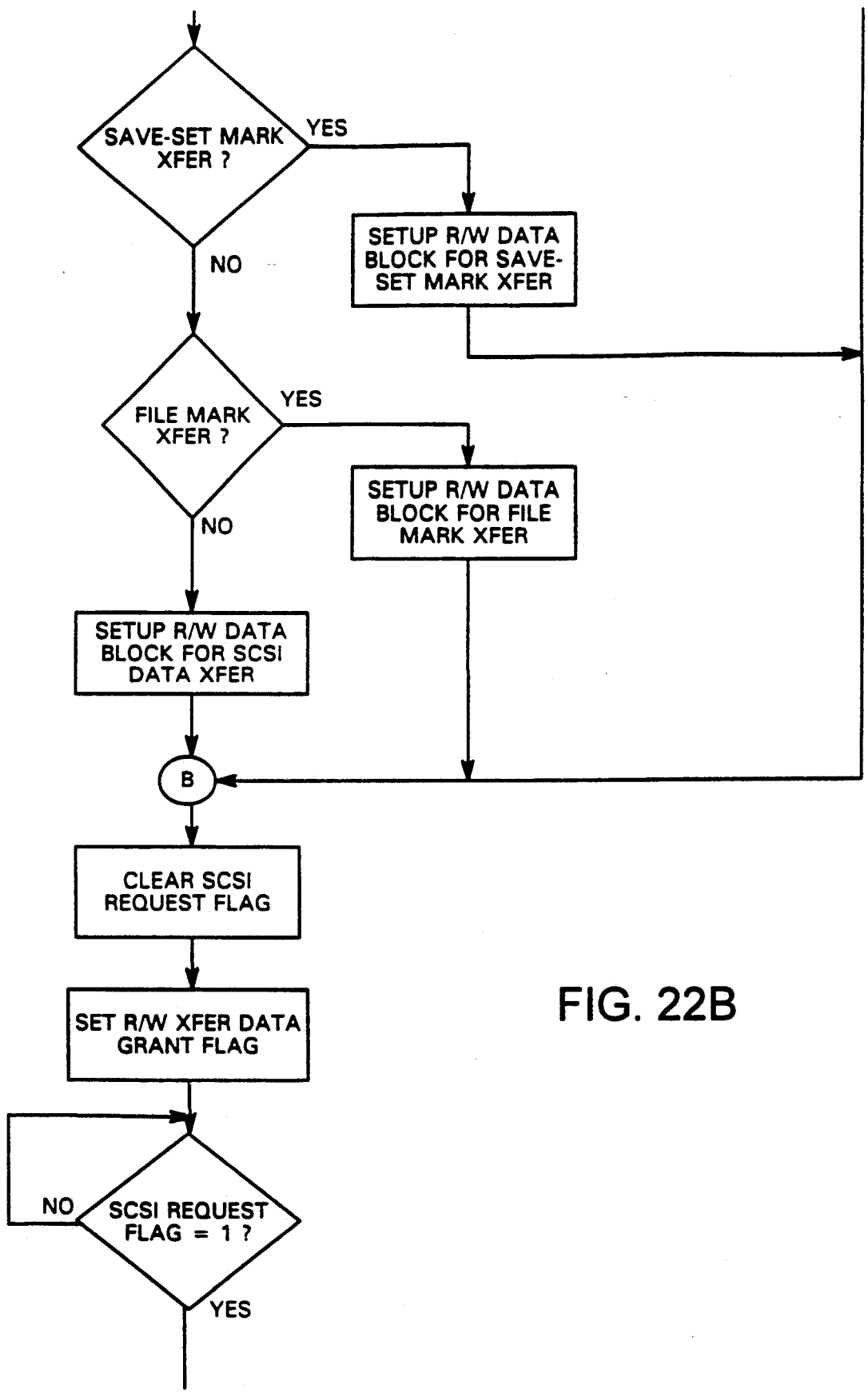
Figure 22C:
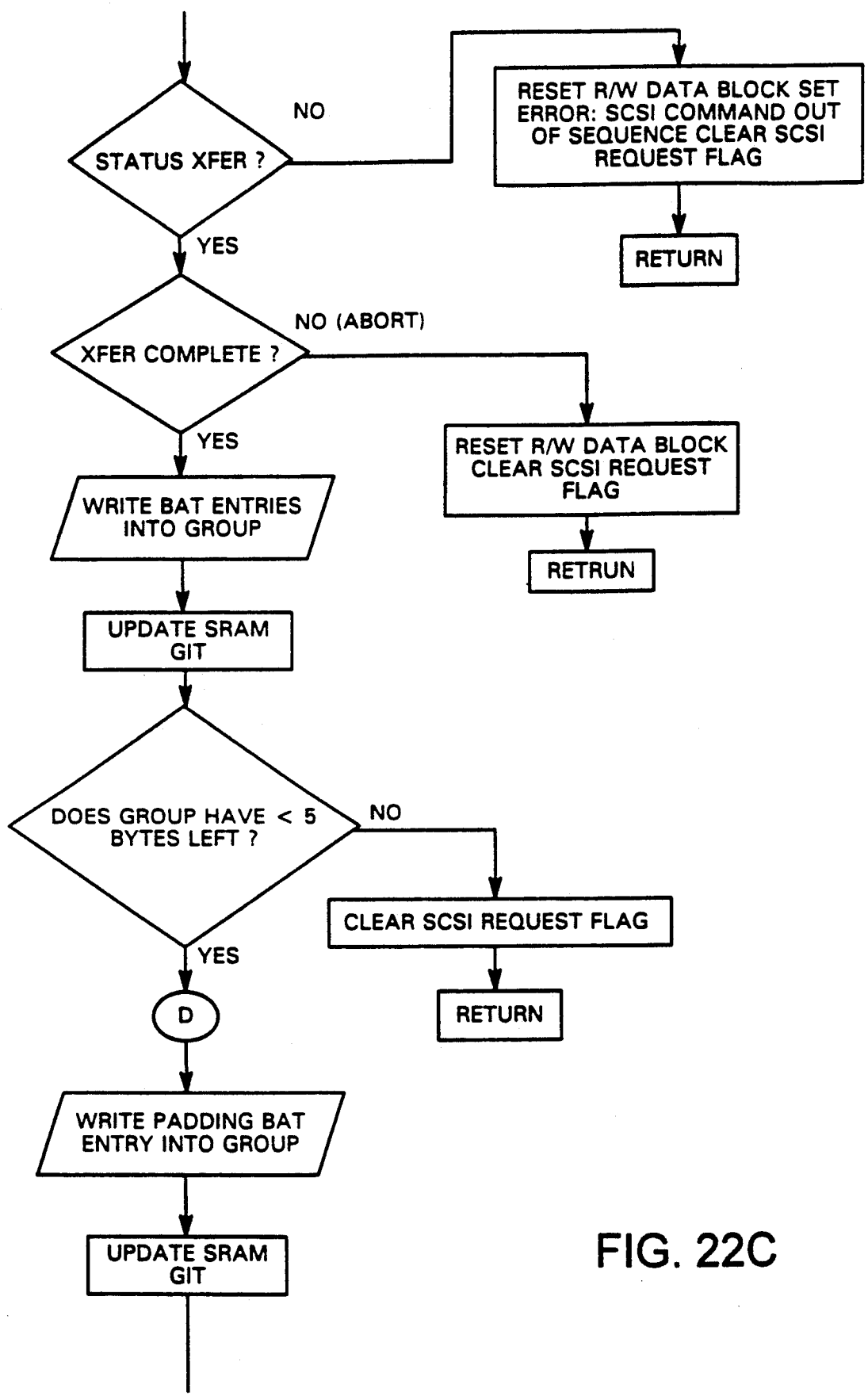
Figures 22, 22D:
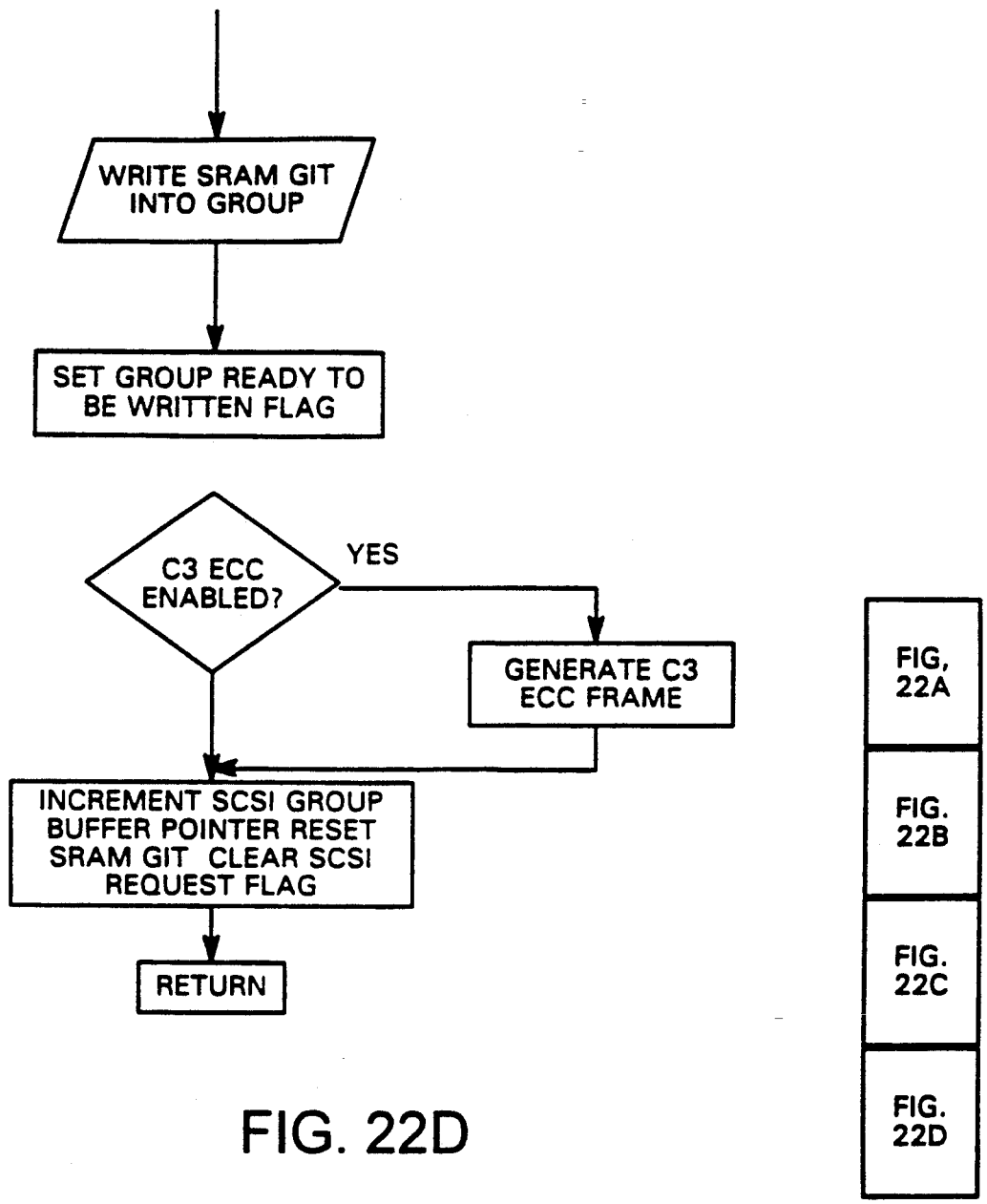

FIG. 20 is a flowchart of the main foreground loop as described above. FIG. 21 is a flowchart of the main write loop, and FIG. 22 is a flowchart of the write groups subroutine.

SEAMLESS APPEND READ READ/WRITE HEAD AND SOFTWARE SEQUENCE

Figure 23:
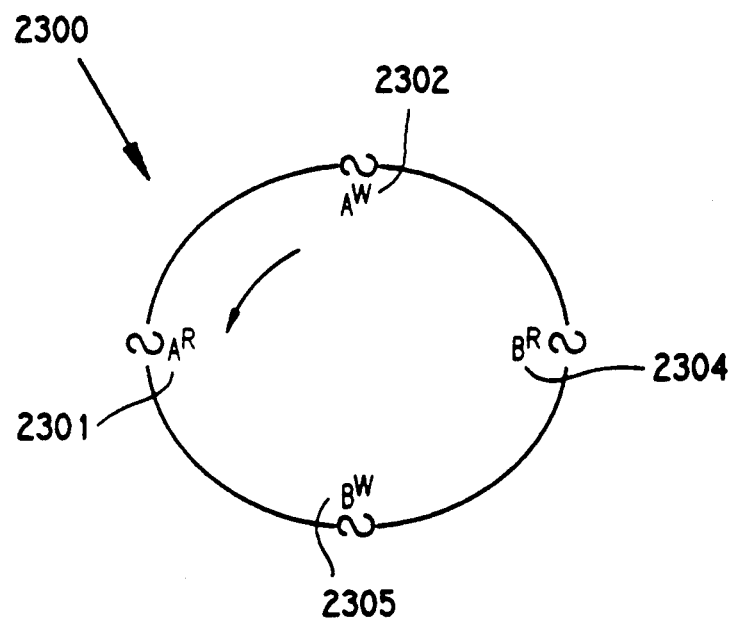
FIG. 23 shows the preferred embodiment of a read/write head drum having four heads according to the present invention.
Figure 24A:
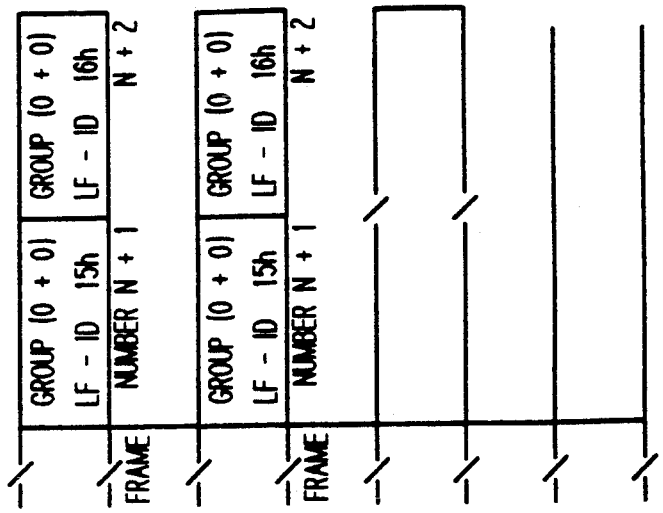
Figure 24:
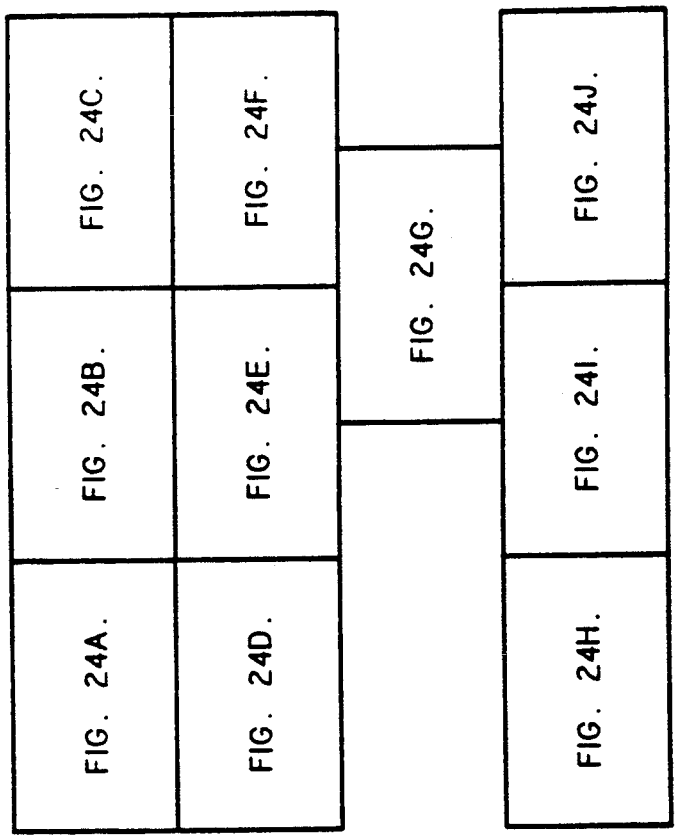
Figure 24C:
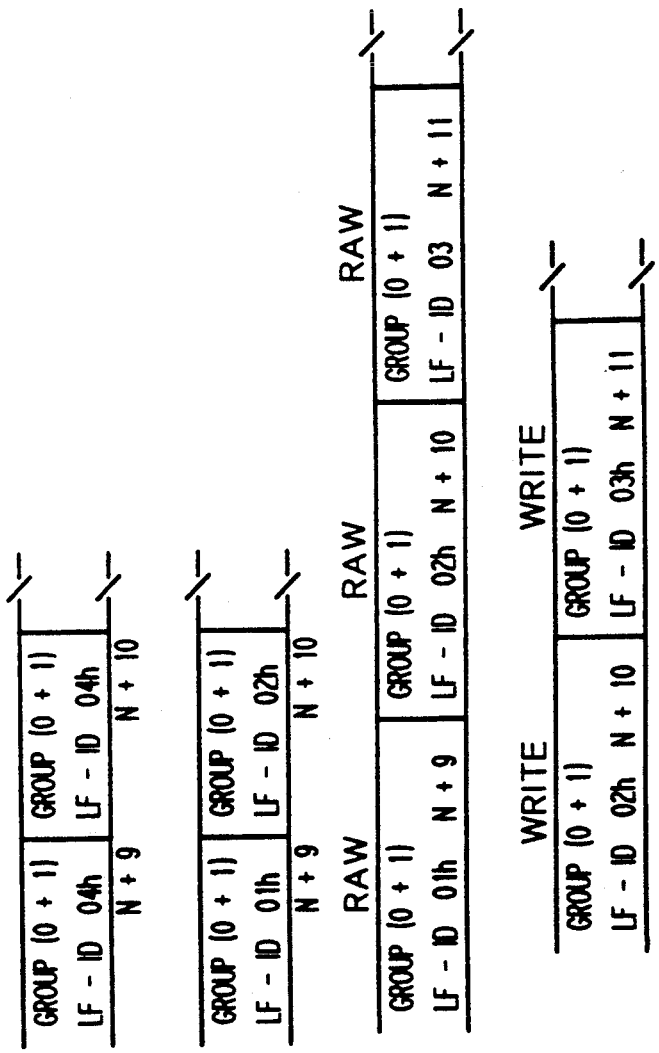
Figure 24D:
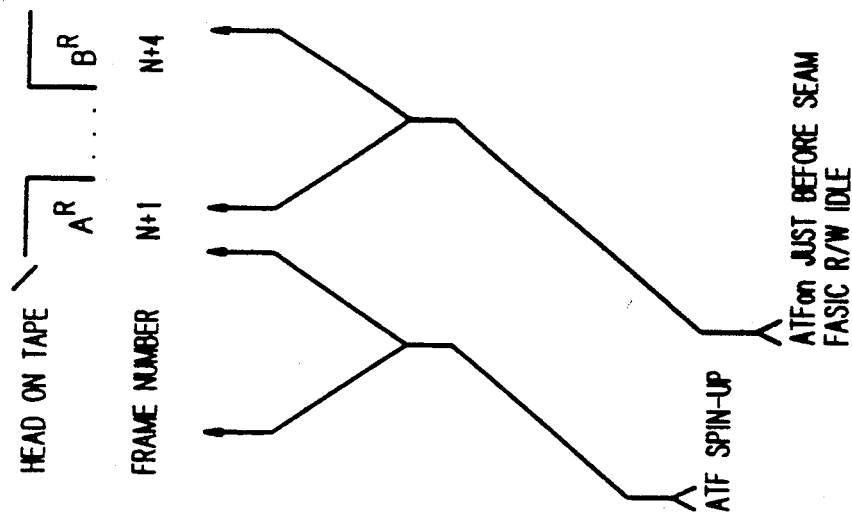
Figure 24E:
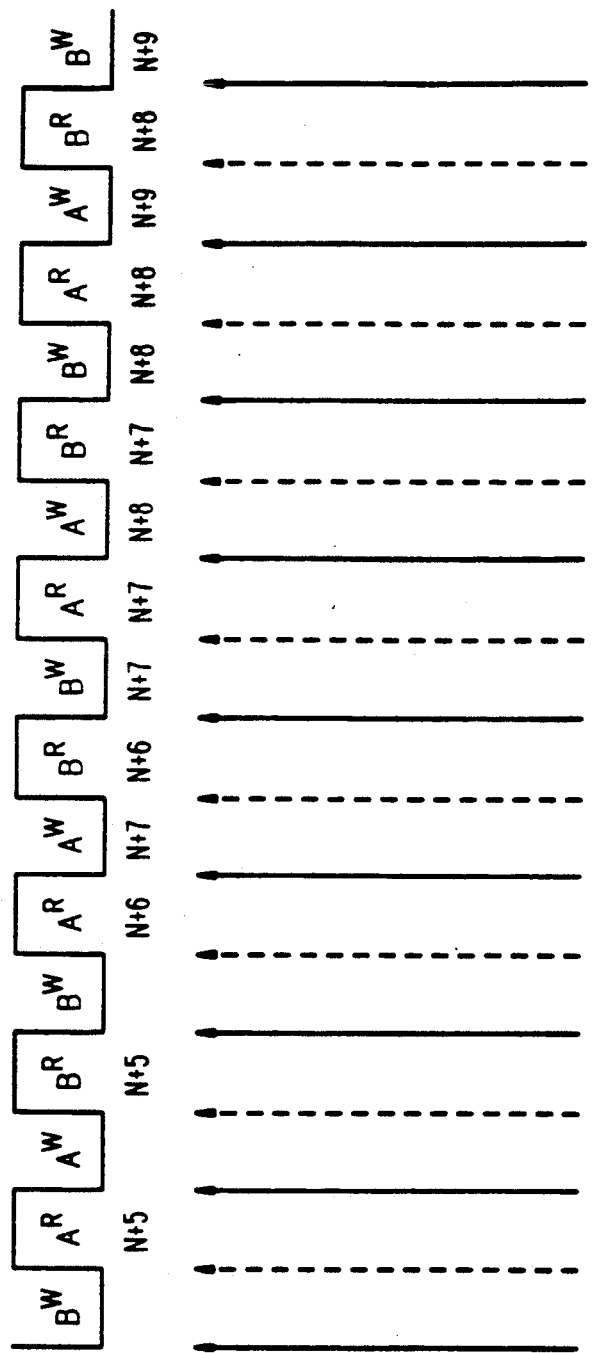
Figure 24F:
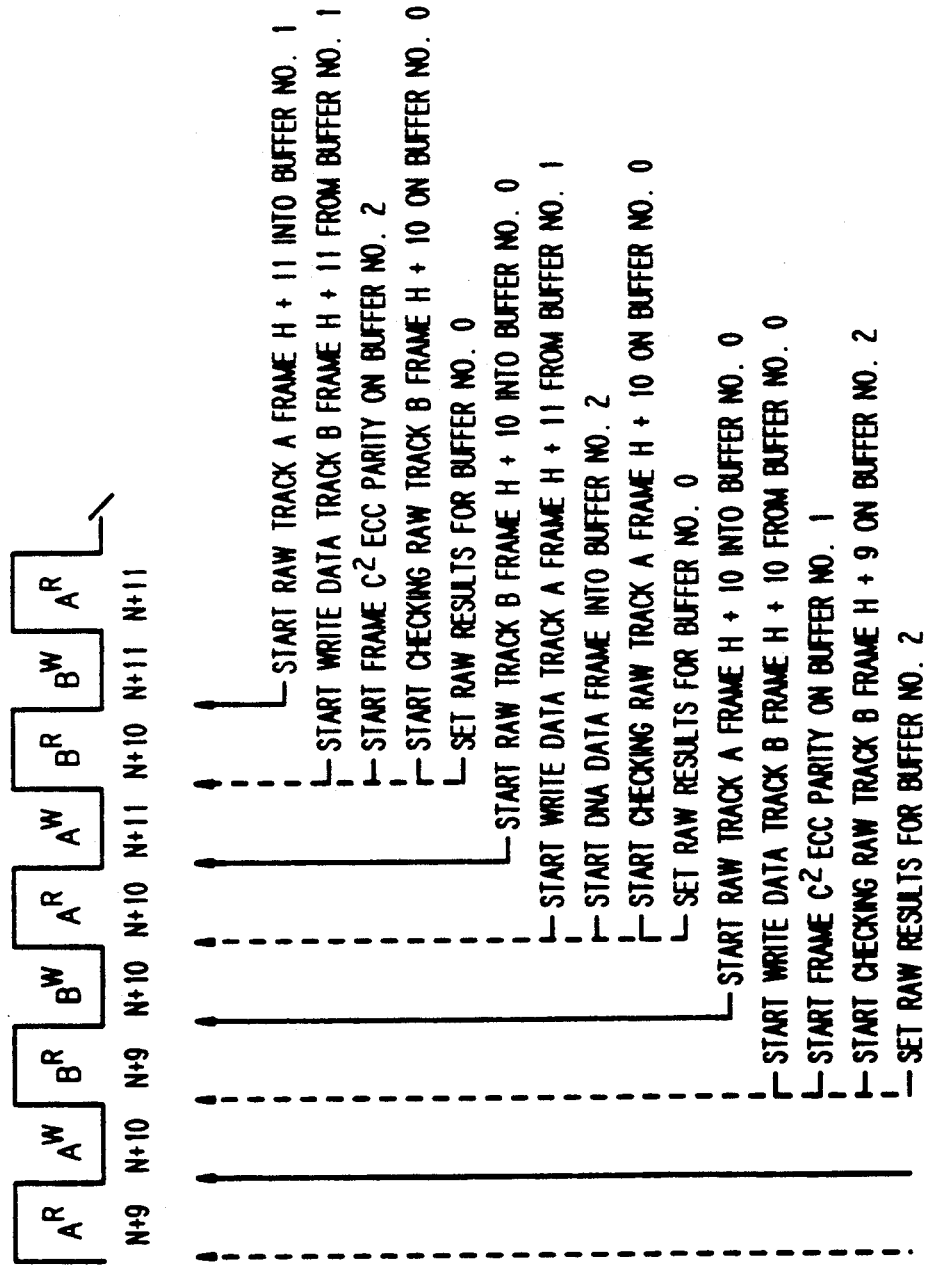
Figure 24G:
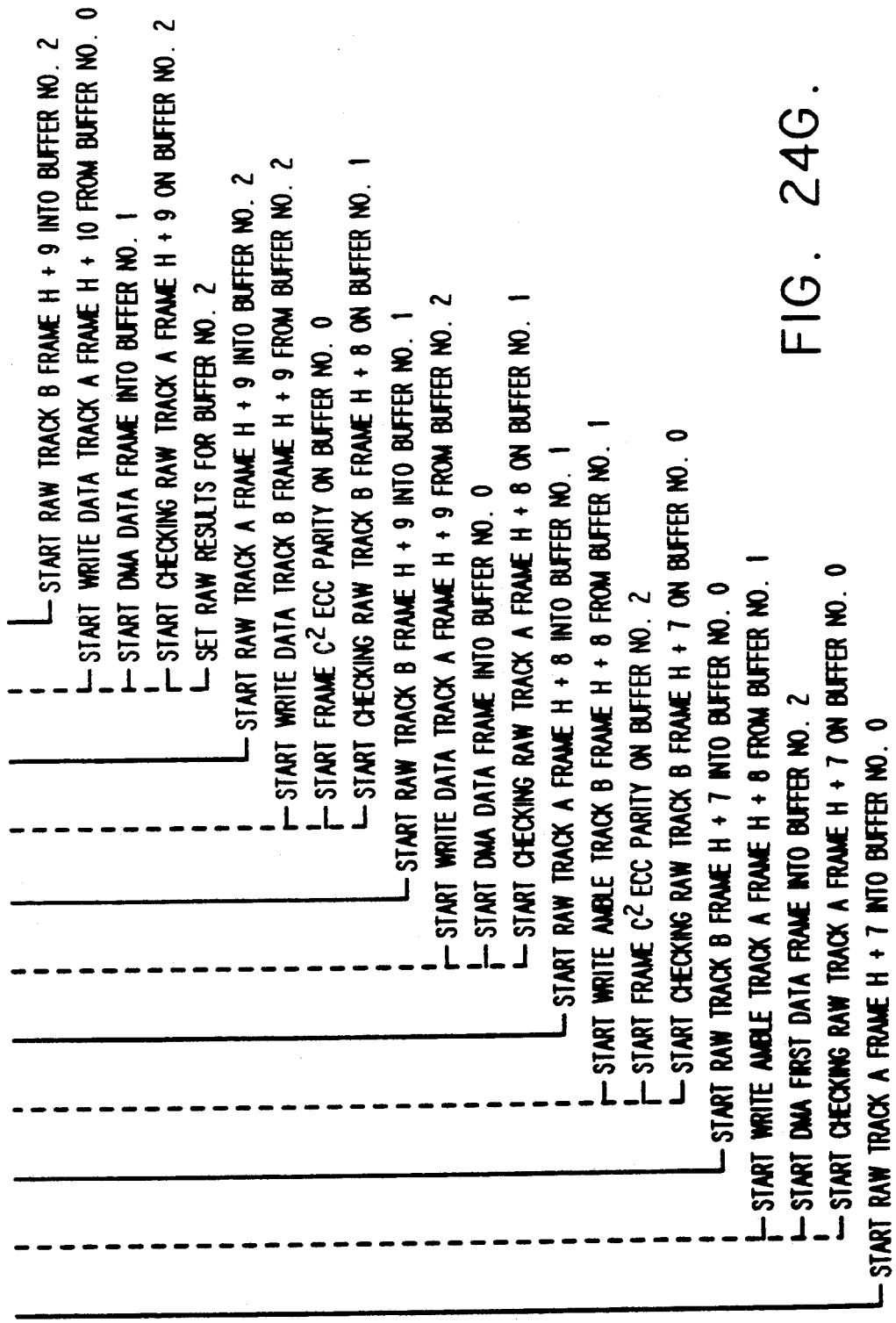
Figure 24H:
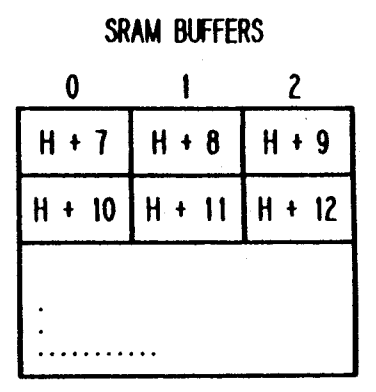
Figure 24I:
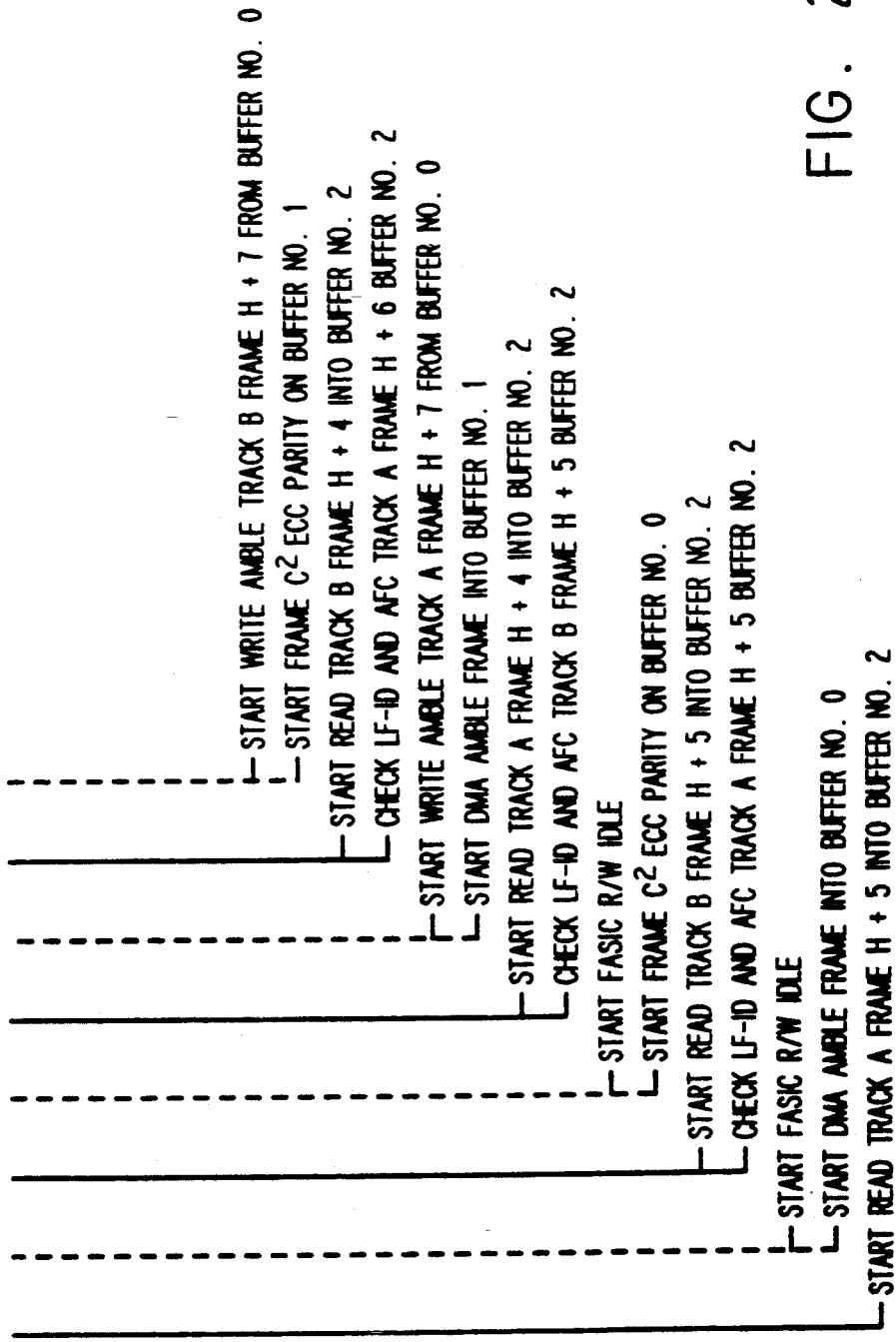
Figure 24J:
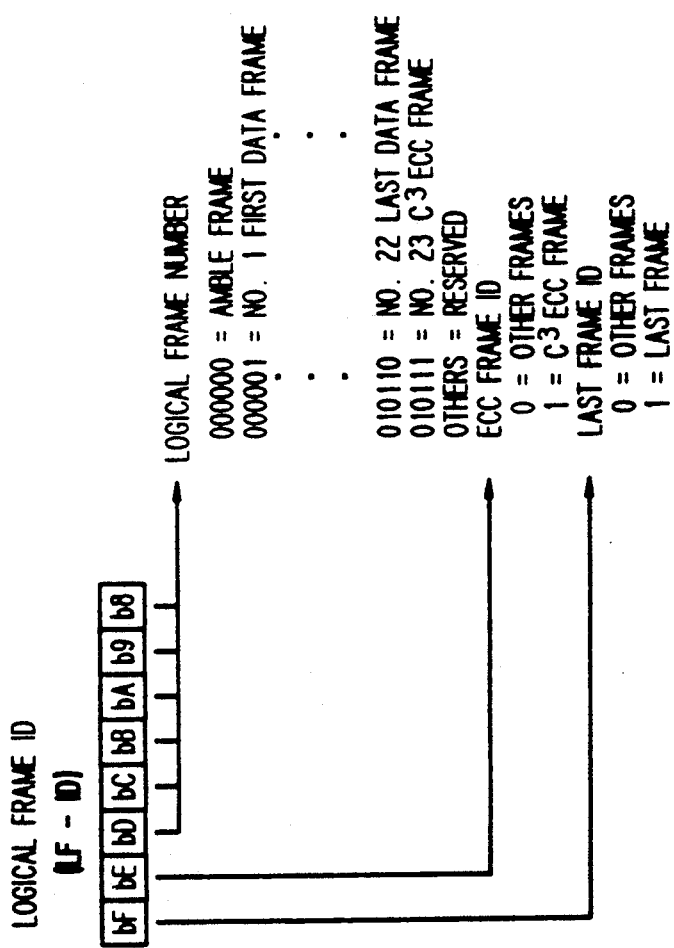

FIG. 23 shows the preferred embodiment of R/W head drum 2300 having four heads: read head 2301 (with Ar representing start of A head read), write head 2302 (with Aw representing start of A head write), read head 2303 (with Br representing start of B head read), and write head 2304 (with Bw representing start of B head write). R/W head drum 2300 rotates in a counter-clockwise direction. In the preferred embodiment, R/W head drum 2300 is tilted at an angle of 6° 22' relative to the tape path so that rotation of head drum 2300 causes write heads 2302 and 2304 to write tracks at an angle across the tape. The angle of the track on the tape is a function of the speed of head drum rotation and the speed of the tape. For the DAT standard, the track angle is 6° 22' 59.5" with a tolerance of ±36.0". The tape is thus moved very slowly relative to head drum 2300 rotation speed. In the preferred embodiment, heads 2301, 2302, 2303, and 2304 are placed at 90° intervals around the circumference of head drum 2300. Read head 2301 and write head 2302 are tilted at a +20° azimuth and read head 2303 and write head 2304 are tilted at a −20° azimuth to minimize crosstalk between the tracks. Broadly, during a write operation the sequence of operation in the preferred embodiment is as follows: (1) the tape is swept and data is written for a track of frame number N by a first write head; (2) the tape is swept and the tape is read from the A track of the previous frame number N−1 by a first read head, thereby performing a RAW check; (3) the tape is swept and data is written from the B track of frame number N by a second write head; and (4) the tape is swept and data read from the B track of the previous frame number N−1, thereby performing a RAW check. In the preferred embodiment, the write heads are set at the same height in head drum 2300 so that tracks are written an equal distance apart. The read heads are offset in height relative to the write heads and slightly in dihedral angle so that they track over previously written tracks. Also, write and read operations can be interleaved on alternate head sweeps. The detailed timing sequence is shown in FIG. 24 and is explained in detail in the following.

SEAMLESS APPEND (write operation)

Note that Track 1 is the same as Track A is the same as +Azimuth Track and that Track 2 is the same as Track B is the same as—Azimuth Track.

I. Read the group just before the seam.
   A. Pack Group Flag=1
      1. Save packs from the last frame of the group 2. C3 ECC enabled
   a. Append new data to the old group
   b. Add C3 ECC to the old group
   c. Seamless append before the old group, rewriting the old group
   d. Save packs from the last frame of the group before the seam
3. C3 ECC disabled
   a. The old group has a C3 ECC frame
      i. Seamless append new date after the old group
      ii. Do not rewrite the old group
   b. The old group does not have a C3 ECC frame
      i. Seamless append new data after the old group
      ii. Do not rewrite the old group
   c. Save packs from the last frame of the old group
   d. Save AFC from last frame of the old group
B. Pack group flag=0
  1. Save packs from the last frame of the group
  2. Seamless append new data after the old group
  3. Do not rewrite the old group
  4. Save packs from last frame of the old group
  5. Save AFC from last frame of the old group
II. DMA amble frame into SRAM
  A. DAM 5756 bytes of 00h
    1. Randomizer ON
    2. Interleave On
    3. Save track checksum
  B. DMA 64 bytes of 00h
    1. Randomizer Off
    2. Interleave On
  C. Write LF-ID
    1. Write 00h to Track A, offset 00h
    2. Write 00h to Track B, offset 00h
  D. Write DFID
    1. Write 00h to Track A, offset 02h
    2. Write 00h to Track B, offset 02h
  E. Write subdata packs (pack items #1, #2, #3, #4)
    1. Pack item #1
      a. Buffer subdata offset 0-6 & 32-38 Pack item #1
        i. Data from subdata of last frame of group before the seam
        ii. N-position=000b
      b. Buffer subdata offset 7 & 39 pack item #1 parity
        i. Parity byte
        ii. Parity is XOR of the 7 data bytes
    2. Pack item #2
      a. Buffer subdata offset 8-14 40-46 Pack item #2
        i. Data from subdata of last frame of group
        ii. N-repeats=000b
      b. Buffer subdata offset 15 & 47 pack item #2 parity
        i. Parity byte
        ii. Parity is XOR of the 7 data bytes
    3. Pack item #3
      a. Buffer subdata offset 16-22 pack item #3
        i. Pack item number b7-b4 and Area-ID b3-b0 offset 16
        ii. Absolute frame count offset 17-19 MSB ... LSB
          aa. First amble frame=last frame of group before the seam AFC+2
          ab. Second amble frame=first amble frame AFC+1
          ac. Data Frame AFC=previous frame's AFC+1
        iii. Track 1 checksum, MSB offset 20 & LSB offset 21=00h
        iv. LF-ID offset 22=00h
      b. Buffer subdata offset 23 pack item #3 parity
      c.
        i. Parity byte
        ii. Parity is XOR of the 7 data bytes
    3. Pack item #4
      a. Buffer subdata offset 48-54 pack item #4
        i. Pack item number b7-b4 and Area-ID b3-b0 offset 48
        ii. Absolute frame count offset 49-51 MSB ... LSB
          aa. First amble frame=last frame of group before the seam AFC+2
          ab. Second amble frame=first amble frame AFC+1
          ac. Data frame AFC=previous frame's AFC+1
        iii. Track 2 checksum MSB offset 52 & LSB offset 53=00h
        iv. LF-ID offset 54=00h
      b. Buffer subdata offset 55 pack item #4 parity
        i. Parity byte
        ii. Parity is XOR of the 7 data bytes
    4. Pack block pair C1 ECC
      a. Buffer subdata offset 56-63
      b. This data will be generated automatically when C1 ECC on-the-fly is On
  F. Write main ID W1 for the 8 unique blocks, buffer offset 128-135
    1. Offset 128 b7-b4=0100b
    2. Offset 128 b3-b0=FAC LSB b3-b0
    3. Offset 130 b7-b4=0000b
    4. Offset 130 b3-b0=AFC LSB b3-b0
    5. Offset 132 b7-b4=0000b
    6. Offset 132 b3-b0=FAC LSB b3-b0
    7. Offset 134 b7-b4=0000b
    8. Offset 134 b3-b0=AFC LSB b3-b0
  G. Write subdata ID Sw1 and SW2 odd and even, buffer offset 152-155
    1. SW1 even, buffer offset 152, one time during each change of the area ID
      a. b7-b4=area ID, the same as for pack item #3 and #4
      b. b3-b0=data ID 1000b
    2. SW2 even, buffer offset 153, one time during initialization
      a. b7=1b, subdata block ID
      b. b6-b4=pack ID=6 packs=110b
      c. b3-b0=0000b
    3. SW1 odd, buffer offset 154, one time during initialization
      a. b7-b4=0000b
      b. b3-b0=data format ID=data=0000b
    4. SW2 odd, buffer offset 155, one time during initialization
      a. b7=1b, subdata block ID
      b. b6-b0=000000b
III. DMA data frame into SRAM
  A. DMA 5756 bytes of user data
    1. Randomizer On
    2. Interleave On
    3. Save track checksum
  B. DMA 64 bytes of 00h, one time during each data area write sequence 1. Randomizer Off
2. Interleave On
C. Write LF-ID
  1. Write LF-ID to Track A, offset 00h
  2. Write LF-ID to Track B, offset 00h
D. Write DFID, one time during each data area write sequence
  1. Write 00h to Track A, offset 01h
  2. Write 00h to Track B, offset 02h
E. Get group information for pack items #1 and #2
  1. Update N-Position field, offsets 0, 32 b2-b0
  2. Update N-Repeats field, offsets 8, 40 b2-b0
  3. Increment group count, offsets 1-2, 33-34
  4. Update filemark count, offsets 3-6, 35-38
  5. Update save-set count, offsets 9-10, 41-42
  6. Update record count, offsets 11-14, 43-46
  7. Update pack items' parity byte
F. Pack item #3
  1. Buffer subdata offset 16, one time during each data write sequence
    a. Pack item number b7-b4
    b. Area-ID b3-b0
  2. Buffer subdata offset 17-22 pack item #3
    a. Absolute frame count offset 17-19 MSB . . . LSB
      i. Data Frame AFC=previous frame's AFC+1
    b. LF-ID offset 22
    c. Track 1 checksum, MSB offset 20 & LSB offset 21
      i. Track 1 checksum MSB=Formatter Track 1 checksum High (XOR) with LF-ID
      ii. Track 1 checksum LSB=Formatter Track 1 checksum Low
  3. Buffer subdata offset 23 pack item #3 parity
    a. Parity byte
    b. Parity is XOR of the 7 data bytes
G. Pack item #4 Buffer subdata offset 48, one time during each data area write sequence
    a. Pack item number B7-b4
    b. Area-ID b3-b0
  2. Buffer subdata offset 49-54 pack item #4
    a. Absolute frame count offset 49-51 MSB . . . LSB
      i. Data frame AFC=previous frame's AFC+1
    b. LF-ID offset 54
    c. Track 2 checksum, MSB offset 52 & LSB offset 53
      i. Track 2 checksum MSB=Formatter Track 2 checksum High (XOR) with LF-ID
      ii. Track 2 checksum LSB=Formatter Track 2 checksum Low
  3. Buffer subdata offset 55 pack item #4 parity
    a. Parity byte
    b. Parity is XOR of the 7 data bytes
H. Write main ID W1 for the 8 unique blocks, buffer offset 128-135
  1. Offset 128 b7-b4=0100b
  2. Offset 128 b3-b0=AFC LSB b3-b0
  3. Offset 130 b7-b4=0000b
  4. Offset 130 b3-b0=AFC LSB b3-b0
  5. Offset 132 b3-b0=AFC LSB b3-b0
  6. Offset 132 b3-b0=AFC LSB b3-b0
  7. Offset 134 b7-b4=0000b
  8. Offset 134 b3-b0=AFC LSB b3-b0
I. Write subdata ID SW1 and SW2 odd and even, buffer offset 152-155
  1. SW1 even, buffer offset 152, one time during each change of the area ID
    a. b7-b4=area ID, the same as for pack item #3 and #4
    b. b3-b0=data ID 1000b
  2. SW2 even, buffer offset 153, one time during initialization
    a. b7=1b, subdata block ID
    b. b6-b4=pack ID=6 packs=110b
    c. b3-b0=0000b
  3. SW1 odd, buffer offset 154, one time during initialization
    a. b7-b4=0000b
    b. b3-b0=dat format ID=data=0000b
  4. SW2 odd, buffer offset 155, one time during initialization
    a. b7=1b, subdata block ID
    b. b6-b0=0000000b
IV. Align Heads to Seam
  A. Read frames to seam
    1. Reach each track comparing AFC with AFC of append point
    2. Append point AFC is AFC of last frame of group before append point+1
  B. Start writing first amble frame
    The following is done at the start of each head sweep:
    where:
      Ar=Start of A head read
      Aw=Start of A head write
      Br=Start of B head read
      Bw=Start of B head write
    The repeating sequence is shown in Table VI wherein x is the SRAM buffer number.
  C. Example of an append sequence:
    Wait for signal that the head for Track B has started, then:

| | |
|---|---|
| Bw - | Start formatter normal read of Track A last frame of group before seam buffer #2 |
| Ar - | Start formatter R/W idle Start DMA of amble frame into buffer #0 |
| Aw - | Start formatter normal read of Track B last frame of group before seam buffer #2 Check LF-ID and AFC of Track A that was just read buffer #2 |
| Br - | Start formatter C2 ECC parity generation on buffer #0 |
| Bw - | Start formatter normal read of Track A old frame space before seam buffer #2 Check LF-ID and AFC of Track B that was just read buffer #2 |
| Ar - | Start formatter write (odd/even bit = AFC bit b0) Track A buffer #0 1$^{st}$ amble start DMA of amble frame into buffer #1 |
| Aw - | Check LF-ID and AFC of Track A that was just read buffer #2 (wait for write head to be in sub code area) Start formatter normal read of Track B old frame space before seam buffer #2 |
| Br - | Start formatter write (odd/even bit = AFC bit b0) Track B buffer #0 1$^{st}$ amble Start formatter C2 ECC parity generation on buffer #1 |
| Bw - | (Wait for write head to be in sub code area) |
| Ar - | Start formatter write (odd/even bit = AFC bit b0) Track A buffer #1 2$^{nd}$ amble Start DMA of data frame into buffer #2 1$^{st}$ data frame |
| Aw - | (Wait for write head to be in sub code area) Start formatter RAW reach of Track B amble frame buffer #0 1$^{st}$ amble |
| Br - | Start formatter write (odd/even bit = AFC bit b0) Track B buffer #1 2$^{nd}$ amble Start formatter C2 ECC parity generation on buffer 2 1st data frame |
| Bw - | (Wait for write head to be in sub code area) Start formatter RAW read of Track A amble frame buffer |

```
                #1 2nd amble
Ar -   Start formatter write (odd/even bit = AFC bit b0) Track A
       buffer #2 1st data frame
       Start DMA of data frame into buffer #0 2nd data frame
Aw -   (Wait for write head to be in sub code area)
       Start formatter RAW read of Trck B amble frame buffer
       #1 2nd amble
Br -   Start formatter write (odd/even bit = AFC bit b0) Track
       B buffer #2 1st data frame
       Start formatter C2 ECC parity generation on buffer #0
       2nd data frame
Bw -   (Wait for write head to be in sub code area)
       Start formatter RAW read of Track A data frame buffer
       #2 1st data frame
***
Ar -   Start formatter write (odd/even bit = AFC bit b0) Track A
       buffer #0 2nd data frame
       Start DMA of data frame into buffer #1 3rd data frame
       Start checking RAW on Track A data frame buffer #2
       1st data frame
       (A RAW BAD example will be explored later)
Aw -   (Wait for write head to be in sub code area)
       Start formatter RAW read of Track B data frame buffer
       #2 1st data frame
Br -   Start formatter write (odd/even bit = AFC bit b0) Track
       B buffer #0 2nd data frame
       Start formatter C2 ECC parity generation on buffer #1
       3rd data frame
       Start checking RAW on Track B data frame buffer #2
       1st data frame
Bw -   (Wait for write head to be in sub code area)
       Start formatter RAW read of Track A data frame buffer
       #0 2nd data frame
***
```

We are now in a loop repeating between the ***'s with the buffer being used incrementing through the sequence 0-1-2.

D. An example when there is a RAW error with no intervening frames:

```
Ar -   Start formatter write (odd/even bit = AFC bit b0)
       Track A buffer #0 2nd data frame
       Start DMA of data frame into buffer #1 3rd data frame
       (RAW is found BAD)
Aw -   Start formatter write (odd/even bit = AFC bit b0)
       Track A buffer #2 1st data frame
       (Wait for write head to be in sub code area)
       Start formatter RAW read of Track B data frame Buffer
       #2 1st data frame
Br -   Start formatter write (odd/even bit = AFC bit b0)
       Track B buffer #2 1st data frame
       Start formatter C2 ECC parity generation on buffer
       #1 3rd data frame
Bw -   (Wait for write head to be in sub code area)
       Start formatter RAW reach of Track A data frame
       Buffer #2 1st data frame
Ar -   Start formatter write (odd/even bit = AFC bit b0) Track A
       buffer #0 2nd data frame
       Start checking RAW on Track A data frame buffer 2
       1st data frame
Aw -   (Wait for write head to be in sub code area)
       Start formatter RAW read of Track B data frame
       Buffer #2 1st data frame
Br -   Start formatter write (odd/even bit = AFC bit b0) Track
       B buffer #0 2nd data frame
       Start checking RAW on Track B data frame buffer 2
       1st data frame
Bw -   (Wait for write head to be in sub code area)
       Start formatter RAW read of Track data frame
       Buffer #0 2nd data frame
Ar -   Start formatter write (odd/even bit = AFC bit b0)
       Track A buffer #1 3rd data frame
       Start DMA of data frame into buffer #2 4th data frame
       Start checking RAW on Track A Data Frame Buffer #0 2nd
       data frame
Aw -   (Wait for write head to be in sub code area)
       Start formatter RAW read of Track B data frame
       buffer #0 2nd data frame
Br -   Start formatter write (odd/even bit = AFC bit b0) Track
       B buffer #1 3rd data frame
       Start formatter C2 ECC parity generation on buffer #2
       4th data frame
       Start checking RAW on Track B data frame buffer #0
       2nd data frame
Bw -   (Wait for write head to be in sub code area)
       Start formatter RAW read of Track A data frame buffer
       #1 3rd data frame
Ar -   Start formatter write (odd/even bit = AFC bit b0) Track A
```

E. An example when there is a RAW error with one intervening frame:

```
Ar -   Start formatter write (odd/even bit = AFC bit b0)
       Track A buffer #0 2nd data frame
       Start DMA of data frame into buffer #1 3rd data frame
       Start checking RAW on Track A data frame buffer #2
       #1st data frame
Aw -   (Wait for write head to be in sub code area)
       Start formatter RAW read of Track B data frame
       buffer #2 1st data frame
Br -   Start formatter write (odd/even bit = AFC bit b0)
       Track B buffer #0 2nd data frame
       Start formatter C2 ECC parity generation on buffer
       #1 3rd data frame
       Start checking RAW on Track B data frame buffer #2
       1st data frame (RAW is found BAD)
Bw -   (Wait for write head to be in sub code area)
       Start formatter RAW read of Track A data frame
       Buffer #0 2nd data frame
Ar -   Start formatter write (odd/even bit = AFC bit b0) Track A
       buffer #2 1st data frame
Aw -   (Wait for write head to be in sub code area)
       Start formatter RAW read of Track B data frame
       Buffer #0 2nd data frame
Br -   Start formatter write (odd/even bit = AFC bit b0) Track
       B buffer #2 1st data frame
Bw -   (Wait for write head to be in sub code area)
       Start formatter RAW read of Track data frame
       Buffer #2 1st data frame
Ar -   Start formatter write (odd/even bit = AFC bit b0)
       Track A buffer #0 2nd data frame
Aw -   (Wait for write head to be in sub code area)
       Start formatter RAW read of Track B data frame
       buffer #2 1st data frame
Br -   Start formatter write (odd/even bit = AFC bit b0) Track
       B buffer #0 2nd data frame
Bw -   (Wait for write head to be in sub code area)
       Start formatter RAW read of Track A data frame buffer
       #0 2nd data frame
Ar -   Start formatter write (odd/even bit = AFC bit b0) Track A
       buffer #1 3rd data frame
       Start DMA of data frame into buffer #2 4th data frame
       Start checking RAW on Track A data frame buffer #0 2nd
       data frame
Aw -   (Wait for write head to be in sub code area)
       Start formatter RAW read of Track B data frame buffer
       #0 2nd data frame
Br -   Start formatter write (odd/even bit = AFC bit b0) Track
       B buffer #1 3rd data frame
       Start formatter C2 ECC parity generation on buffer #2
       4th data frame
       Start checking RAW on Track B data frame buffer #0
       2nd data frame
Bw -   (Wait for write head to be in sub code area)
       Start formatter RAW read of Track A data frame buffer
       #1 3rd data frame
```

F. An Example of an Append Sequence Showing Formatter Register Commands is shown in Table VIII.

Example 105h 00h W

This would be a write of 00 HEX to formatter register 105h (clear arbitration error) to clear an arbitration error. This would be a register that does not have any distinct bit meanings.

106h 110 0100b E4h

This would be a write of 1110 0100 BINARY (E4h) to formatter register 106h (DMA control register) to top the current DMA operation. This would be a register that does have distinct bit meanings.

10Ch 0100 ∅000b 40/48h W Enable read normal mode Track A into Buffer #2

This would be a write of 0100 0000b BINARY (40H) OR 0100 1000B binary (48h) to formatter register 10Ch (Track control reg 0) to write Track A frame buffer #0, where the absolute frame count for the frame could be either odd or even.

| INITIALIZATION START UP | | | | |
|---|---|---|---|---|
| 106h 1110 01'00b | E4h | W | Stop current DMA operation and setup for next DMA | |
| 103h | 00h | W | Reset DMA pointers and counters | |
| 10Bh 0101 0000b | 50h | W | Stop current ECC operation and setup C1 on-the-fly and C2 initiated when ready | |
| Bh 0111 0000b | 70h | W | Setup ECC C1 on-the-fly and C2 initiated main data Track A | |
| 10Dh 0001 0000b | 10h | W | TRACK normal mode | |
| 10Ch 0000 0000b | 00h | W | TRACK read/write off | |

Wait for signal that the head for Track B write has started . . .

Bw - Start formatter normal read of Track A last frame of group before seam buffer #2
10Ch 1000 0010b 82h W Enable read normal mode Track A into Buffer 2
Ar - Start formatter R/W idle
10Ch 0000 0010b 02h W Idle Read/Write mode
Start DMA of amble frame into buffer #0
(set up 9802A to DMA out memory location 3FFFFh data[00h]5,576 times
106h 1110 1100b ECh W Start current DMA operation buffer #0
(when 9802A's DMA is done)
106h 1010 0100b A4h W Stop current DMA operation and setup for next DMA
102h/103h R Read Track 1 checksum WORD
104H/105H R Read Track 2 checksum WORD
(set up 9802A to DMA out memory location 3FFFFh data[00h] 64 times)
106h 1010 0100b ACh W Start current DMA operation buffer #0
(when 9802A's DMA is done)
106h 1110 0100b E4h W Stop current DMA operation and setup for next DMA
103h 00h W Reset DMA pointers and counters
Aw - (Wait for write head to be in sub code area)
112h ∅1∅∅ ∅∅∅∅b R Read state sequence and wait for bit b6 (in subdata area) = 1

Start formatter normal read of Track B last frame of group before seam buffer #2

| 10Ch 1000 0110b | 86h | W | Enable read normal mode Track B into buffer #2 |
|---|---|---|---|

Check LF-ID and AFC of Track A that was just read buffer #2 Br—Start formatter R/W idle Br - Start formatter R/W idle

| 10Ch 0000 0010b | 02h | W | Idle Read/Write mode |
|---|---|---|---|

Start formatter C2 ECC parity generation on buffer #0

| 10Bh 0111 0000b | 70b | W | Enable C2 ECC on Track A DMA buffer #0 |
|---|---|---|---|
| 10Ah | | R | Clear C2 stopped flag bit |
| (wait for 113 h bit b0 = ECC complete) | | | |
| 10Bh 0111 0010b | 72h | W | Enable C2 ECC on Track B DMA Buffer #0 |
| 10Ah | | R | Clear C2 stopped flag bit |
| 102h | 00h | W | Start C2 ECC |
| Bw - (Wait for write head to be in sub code area) | | | |
| 112h ∅1∅∅ ∅∅∅∅b | | R | Read state sequence and wait for bit b6 (in subdata area) = 1 |

Start formatter normal read of Track A old frame space before seam buffer #2.

| 10Ch 10000 0010b | 82h | W | Enable read normal mode Track A into buffer #2 |
|---|---|---|---|

Check LF-ID and AFC of Track B that was just read buffer #2

Ar - Start formatter write (odd/even bit = AFC bit b0) Track A from buffer #0
10Ch 0100∅000b 40/48h W Enable write normal mode Track A from buffer #0
Start DMA of amble frame into buffer #1
(set up 9802A to DMA out memory location 3FFFFh data[00h]5756 times)
1006h 1110 1101b EDh W Start current DMA operation buffer #1
(when 9802A's DMA is done)
106h 1010 0101b A5h W Stop current DMA operation and setup for next DMA
102h/103h R Read Track 1 checksum WORD
104h/105h R Read Track 2 checksum WORD
(set up 9802A to DMA out memory location 3FFFFh data[00h]64 times)
106h 1010 1101b ADh W Start current DMA operation buffer #1
(when 9802A's DMA is done)
106h 11110 0101b E5h W Stop current DMA operation and setup for next DMA
103h 00h W Reset DMA pointers and counters
Aw - (Wait for write head to be in sub code area)
112h ∅1∅∅ ∅∅∅∅b R Read state sequence and wait for bit b6 (in subdata area) = 1

Start formatter normal read of Track B old frame space before seam buffer #2.

10Ch 1000 0110b 86h W Enable read normal mode Track B into buffer #2
Check LF-ID and AFC of Track A that was just read buffer #2
Br - Start formatter write (odd/even bit = AFC bit b0) Track B buffer #0 1st amble
10Ch 0100 ∅100b 44/4Ch W Enable write normal mode Track B from buffer #0
Start formatter C2 ECC parity generation on buffer #1
10Bh 0111 0000b 70h W Enable C2 ECC on Track A DMA buffer #0
10Ah R Clear C2 stopped flag bit
102h 00h W Start C2 ECC
(Wait for 113h bit b0 = 1 ECC complete)
10Bh 0111 0010b 72h W Enable C2 ECC on Track B DMA buffer #0

```
10Ah                    R   Clear C2 stopped flag bit
102h            00h     W   Start C2 ECC
Bw - (Wait for write head to be in sub code area)
112h 01000 0000b        R   Read state sequence and wait
                            for bit b6 (in subdata area) = 1
```

Start formatter RAW read of Track A amble frame buffer #0 1st amble

```
10Ch 1100 0000b   C0h    W   Enable RAW read normal mode
                             Track A into buffer #0
Ar - Start formatter write (odd/even bit = AFC bit b0)
     Track A from buffer #1 2nd amble
10Ch 0100 0000b   41/49h W   Enable write normal mode Track
                             A from buffer #1
```

Start DMA of data frame into buffer #2 first data frame (set up 9802A to DMA out first data frame from current group 5756 bytes)

```
106h 1110 1101b    EDh    W   Start current DMA operation
                              buffer #1
(when 9802A's DMA is done)
106h 1010 0101b    A5h    W   Stop current DMA operation and
                              setup for next DMA
102h/103h                 R   Read Track 1 checksum
                              WORD
104h/105h                 R   Read Track 2 checksum
                              WORD
(set up 9802A to DMA out memory location 3FFFFh
data[00h]64 times)
106h 1010 1101b    ADh    W   Start current DMA operation
                              buffer #1
(when 9802A's DMA is done)
106h 1110 0101b    E5h    W   Stop current DMA operation and
                              setup for next DMA
103h               00h    W   Reset DMA pointers and
                              counters
Aw - (Wait for write head to be in sub code area)
112h 0100 0000b           R   Read state sequence and wait
                              for bit b6 (in subdata area) = 1
```

Start formatter RAW head read of Track B Amble frame buffer #0 1st amble.

```
10Ch 1100 0100b   C4h    W   Enable RAW read normal
                             mode Track B into buffer #0
Br - Start formatter write (odd/even bit = AFC bit b0)
     Track B buffer #1 2nd amble
10Ch 0100 0101b   45/4Dh W   Enable write normal mode
                             Track B from buffer #1
```

Start formatter C2 ECC parity generation on buffer #2 1st data frame.

```
10Bh 0111 0000b   70h    W   Enable C2 ECC on Track A
                             DMA buffer #2
10Ah                     R   Clear C2 stopped flag bit
102h              00h    W   Start C2 ECC
(Wait for 113h bit b0 = ECC complete)
10Bh 0111 0010b   72h    W   Enable C2 ECC on Track B
                             DMA buffer #2
10Ah                     R   Clear C2 stopped flag bit
102h              00h    W   Start C2 ECC
Bw - (Wait for write head to be in sub code area)
112h 0100 0000b          R   Read state sequence and wait
                             for bit b6 (in subdata area) = 1
```

Start formatter RAW read of Track A amble frame buffer #1 2nd amble

```
10Ch 1100 0001b   C1h    W   Enable RAW read normal
                             mode Track A into buffer #1
Ar - Start formatter write (odd/even bit = AFC bit b0)
     Track A from buffer #2 1st date frame
10Ch 0100 0010b   42/4Ch W   Enable write normal mode
                             Track A from buffer #2
```

Start DMA of amble frame into buffer #0 2nd data frame (set up 9802A to DMA out data frame from current group 5756 bytes)

```
106h 1110 0100b   ECh    W   Start current DMA operation
                             buffer #0
(when 9802A's DMA is done)
106h 1010 0100b   A4h    W   Stop current DMA operation and
                             setup for next DMA
103h              00h    W   Reset DMA pointers and
                             counters
102h/103h                R   Read Track 1 checksum WORD
104h/105h                R   Read Track 2 checksum WORD
Aw - (Wait for write head to be in sub code area)
112h 0100 0000b          R   Read state sequence and wait
                             for bit b6 (in subdata area) = 1
```

Start formatter normal read of Track B amble frame buffer #1 2nd amble

```
10Ch 1100 0101b   C5h    W   Enable RAW read normal mode
                             Track B into buffer #1
Br - Start formatter write (odd/even bit = AFC bit b0) Track B
     buffer #2 1st data frame
10Ch 0100 01100b  46/4Eh W   Enable write normal mode Track
                             B from buffer #2
```

Start formatter C2 ECC parity generation on buffer #0 2nd data frame

```
10Bh 0111 0000b   70h    W   Enable C2 ECC on Track A
                             DMA buffer #0
10Ah                     R   Clear C2 stopped flag bit
102h              00h    W   Start C2 ECC
(Wait for 113h bit b0 = 1 ECC complete)
10Bh 0111 0010b   72h    W   Enable C2 ECC on Track
                             B DMA buffer #0
10Ah                     R   Clear C2 stopped flag bit
102h              00h    W   Start C2 ECC
Bw - (Wait for write head to be in sub code area)
112h 0100 0000b          R   Read state sequence and wait
                             for bit b6 (in subdata area) = 1
```

Start formatter RAW read of Track A amble frame buffer #2 1st data frame

```
10Ch 1100 0010b   C2h    W   Enable RAW read normal mode
                             Track A into buffer #2
107h              00h    W   Clear Bad C1 block counter
```

READ READ/WRITE HEAD AND SOFTWARE SEQUENCE

READ (read operation)

Note that Track 1 is the same as +Azimuth Track and Track 2 is the same as −Azimuth Track.

I. Align Heads to Read position
   A. Start reading frames
      The following is done at the start of each head sweep:
      where:

Ar=Start of A head read
Aw=Start of A head write
Br=Start of B head read
Bw=Start of B head write The repeating sequence is shown in Table VI wherein x is SRAM buffer number 0 or 1.

B. Example of a Read sequence:

Wait for signal that the head for Track B write has started . . .

---

Bw - Start formatter normal read of Track A Buffer #0
Ar - Start formatter R/W idle
Aw - Start formatter normal read of Track B Buffer #0
Br - Start formatter R/W idle
        Do C2 ECC on Track A Buffer #0
***
Bw - Start formatter normal read of Track A Buffer #1
Ar - Start formatter R/W idle
        Do C2 ECC on Track B Buffer #0
        DMA Buffer #0 from SRAM to DRAM
Aw - Start formatter normal read of Track B Buffer #1
Br - Start formatter R/W idle
        Do C2 ECC on Track A Buffer #1
Bw - Start formatter normal read of Track A Buffer #0
        Do C1 ECC on Track B Buffer #1
Ar - Start formatter R/W idle
        Do C2 ECC on Track B Buffer #1
        DMA Buffer #1 from SRAM to DRAM
Aw - Start formatter normal read of Track B Buffer #0
        Do C1 ECC on Track A Buffer #0
Br - Start formatter R/W idle
        Check checksums Buffer #1
        Do C2 ECC on Track A Buffer #0
***

---

We are now in a loop repeating between the ***'s with the buffer being used incrementing through the sequence 0-1.

C. An example of a Read sequence showing formatter register commands is given in Table IX.

Example 105h 00h W

This would be a write of 00 HEX to formatter register 105h (clear arbitration error) to clear an arbitration error. This would be a register that does not have any distinct bit meanings.

106h 1110 0100b E4h W

This would be a write of 1110 0100 BINARY (E4h) to formatter register 106h (DMA control register) to stope the current DMA operation. This would be a register that does have distinct bit meanings.

10Ch 0100 0000b 40/48h W Enable read normal mode Track A

This would be a write of 0100 0000b BINARY (40h) or 0100 1000b BINARY (48h) to formatter register 10 Ch (Track control reg 0) to write Track A frame buffer #0, where the absolute frame count for the frame could be either odd or even.

| Initialization start up | | | | |
|---|---|---|---|---|
| 106h 1110 0000b | E0h | W | Stop current ECC operation and set up C1 on-the-fly and C2 initiated when ready. |
| 10Bh 0111 1000b | 58h | W | Setup ECC C1 on-the-fly and C2 initiated when ready. |
| 10Bh 0111 1000b | 78h | W | Setup ECC C1 on-the-fly and C2 initiated when ready. |
| 10Dh 0001 0000b | 10h | W | TRACK normal mode |
| 10Ch 0000 0000b | 00h | W | TRACK Read/Write Off |
| 107h 0000 0000b | 00h | W | Clear Bad C1 block counter |

Wait for signal that the head for Track B write has started, and then

---

Bw - Start formatter normal read of Track A buffer #0
10Ch 1000 000b    80h    W    Enable read normal mode
                                Track A into Buffer #0
Ar - Start formatter R/W idle
10Ch 0000 0000b   00h    W    Idle read/write mode
Aw - Start formatter normal read of Track B into Buffer #0
        Do C1 ECC on Track A buffer #0
10h 10000 0100b   84h    W    Enable read normal mode
                                Track B into buffer #0
        Do C1 on Track A buffer #0
107h                     R    Bad C1 block counter
107h 0000 0000b   00h    W    Clear Bad C1 block counter
        (when non-zero read buffer #0's Bac D$^1$ block pointers and if pointer is in main data area, do ECC)
        (continue doing C1 ECC until either a nonmain data pointer is found or there are no more pointers)

---

Note that the above operation must complete before the start of the next head.

---

Br - Start formatter R/W idle
10Ch 0000 0000b   00h    W    Idle read/write mode
        Start formatter C2 ECC syndrome generation on Track A buffer #0
10Bh 0111 1000b   78h    W    Enable C2 ECC on Track
                                A DMA buffer #0
102h              00h    W    Start C2 ECC
***
        Do C2 ECC on Track A buffer #0
(Wait for 113h bit b0 = 1 ECC stopped)
113h 0000 0001b          R    Read interrupt register bit b0
                                (C2 stopped flag bit) = 1
(Check for any C2 errors 113h bit b1 = 1C2 stopped status bit)
113h 0000 0010b          R    Read interrupt register bit b1
                                (C2 stopped status bit) = 1
        (if 113h bit 1 = 0 then no C2 errors)
        (if 113h bit 1 = 1 then C2 errors)
(Read C2 block address register)
10Ah                     R    Read C2 block address/and clear
                                C2 stopped bit
(Restart C2 ECC)
102h              00h    W    Start C2 ECC
        (Do C2 correction)
***
Loop between ****'s until there are no more C2 errors.
Bw - Start formatter normal read of Track A buffer #1
10Ch 1000 0001b   81h    W    Enable read normal mode
                                Track A into buffer #1
        Do C1 ECC on Track B buffer #0
107h                     R    Bad C1 block counter
107h 0000 0000b   00h    W    Clear bad C1 block counter
        (When nonzero read buffer #0's Bad C1 block pointers and if pointer is in main date area do ECC)
        (continue doing Ci ECC until either a non main data pointer is found or there are no more pointers)

---

Note that the above operation must complete before the start of the next head.

---

Ar - Start formatter R/W idle
10Ch 0000 0000b   00h    W    Idle Read/Write mode
        Start formatter C2 ECC syndrome generation on Track B buffer #0
10Bh 0111 1010b   7Ah    W    Enable C2 ECC on Track
                                B DMA buffer #0
102h              00h    W    Start C2 ECC
        Do C2 ECC on Track B buffer #0
(Wait for 113h bit b0 = 1 ECC stopped)
113h 0000 0001b          R    Read interrupt register bit b0
                                (C2 stopped flag bit) = 1
(Check for any C2 errors 113h bit b1 = C2 stopped status bit)
113h 0000 0010b          R    Read interrupt register bit b1
                                (C2 stopped status bit) = 1
        (if 113h bit b1 = 0 then no C2 errors)
        (if 113H bit b1 = 1 then C2 errors)

*-continued*

```
(Read C2 block address register)
10Ah                      R    Read C2 block address/and
                               clear C2 stopped bit
(Restart C2 ECC)
102h            00h       W    Start C2 ECC
    (Do C2 correction)
***
    Loop between ***'s until there are no more C2 errors
    DMA buffer #0 from SRAM to DRAM
(Set up 9802A to DMA in data frame into current group 5,756
bytes)
106h 1110 1000b  E8h     W    Start current DMA operation out
                               of buffer #0
Aw - Start formatter normal read of Track B buffer #1
10Ch 1000 0101b  E8h     W    Enable read normal mode
                               Track B into buffer #1
    Do C1 ECC on Track A buffer #1
107h                      R    Bad C1 block counter
107h 0000 0000b  00h     W    Clear bad C1 block counter
    (When nonzero read buffer #1's bad C1 block pointers and if
    pointer is in main data area do ECC)
    (continue doing C1 ECC until either a nonmain data
    pointer is found or there are no more pointers)
```

Note that the above operation must complete before the start of the next head.

```
Br - Start formatter R/W idle
10Ch 0000 0000b  00h     W    Idle Read/Write mode
    Check buffer #0 checksums
(When 9802A's DMA is done)
106h 1110 00001b E1h     W    Stop current DMA operation and
                               setup for buffer #1
102h/103h                R    Read Track 1 checksum WORD
104h/105h                R    Read Track 2 checksum WORD
103h            00h       W    Reset DMA pointers and
                               counters
    Start Formatter C2 ECC syndrome generation on Track A
    buffer #1
10Bh 0111 1000b  78h     W    Enable C2 ECC on Track A
                               DMA buffer #0
102h            00h       W    Start C2 ECC
***
    Do C2 ECC on Track A buffer #1
(Wait for 113h bit b0 = 1 ECC stopped)
113h 0000 0001b           R    Read interrupt register bit b0
                               (C2 stopped flag bit) = 1
(Check for any C2 errors 113h bit b1 = 1 C2 stopped status bit)
113h 0000 0010b           R    Read interrupt register bit b1
                               (C2 stopped status bit) = 1
    (if 113h bit b1 = 0 then no C2 errors)
    (if 113h bit 1 = 1 then C2 errors)
(Read C2 block address register)
10Ah                      R    Read C2 block address/and clear
                               C2 stopped bit
(Restart C2 ECC)
102h            00h       W    Start C2 ECC
    (do C2 correction)
***
    Loop between ***'s until there are no more C2 errors.
Bw - Start formatter normal read of Track A into buffer #0
    Do C1 ECC on Track B buffer #1
107h                      R    Bad C1 block counter
107h 0000 0000b  00h     W    Clear bad C1 block counter
    (When nonzero read buffer #1's bad C1 block pointers and if
    pointer is in main data area do ECC)
    (continue doing C1 ECC until either a nonmain data
    pointer is found or there are no more pointers)
Ar - Start formatter R/W idle
10Ch 0000 0000b  00h     W    Idle Read/Write mode
    Start formatter C2 ECC syndrome generation on Track B
    buffer #1
10Bh 0111 1010b  7Ah     W    Enable C2 ECC on Track
                               B DMA buffer #1
102h            00h       W    Start C2 ECC
***
    Do C2 ECC on Track B buffer #1
(Wait for 113h bit b0 = 1 ECC stopped)
113h 0000 0001b           R    Read interrupt register bit b0
                               (C2 stopped flag bit) = 1
```

*-continued*

```
(Check for any C2 errors 113h bit b1 = C2 stopped status bit)
113h 0000 0010b           R    Read interrupt register bit b
1
                               (C2 stopped status bit) = 1
    (if 113h bit b1 = 0 then no C2 errors)
        (Write buffer #0 into Read_Frame_Ready_FIFO)
    (if 113H bit b1 = 1 then C2 errors)
(Read C2 block address register)
10Ah                      R    Read C2 block address/and clear
                               C2 stopped bit
(Restart C2 ECC)
102h            00h       W    Start C2 ECC
    (Do C2 correction)
***
    Loop between ***'s until there are no more C2 errors
    DMA buffer #1 from SRAM to DRAM
(Set up 9802A to DMA in data frame into current group 5,756
bytes)
106h 1110 1001b  E9h     W    Start current DMA operation out
                               of buffer #1
Aw - Start formatter normal read of Track B buffer #0
10Ch 1000 0100b  E9h     W    Enable read normal mode
                               Track B into buffer #0
    Do C1 ECC on Track A buffer #0
107h                      R    Bad C1 block counter
107h 0000 0000b  00h     W    Clear bad C1 block counter
    (When nonzero read buffer 0's bad C1 block pointers and if
    pointer is in maid data area do ECC)
    (continue doing C1 ECC until either a nonmain data
    pointer is found or there are no more pointers)
```

Note that the above operation must complete before the start of the next head.

```
Br - Start formatter R/W idle
10Ch 0000 0000b  00h     W    Idle Read/Write mode
    Check buffer #1 checksums
(When 9802A's DMA is done)
106h 1110 0000b  E0h     W    Stop current DMA operation and
                               setup for buffer #0
102h/103h                R    Read Track 1 checksum WORD
104h/105h                R    Read Track 2 checksum WORD
103h            00h       W    Reset DMA pointers and
                               counters
    Start Formatter YC2 ECC syndrome generation on
    Track A buffer #0
10Bh 0111 1000b  78h     W    Enable C2 ECC on Track A
                               DMA buffer #0
102h            00h       W    Start C2 ECC
    Do C2 ECC on Track A buffer #1
(Wait for 113h bit b0 = 1 ECC stopped)
113h 0000 0001b           R    Read interrupt register bit b0
                               (C2 stopped flag bit) = 1
(Check for any C2 errors 13h bit b1 = 1 C2 stopped status bit)
113h 0000 0010b           R    Read interrupt register bit b1
                               (C2 stopped status bit) = 1
    (if 113h bit b1 = 0 then no C2 errors)
    (if 113h bit b1 = 1 then C2 errors)
(Read C2 block address register)
10Ah                      R    Read C2 block address/and clear
                               C2 stopped bit
(Restart C2 ECC)
102h            00h       W    Start C2 ECC
*** (do C2 correction)
    loop between ***'s until there are no more C2 errors.
```

We are now in a loop repeating between the ***'s with the buffer being used incrementing through the sequence 0–1.

ERROR CORRECTION

C1/C2 ECC includes hardware for accelerating error correction such as Galois multipliers 218-220 and a square root generator 221.

C1/C2 ECC is implemented in formatter 410 as described above. C3 ECC is implemented on buffer manager 403 as described above.

In summary, all single-bit errors in C1 and C2 blocks are corrected on the fly (in the preferred embodiment up to 50 C1 code blocks and up to 50 C2 code blocks per track). Up to two adjacent missing C1 code blocks can be reconstructed on the fly with single-bit C2 corrections. C3 ECC correction is also invoked on the fly. If on-the-fly correction is not sufficient to make a frame perfect, the tape continues to be read, with the assumption that a good copy of the frame will be found later. If such a copy is not found within 5 frames, a re-position and read retry is performed. Extended error correction is attempted when the block is re-read (causing an additional re-position cycle). Extended error correction corrects to the extent possible with the C1/C2 ECC.

DIAGNOSTICS

Diagnostic write moves logical data from frame buffer 117 to the write channel just as a regular write operation. Simultaneously, the code bits that leave the write channel are captured and written into main data buffer 104 for diagnostic checking.

Diagnostic read accesses raw code bits from main data buffer 104 and transmits them to the read channel. The read channel treats the code bits as regular read data and reads them into frame buffer 117 for diagnostic checking.

CALIBRATION FROM FORMATTER

Formatter 410 can access raw code bits from main data buffer 104 and transmit them to write channel 133. This may be utilized for creating special test, diagnostic, and calibration tapes with formats that deliberately deviate from the DDS standard.

ON-CHIP OSCILLATOR

Returning to FIG. 3, an oscillator 388 (in formatter 310) using an external crystal 389 sets tape transfer data rates independently of the system clock. This allows the data rate to be independent of DAT constraints. Audio DAT runs at 9.408M code bits per second, the present invention allows bit rates over 10M code bits per second (12M code bits per second in this embodiment).

READ/WRITE CHANNEL

Figure 25:
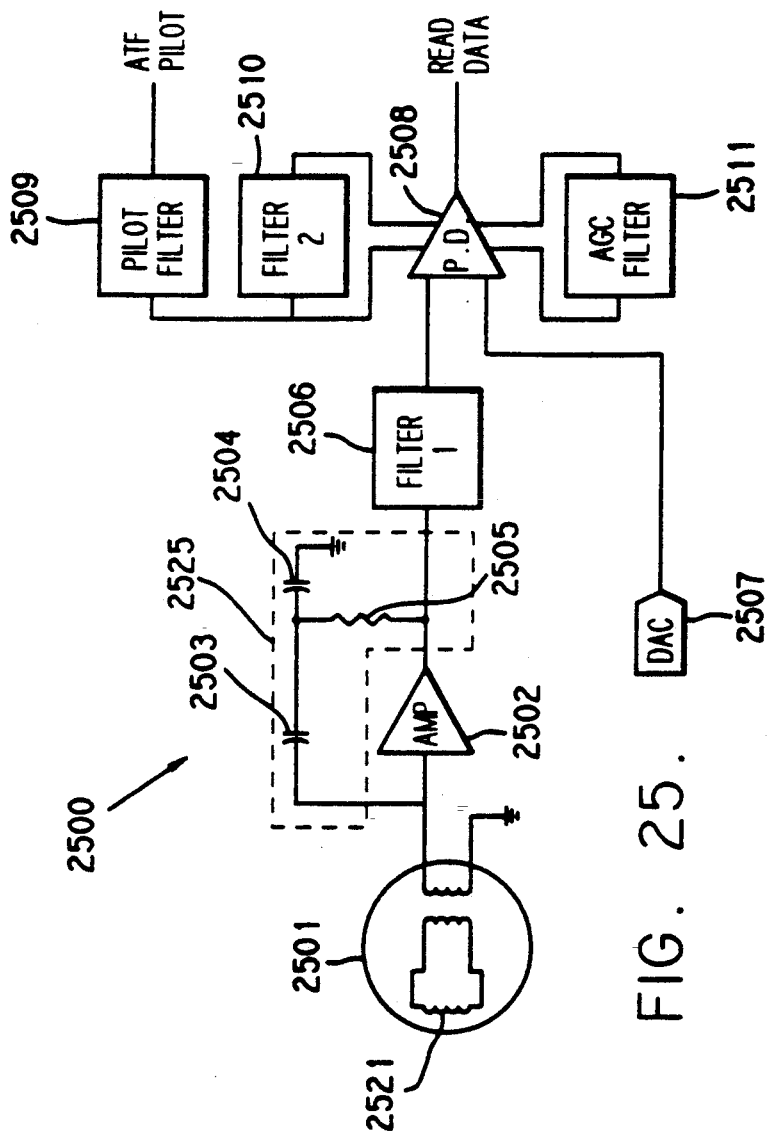
FIG. 25 illustrates a preferred embodiment of a read channel according to the present invention.

FIG. 25 illustrates a preferred embodiment of a read channel 2500 according to the present invention. A head drum 2501 includes an exemplary magnetic head 2521 and a rotary transformer 2522 which is coupled to a preamp 2502. It is understood that a plurality of heads may be included on head drum 2501. In the preferred embodiment, preamp 2502 is a low noise, high bandwidth (30 MHz) preamplifier chip typically used in Winchester disks. FIG. 25 shows only a single-ended channel for simplicity, preamp 2502 in this embodiment is a multichannel chip having differential amplifiers. A feedback circuit 2525 includes a capacitor 2503 coupled to a capacitor 2504 and a resistor 2505. Feedback circuit 2525 allows preamp 2502 to be utilized in a magnetic tape application. Capacitor 2504 and resistor 2505 constitute a low pass filter which limits the bandwidth of the feedback to a range applicable to magnetic tape (12 MHz). Capacitor 2503 provides very low noise feedback damping of the front end resonance (where the resonant network is the inductance of head drum 2501 and the input impedance of preamp 2502). Conventional shunt resistive damping is not applicable to magnetic tape implementation because the thermal noise from the resistor is too high compared to the signal level from a digital magnetic tape head drum. A filter 2506 is coupled to preamp 2502 and provides pulse slimming and low pass filtering. A pulse detector 2508, coupled to filter 2506, provides a differentiating read channel with threshold qualification. In the preferred embodiment, pulse detector 2508 can be a chip used conventionally in Winchester disks. Coupled to pulse detector 2508 is a filter 2510 and a pilot filter 2509. Filter 2506 and filter 2510 allow a Winchester disk pulse detector chip acting as pulse detector 2508 to be utilized for digital audio magnetic tape applications. Filter 2510 is the main equalizer filter. In the preferred embodiment, filter 2510 is a six pole transferal RLC filter. A digital-to-analog converter (DAC) 2507 is coupled to a processor (not shown) and to one input of pulse detector 2508 to transmit read threshold qualification under control of the processor. Different read threshold values are used to compensate for unit-to-unit and head-to-head variations. Pulse detector 2508 includes automatic gain control (AGC) thereby providing a constant read amplitude. An AGC filter 2511 controls the AGC circuits in pulse detector 2508 to compensate for unit-to-unit variations. The response of AGC filter 2511 is slow and is not used to compensate for track head variations within a unit. The combination of AGC, filter design, and processor controlled read threshold eliminates two to four manual adjustments in conventional digital audio tape systems. Pilot filter 2509 is a low pass filter for extracting the ATF pilot signal from the read signal for use by track following circuits.

Figure 26:
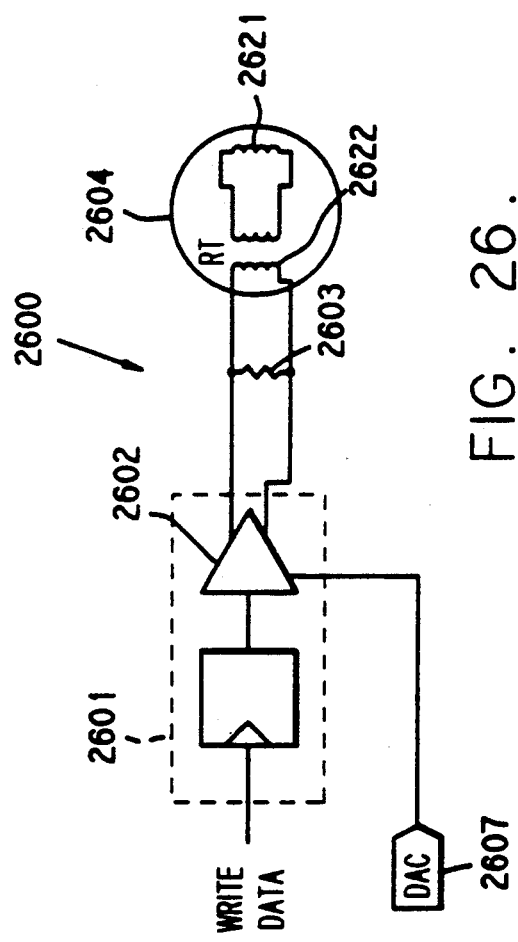
FIG. 26 illustrates a write channel according to a preferred embodiment of the present invention.

FIG. 26 illustrates a write channel 2600 according to a preferred embodiment of the present invention. A head drum 2604 includes an exemplary magnetic head 2621 and a rotary transformer 2622. It is understood that a plurality of heads may also be included on head drum 2604. A write amplifier 2601 is coupled to rotary transformer 2622. In the preferred embodiment, write amplifier 2601 is an amplifier conventionally utilized in Winchester disks. FIG. 26 shows only a single channel for simplicity, but amplifier 2601 is a multichannel chip in the preferred embodiment. A resistor 2603 provides damping of the front end resonance (where the resonant network is the inductance of head drum 2604 and the output impedance of amplifier 2601). A digital-to-analog converter (DAC) 2607 is coupled to a processor (not shown) and to write amplifier 2601, providing different write current values for each of the write heads on head drum 2604. The different write currents provide compensation for unit-to-unit and head-to-head variations. This eliminates two to four manual adjustment pots conventionally used in digital audio tape systems.

Figure 27A:
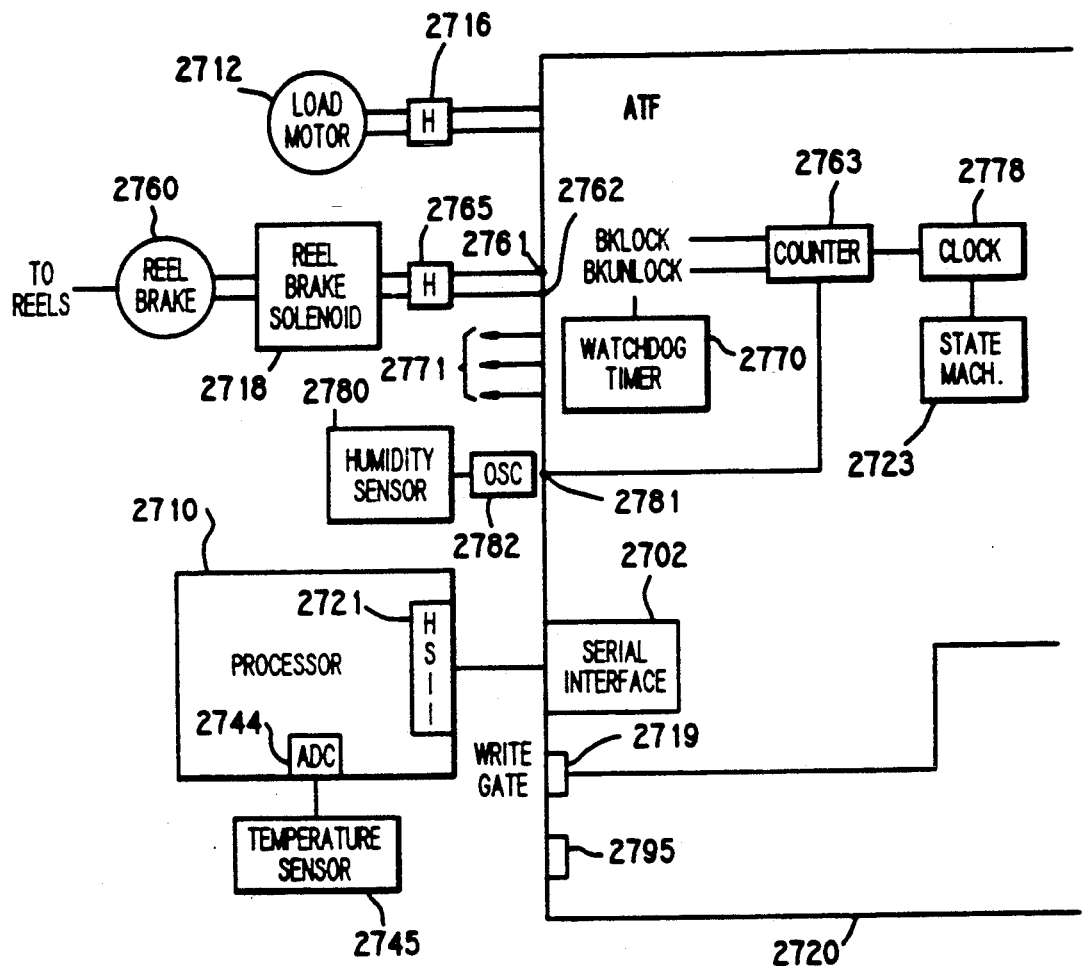
FIGS. 27, 27a, and 27b are a schematic block diagram showing embodiments of various systems according to the present invention.
Figure 27:
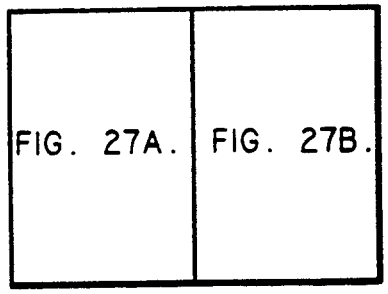
Figure 27B:
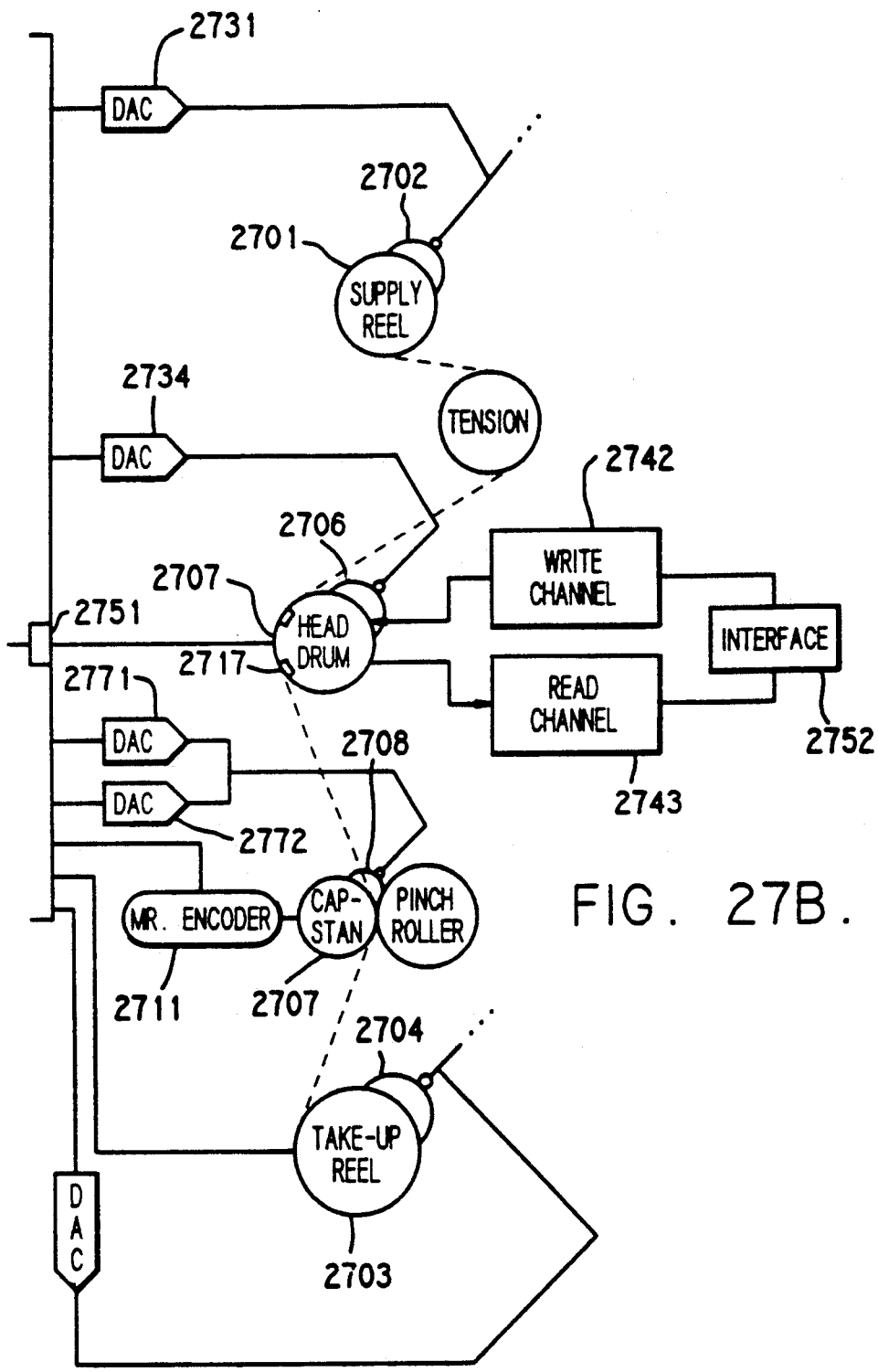

FIG. 27 is a schematic block diagram showing embodiments of various systems according to the present invention, including the reel brake control, humidity sensor, temperature sensor, watchdog timer, counter system, test system, indicator light system, and serial interface.

LOAD MOTOR

A cassette load mechanism (not shown) is powered by a load motor 2712 which is connected to ATF 2720 through an H bridge 2716.

REEL BRAKE SOLENOID CONTROL

In a high performance tape drive, the supply and take-up reels must be controlled to precisely control tape transport. In an embodiment of the invention, the ATF system automatically generates a pulse to apply a reel brake when a reset is asserted or when a watchdog timer times out (see below for details). The external braking system of the present invention may be alternatively controlled to apply or release the reel brake through a high-speed serial interface.

A reel brake 2760 is coupled to a reel brake solenoid 2718 which is driven by an H bridge 2765 which is coupled to ATF 2720. Within ATF 2720 is a counter 2763 coupled to a clock 2778 which is coupled to a state machine 2723. Reel brake 2760 is coupled to supply reel motor 2702 and take-up reel motor 2704 (shown as dotted lines in FIG. 27).

ATF 2720 controls reel brake 2760 by means of bi-stable reel brake solenoid 2718. Reel brake 2760 must be activated at power-down to prevent tape from feeding into the mechanism when control is removed from reel motors 2702 and 2704. Reel brake 2760 must be de-activated at power-up. Reel brake 2760 is activated by applying a voltage across brake solenoid 2718. Once activated, the driving voltage may be removed and solenoid 2718 stays latched in the activated condition. Reel brake 2760 is de-activated by applying a voltage of the opposite polarity across brake solenoid 2718. Once de-activated, the driving voltage may be removed and solenoid 2718 stays latched in the de-activated condition. In practice, it is necessary to remove the driving voltage after a short period in both cases because solenoid 2718 may burn out if the driving voltage is applied continuously for more than 2 or 3 seconds.

ATF 2720 uses a /RESET signal as an indicator of power-down and power-up conditions. When a rising edge is detected on the /RESET signal, BKUNLOCK output 2762 is driven high for 349 msec to unlock reel brake 2760. When a falling edge is detected on the /RESET signal, BKUNLOCK output 2762 is driven high for 349 msec to lock reel brake 2760 before power goes away. BKLOCK and BKUNLOCK signals drive H bridge 2765 (in the preferred embodiment, a pair of power buffers) which drives brake solenoid 2718. The 349 msec time for the BKLOCK pulse is driven by a 22-bit counter 2763 (which comprises a 2-bit scaler and a 20-bit ripple counter in the preferred embodiment). The BKUNLOCK signal is made available in the status register of processor 2710 so the expiration of the unlock period may be determined and reel motors 2702 and 2704 are free to operate. Reel brake solenoid 2718 can also be directly controlled by processor 2710 through bits in a control register primarily for diagnostic use. Reel brake solenoid 2718 is also fired by a watchdog timer 2770 and counter 2763 is also used by a humidity oscillator 2782, both discussed below.

HUMIDITY MEASUREMENT

A humidity sensor 2780 which changes resistance depending on the humidity may be utilized with oscillator circuit 2782 in one embodiment of the invention. The frequency of oscillator 2782 will then change as the humidity changes. A measurement of the frequency of oscillator 2782 then may be converted by processor 2710 to a humidity measurement.

A connection pin 2781 from ATF 320 to humidity sensor 2780 can be coupled to a free-running oscillator (or multi-vibrator) 2782 which is frequency-controlled by humidity sensor 2780. The period between falling edges at pin 2781 is counted by logic in ATF 2720 and the results made available to processor 2710 in the oscillator period register. In the preferred embodiment, this function is achieved using counter 2763. For 349 msec after any reset transition, the ATF logic performs brake solenoid control function. Thereafter, counter 2763 is used as the oscillator timer. Typically, counter 2763 is in a disabled from counting state. To take a sample of the period of humidity oscillator 2782, any value is written to register 3 (see below for detailed descriptions of the registers of ATF 2720). This enables counter 2763, but also forces it to clear. The humidity ready bit in the ATF time MSB register is also cleared. The first falling edge of HUM pin 278 stops clearing counter 2763. Counter 2763 counts until it is disabled by the next falling edge of HUM pin 2781 The humidity bit will be set indicating the sample is available.

Counter 2763 may also be advantageously utilized for any purpose requiring knowledge of the period of an input signal which may vary over a very wide range of frequencies. In one embodiment, a 16-bit ripple counter is used. A free-running clock drives counter 2763. If the clock is 3 MHz, this provides measurements of frequency 46 Hz to 1.5 MHz. The state of counter 2763 may be read by HSI 2721 on processor 2710. A state machine 2723 controls counter 2763 such that when state machine 2723 is reset, the next time a low to high transition occurs on the input signal, counter 2763 is cleared to zero and allowed to begin counting. At the next occurrence of a low to high transition, counter 2763 is stopped and state machine 2723 stays in this state until it is reset and a flag may be set and read over high-speed interface 2702 indicating the state has been reached. If counter 2763 reaches its maximum count, it is stopped, indicating an overflow condition. To determine the period of an input signa, state machine 2723 is reset, then either (1) wait for the count-reached flag or, (2) wait for a time equal to the maximum value of counter 2763 times the period of clock 2778. Next, read the value of counter 2763; this value times the clock period equals the period of the input signal.

TEMPERATURE SENSOR

A temperature sensor 2745 is coupled to processor 910 through an analog-to-digital converter 2744. Temperature sensor 2745 in conjunction with humidity sensor 2780 provides an early warning for dew formation (which can be a serious problem for tape systems).

WATCHDOG TIMER

Watchdog timer 2770 guards against mechanical problems or illegal writes to a user's tape in the case processor 2710 hangs up due to a hardware failure or software bug. If watchdog timer 2770 times out, all motors are turned off, the reel brakes are applied, the write channel is de-activated, the system lights are turned on, and the processor interrupt is activated and a flag set indicating the timeout condition. Watchdog timer 2770 may be disabled by a control flag written through the high-speed serial interface 2702.

When ATF 2720 is running, it must reset watchdog timer 2770 approximately once per 7 msec by writing a 1 to a clear watchdog timer control pulse bit. In the preferred embodiment, the actual watchdog timeout period is 5.5 msec for a 12 MHz chip clock. If watchdog timer 2770 times out, the following procedure is activated: (1) All the DAC channels 2731, 2734, 2771, 2772, 2773 are cleared to 0, thus removing the drive voltage from reel motors 2702 and 2704, head drum motor 2706, and capstan motor 2708. (In this embodiment, this may be achieved by forcing a NDACRST pin low.) (2) Load motor 2712 is stopped (if it is running). (In this embodiment, this can be done by forcing LDMOT-E1 AND LDMOT-E2 pins low.) (3) Reel brake solenoid 2718 is fired to lock reels 2701 and 2703. This can be done by forcing BKLOCK pin 2761 high for 349 msec and BKUNLOCK pin 2762 low. (4) Write channel 2742 is disabled. This can be done by forcing /WR_GATE pin high (see below for details). (5) Three front panel lights 2791 are turned on which can be done by forcing /LED-G, /LED-A, and /LED-Y pins low. (6) Watchdog timer 2770 has its interrupt set.

Watchdog timer 2770 can be disabled by setting the watchdog timer disable control bit. Watchdog timer 2770 is enabled at power-up and may be disabled by software commands at any time by setting the watchdog timer disable bit. Software can recover from a watchdog timeout by clearing or disabling watchdog timer 2770. The watchdog timeout does not cause a system reset. If either of the load motor control bits are active when the timeout condition is cleared, load motor 2712 immediately resumes motion. Because the brake control logic in ATF 2720 interacts with the reset signal and has a long counter, a special test mode is provided in the preferred embodiment. When a NINIT1 input pin is asserted (low), the brake control logic is reset and the 20-bit ripple counter is preset to all ones. The NINIT2 input pin determines to which mode the circuit is set: if NINIT2 is high, the circuit is in braking mode, if NINIT2 is low, the circuit is in humidity oscillator period counter mode. When NINIT1 is released, the pre-scaler counts 4 clocks and then the ripple counter will roll over from max count to 0.

There are output pins to drive a dc motor, for example to drive a tape extraction mechanism. The pins may be set to any state through interface 2702, except the state with both pins active, which is inhibited. This prevents a short circuit when the pins are used to drive an H-bridge type driver.

WRITE GATE

A write gate output pin 2751 can control enabling of write head 2717. A write protect switch 2719 coupled to write gate 275 forces gate 2751 inactive thereby disabling write head 2717. Another input is provided which communicates with other parts of the system to disable write head 2717 through write gate 2751. A write enable control bit is provided in ATF 2720 which may be set or cleared through interface 2702. If this bit is set to disable write, the write gate output is forced inactive. This bit is synchronized to the track clock (see below for further details). Finally, if watchdog timer 2770 times out, write gate 2751 is forced inactive. In all other conditions, write gate 2751 is active.

LED INDICATOR LIGHTS

LED lights 2791 provide visible system indicators. The states can be controlled through interface 2702 except under reset or watchdog timer 2770 times out conditions.

HEAD SELECT, READ/WRITE STATE

Three output pins are provided which are synchronized to a clock provided on a track clock input pin in order to synchronize them to head drum rotation. An internal register is loaded through interface 2702, when a transition occurs on the track clock input pin, the values from the register are clocked into a second register which directly control the three output pins. In one embodiment of the invention, these output pins are used to control the head selects and read/write state for read/write channels 2742, 2743. The synchronization feature allows processor 2710 to set up the desired state of these pins any time during a track, where the state becomes active only at the next track edge. The track clock in the preferred embodiment is generated through HSI 2721 in processor 2710.

GENERAL PURPOSE INPUT/OUTPUT PINS

In the preferred embodiment, five general purpose input pins are provided for attachment to switches and sensors providing flexibility for ATF 2720. The states of the pins may be read through interface 2702. Further, six general purpose output pins are provide. The states of these pins may be controlled through interface 2702. Three general purpose input/output pins are also provided. The direction of each bit may be set through interface 2702. When programmed as outputs, the states may be controlled by interface 2702; when programmed as inputs, the states may be read by interface 2702.

CLOCKING

The master clock for ATF 2720 may be provided by a CMOS level signal or by using an on-chip oscillator with an external crystal.

HIGH-SPEED SERIAL INTERFACE

The utilization of a high-speed serial interface 2702 minimizes pin count, pcb area, and electrical noise by providing complete communications over two signal wires rather than 12 or more wires.

TEST MODES

Grounding a /Tristate pin 2795 causes ATF 2720 to tri-state all of its pins. This facilitates in-circuit ATE test of other components on the board with ATF 2720 since the ATE equipment does not need to overdrive any signals from ATF 2720. Grounding the /Activity pin causes ATF 2720 to connect all its output pins directly to input pins, allowing ATE equipment to easily verify that the correct part is on the board in the proper orientation and that all the pins make contact with their pads. ATE equipment applies stimuli to the input pins (overdriving the normal input sources if necessary) and detecting the appropriate changes on each of the output pins. Thus simple in circuit test (ICT) programs can check all the external chip interconnections and input-/output buffers without knowing anything about the internal circuitry of the chip. Counters may be tested by two dedicated input pins which allow some ripple counters to be preset to an all 1's state. Following this with a stimulus which provides an additional clock to each counter rolls the counters over to the 0 state. This provides testing for stuck-at-1 and stuck-at-0 faults in all bits of these counters.

DIAGNOSTICS

In the preferred embodiment, to facilitate diagnostics of ATF 2720, several diagnostic hooks are provided. All of the writable registers (excepting the DACs, which are not part of ATF 2720 in this embodiment) may be read back. In most cases, processor 2710 should be able to read back the same data that was written (this is not possible, for example, for control pulse bits). Readback is provided for some buried registers (those that normally do not require reading during operation). Processor 2710 can directly control the clocks and read data into ATF LTC 305 (see the description of the control register below for details). Processor 2710 can poll the BKUNLOCK (reel brake solenoid 2718) bit to verify that the brake solenoid timer in counter 2763 is working properly. Further, the brake solenoid timer may be preset to max count to check its overflow count (constituting a thorough test for the preferred embodiment as a ripple counter). The operation of brake solenoid 2718 one-shot can also be checked using this function (see the description of brake solenoid 2718 above for details). Watchdog timer 2770 may be preset to max count by asserting the /ACTIVITY PIN (see the description of watchdog timer 2770 above for details). Watchdog time 2770 also assists in system bring-up and software de-bug since the motors are not allowed to run away if processor 2710 hangs up or breakpoints.

LOAD MOTOR /LED/Seeprom Control Register (Read/Write)

Register contains bits which directly manipulate ATF 120 output pins in order to control load motor 2712 LEDs, and the serial electrically erasable prom.
Bit 7—LDMOT—E2.
Bit 6—LDMOT—E1. Bits 7-6 control the load motor through an H-bridge as follows:

| LDMOT-E2 | LDM0T-E1 | Motor function |
|---|---|---|
| 1 | 1 | Idle |
| 1 | 0 | Move in load direction |
| 0 | 1 | Move in unload direction |
| 0 | 0 | Idle |

Bit 5—Green LED. On generally indicates Power On.
1=LED off.
0=LED on.
Bit 4—Amber LED. On generally indicates drive activity.
1=LED off.
0=LED on.
Bit 3—Yellow LED. On generally indicates that cleaning is required.
1=LED off.
0=LED on.
Bit 2—Serial EEPROM chip select pin.
Bit 1—Serial EEPROM clock pin.
Bit 0—Serial EEPROM data input pin. (The Serial EEPROM data output pin is read back through the Additional Status register.)

HEAD SELECT/Diagnostic Control Register (Read/Write)

Head select/diagnostic control register contains control bits which are used to select the proper head on head drum 2707; it also controls diagnostic mode, which allows processor 110 to simulate ATF timing activity. There are also control bits to set and release reel brake 2760 for diagnostic use. Some of the bits are regular latches, and some are "Control Pulse" bits. for a control pulse bit, writing a 1 to the bit causes an action, while writing a 0 to the bit does nothing. Also, control pulse bits always read back as 0. The bit assignments are as follows:

Bit 7—Head select 1. The value loaded into this bit is output to the HS1 pin at the next transition of TRK_CLK.
Bit 6—Head select 0. The value loaded into this bit is output to the HS0 pin at the next transition of TRK_CLK.
Bit 5—Write enable. The value loaded into this bit is latched at the next transition of TRK_CLK; the latched value is AND'd with the WGEN input pin and the WR_PROT input pin to form the WR_GATE (write gate) output to the read write amplifier. A 1 should be written to this bit to enable a write operation on this next track.
Bit 4—RWCS. The value loaded into this bit is output to the RWCS pin at the next transition of TRK_CLK. A 1 should be written to this bit to enable the read/-write amplifier for either reads or writes of the next track. A 0 should be written to this bit to shut off the read/write amplifier and conserve power.
Bit 3—Set all ones. When this bit is a 1, the ATF algorithm will be looking for all ones area which would be the post amble (1 block long). This bit is set only for the first ATF area.
Bit 2—Diagnostic mode. When this bit is a 1, the main clock into the ATF logic is mapped into bit 0 of this register. (The serial port continues to operate, of course.) Bit 1 can be used to generate clocks under processor control. This bit should be 0 for normal operation.
Bit 1—Diagnostic bit clock. If diagnostic mode is set to 1, then writing a 1 to this bit generates 1 code clock pulse into the ATF tracking logic. This is a control pulse bit.
Bit 0—Diagnostic data. If diagnostic mode is set to 1, then this bit generates one data pulse into the ATF tracking logic. Processor 110 can use this facility to simulate ATF fields for diagnostics. This is a control pulse bit.

INTERRUPT/Status Register (Read/Write)

The interrupt/status register contains all the status bits which can cause interrupts, as well as the most important status bits that need to be read in interrupt service routines. For bits which can cause interrupts, reading a 1 in a bit corresponds to an interrupt condition generated by ATF 120. Most of these bits may be cleared using bits in the main control register. The eject request and cartridge present interrupts are provided to wake up processor 110 if it goes into power down mode when idle. Any write to this register will set the humidity start pulse. The bit assignments are as follows:

Bit 7—ATF sample available interrupt. This bit is set when the leading edge of a sync field is detected, again 60 microseconds later, and again 60 microseconds later. Processor 110 must respond very quickly (within 60 microseconds) to this interrupt and initiate an A-to-D conversion on the ATF pilot signal sample line. Processor 110 should then clear this bit, to be ready for the next interrupt. See section 5 for further explanation. This bit is also set when the ATF input signal is asserted, if the interrupt at start of ATF field bit in the main control register is set. This bit causes an interrupt. It is not maskable; but it may be disabled by turning the ATF tracking function off (by setting the /ATF input high).
Bit 6—Eject request interrupt. This bit is set to a 1 when the eject request bit in the switch status register changes from a 0 to a 1. It is cleared by the processor via the clear eject request interrupt bit in the main control register. Note that this interrupt may occur several times when the eject button is pushed because the switch is not debounced. This bit causes an interrupt. It is not maskable; but it may be disabled by leaving a 1 in the clear eject request interrupt bit in the main control register.

Bit 5—Cartridge present interrupt. This bit is set to a 1 when the cartridge present bit in the switch status register changes from a 0 to a 1. It is cleared by the processor via the clear cartridge present interrupt in the main control register. Note that this interrupt may occur several times when a cartridge is inserted because the switch is not debounced. This bit causes an interrupt. It is not maskable; but it may be disabled by leaving a 1 in the clear cartridge present interrupt bit in the main control register.

Bit 4—Watchdog timer time-out interrupt. This bit is set to a 1 when watchdog timer 2770 has timed out. It is cleared by processor 110 via the clear watchdog control pulse bit in the Capstan Motor/Watchdog control register. This bit causes an interrupt. It is not maskable; but it may be disabled by leaving a 1 in the disable watchdog bit in the Capstan Motor/Watchdog control register.

Bit 3—Serial port error. This bit is set to 1 if ATF120 detects a parity error on a serial port write transfer. (This should never happen unless there is a hardware problem in the system.) This is just a status bit; it can NOT cause an interrupt.

Bit 2—Drum index. This bit is set when a leading edge is detected on the drum index signal. Processor 110 must clear the bit when it wants to search for the next leading edge. Processor 110 uses this bit to identify a drum FG encoder tooth to use for the actual index reference; it then generates an ideal index signal called TRK_CLK (track clock) which is a square wave that has a transition at the ideal beginning of track for each of the heads. This is just a status bit; it can NOT cause an interrupt.

Bit 1—Forward/reverse. Indicates direction of capstan (and tape) motion at last capstan encoder edge. See the capstan quadrature encoder description above for further details. Value indicates forward motion and Value 0 indicates reverse motion. This is just a status bit; it can NOT cause an interrupt. It cannot be set or cleared by processor 110.

Bit 0—Bkunload. Reflects the state of the reel brake unload signal. It is active for 349 milliseconds after reset edge. See the reel brake description above for further details. Value 1 indicates reel brake unload signal active and Value 0 indicates reel brake unload signal inactive. This is just a status bit; it can NOT cause an interrupt.

Switch Status Register

The switch status register reflects the sense of various switches in the mechanism (also the serial EEPROM output pin). This is a transparent buffer; it is not strobed or latched. Note that not all cartridge recognition switches may be physically present in all models of drive. This is a read only register. The bit assignments are as follows:

Bit 7—Write project switch. Value 1 indicates cartridge write protected and value 0 indicates okay to write. Note that when the cartridge is write protected (bit 7=1), the write gate is forced off.

Bit 6—Eject request switch. Value 1 indicates eject request active and value 0 indicates eject request not active.

Bit 5—Cartridge present switch. Value 1 indicates cartridge present and value 0 indicates cartridge not present.

Bit 4—Cartridge recognition hole (4). Value 1 indicates hole open—pre-recorded tape and value 0 indicates hole closed—not pre-recorded.

Bit 3—Cartridge recognition hold (3). Value 1 indicates hole open—wide track and value 0 indicates hole closed—metal powder tape or equivalent, i.e., normal track.

Bit 2—Cartridge recognition hold (2). Value 1 indicates hole open—thin tape and value 2 indicates hole closed—13 microns thick tape. Note that hole 2=1 is not defined for DDS.

Bit 1—Cartridge recognition hold (1). Value 1 indicates hole open—reserved and value 0 indicates hole closed—defined.

Bit 2—Serial EEPROM data output pin.

Note that for DDS, the condition (1)(2)(3)(4)=0010 is defined to designate a cleaning tape. Also, sense switches for holds (1) and (2) are omitted in many DDS drives.

Capstan Motor/Watchdog Control Register

Capstan motor 2708 is directly commutated by processor 110. The capstan motor/watchdog control register contains output bits which directly control the coils of motor 2708. There is one bit that controls each of the three coils of the motor. Writing a 1 to a bit causes current to be sourced into that coil. Writing a 0 to a bit causes current to be sunk from the coil. Normally, one coil should be set to 1 and the other two coils set to 0. Three bits control 12 output pines. An open collector output controls the upper transistor that sources current; three open collector outputs with a complementary value controls the transistor that sinks current. The capstan/motor/watchdog control register also contains output bits to divide down the capstan encoder signal for high speed operation and bits to enable and clear watchdog timer 2770. This is a read/write register. For the capstan motor bits, reading this register returns the actual state of the ATF-120 pin, not the state of the internal register. The clear watchdog bit is a control pulse bit and always reads back as 0.

Bit 7—Clear watchdog. Writing a 1 to this bit clears the watchdog timer 2770. This is a control pulse bit.

Bit 6—Disable watchdog. When this bit is 0, watchdog timer 2770 is enabled. When this bit is 1, watchdog timer 2770 is disabled and has no effect on the system.

| | | | Bit 5 - A coil control. Bit 4 - B coil control. Bit 3 - C coil control. | | | | | |
|---|---|---|---|---|---|---|---|---|
| Bit5 | Bit4 | Bit3 | CU1 | CU2 | CU3 | CU4 | CU5 | CU6 |
| 0 | 0 | 0 | Z | 0 | 0 | Z | 0 | 0 |
| 0 | 0 | 1 | Z | 0 | 0 | 0 | 0 | Z |
| 0 | 1 | 0 | 0 | 0 | Z | 0 | 0 | Z |
| 0 | 1 | 1 | 0 | Z | Z | 0 | 0 | 0 |
| 1 | 0 | 0 | 0 | Z | 0 | 0 | Z | 0 |
| 1 | 0 | 0 | 0 | 0 | 0 | Z | Z | 0 |
| 1 | 1 | 0 | 0 | 0 | 0 | 0 | 0 | 0 |
| 1 | 1 | 1 | 0 | 0 | 0 | 0 | 0 | 0 |

Bit(2–0). Bits 2–0 set a divider for the capstan encoder output as follows:

| CAPDIV—[2..0] | Divider |
|---|---|
| 7 | Disable output |
| 6 | 64 |
| 5 | 32 |
| 4 | 16 |
| 3 | 8 |
| 2 | 4 |
| 1 | 2 |
| 0 | 1 |

Note that when the CAPDIV bits are changed, the selector mux may glitch, causing one or a few false capstan encoder edges.

Additional Control Register (Read/Write)

The additional control register contains output bits which control reel brake 2760, the directions of the reel and drum motors, and the analog mux selects. There is no direction bit for the capstan motor since it is directly commutated via the capstan motor register.

Bit 7—Set reel brake. when this bit is 1, current is driven into reel brake solenoid 2718 to set reel brake 2760. This is provided mainly for diagnostic use, since reel brake 2760 is automatically set when the/RESET pin is asserted.

Bit 6—Release reel brake. When this bit is 1, current is driven into reel brake solenoid 2718 to release reel brake 2760. This is provided mainly for diagnostic use, since reel brake 2760 is automatically released when the /RESET pin is de-asserted.

Note that bits 7 and 6 are both asserted, both side of brake solenoid 2718 are raised to 5 volts and no current flows, so there is no effect on reel brake 2760.

Bit 5—Drum motor direction. Value 1 indicates clockwise and value 0 indicates counterclockwise (the normal direction).

Bit 4—Supply reel motor direction. Value 1 indicates move tape forward and value 0 indicates move tape reverse.

Bit 3—Take-up reel motor direction. Value 1 indicates move tape forward and value 0 indicates move tape reverse.

Bits 2-0—Analog mux select bits. These bits go directly to the three output pins MUX_SC, MUX_SB, and SA respectively. They select the analog signal that is routed to processor 110 as follows:

| Bits [6..4] | Signal selected |
|---|---|
| 7 | +12 V power supply monitor |
| 6 | Read channel level monitor |
| 5 | Temperature sensor |
| 4 | Capstan motor control voltage |
| 3 | Drum motor control voltage |
| 2 | Take-up reel control voltage |
| 1 | Supply reel control voltage |
| 0 | Position error signal from ATF |

Humidity Oscillator Period Counter MSB/LSB

This 16-bit register reflects the value of the period of the humidity sensor oscillator input pin. The value in this register should be incremented by 1 and then multiplied by 333.33 ns to obtain the period of oscillator 2782; i.e.:

| Value | Period | Frequency |
|---|---|---|
| 0×0001 | 667 ns | 1.50 Mhz |
| 0×00FF | 85 us | 11.71 Khz |
| 0×FFFE | 22 ms | 45.55 Hz |

The value 0 is meaningless. The value 0x0000 and humidity ready bit set indicates an overflow condition. Start by writing to register 3 and waiting for humidity ready bit to be set in order to assure a valid result.

Spare IO/Direction Register

The ATF 120 has 3 spare pins which can be used as programmable input/output pins. The direction bits in the Spare I/O register programs the direction for each pin; and the Spare I/O register provides input/output data. The 2 msb's of this register are unused. At power-up, all three pins are set to input mode. The Spare IO direction bits read) and the Spare IO bits reflect the states of the pins. To change a pin to an output function, the processor writes a 1 to the corresponding bit in the Spare IO direction register. The data to be output on the pin is written to the corresponding Spare IO register bit. In either case, reading the Spare IO register always returns the actual state of the spare pins. The Spare IO register is a read/write register. Reading it always returns the actual state of the spare pins for the data bits, and the state of the internal data latches for the direction bits.

| bit 7, bit 6 | Always zero |
|---|---|
| bit 5 | direction for bit 2 |
| bit 4 | direction for bit 1 |
| bit 3 | direction for bit 0 |
| bit 2 | |
| bit 1 | |
| bit 0 | |

ATF timer MSB/LSB

These two byte-wide registers provide read only access to the ATF timer which is used to generate the ATF timing strobes. This is provided for diagnostic purposes. The counter has 11 valid bits:

| LSB | Bit 0-7 | timer bit 0-7 |
|---|---|---|
| MSB | Bit 0-2 | timber bit 8-10 |
| | Bit 3-6 | not used |
| | Bit 7 | humidity ready |

These registers reflect the timer directly, and so the values may be changing when ready by processor 110. Stable values may be obtained by means of the diagnostic mode. See the clocking description below for further details.

3Tch Detection Counters

This register provides read only access to the counters in the ATF logic that detect the presence or absence of 3Tch fields; this is provided for diagnostic purposes. This register reflects the counter directly, and so the values may be changing when read by processor 110. Stable values may be obtained via diagnostic mode. The bit assignments are as follows:

Bits 7 - 5 - Filter counter

-continued

Bit 4 - NL3TCH (latched 3Tch asserted low)
Bit 3 - LAST3TCH
Bits 2 - 0 - Transition period counter

DACS

The 16 DAC registers DAC0/1A-H of the preferred embodiment to not actually reside in ATF-120, but rather in two external octal DAC chips. However, processor 110 writes to these registers just as if they were regular ATF 120 output registers. Note that the encoder offset adjust DACs can also be used to perform an on-line test of the amplitudes of these signals, by adjusting the offsets up and down until the signal disappears. The DACs are write-only registers. The DACs are assigned as follows:

DAC0 A—Take-up reel motor current
DAC0 B—Drum motor current
DAC0 C—Supply reel motor current
DAC0 D—Capstan motor current, fine adjustment (optional)
DAC0 E—Capstan motor current, coarse adjustment
DAC0 F—Capstan encoder offset adjust, A channel
DAC0 G—Capstan encoder offset adjust, B channel
DAC0 H—Write current adjustment
DAC0 I—Unused

Clocking

The preferred embodiment of ATF 120 runs from a master clock running at 12 MHz, which is exactly the code bit rate. System 100 can generate this clock with an internal oscillator and an external 12 MHz crystal. Alternatively, a CMOS-level 12 MHz square wave can drive the oscillator input pin directly. Processor 110 generates a track clock (i.e., ideal index pulse) which ATF 120 receives on the TRK_CLK pin. This signal is approximately a square wave with a transition placed at the beginning-of-track for each head on the drum. The transition is positive for the +azimuth write head.

An embodiment of this invention can be found in Digital Data Tape Storage System Model RB100 manufactured by R-Byte of San Jose, Calif.

While the above description provides a full and complete description of the preferred embodiments of the present invention, various modifications, alternate constructions, and equivalents may be employed while still remaining within the scope of the invention. For example, although a computer is used described as the host unit with a SCSI, any device requiring data storage could be interfaced, e.g., a scientific instrument. Further, although ASICs are used in the preferred embodiments, any means achieving the desired functions are within the scope of the invention. Therefore, the above description and illustrations should not be construed as limiting the scope of the invention which is defined by the following claims.

What is claimed is:

1. A magnetic tape digital data storage (DDS) system comprising:
   interface means for communication with a host unit;
   buffer manager means for managing data to and from said interface means;
   main data buffer means, coupled to said buffer manager means, for buffering data;
   frame buffer means for buffering data in frame format;
   head drum means for reading and writing on magnetic tape, said head drum means including read heads and write heads;
   channel means for channeling data to and from said head drum means;
   a serial bus;
   a formatter bus coupled to said channel means;
   formatter means for formatting and transferring data from said buffer manager means to said frame buffer means and from said frame buffer means to said buffer manager means, said formatter means coupled to said formatter bus so that data from said formatter means is transmitted over said formatter bus to said channel means;
   said formatter means coupled to said serial bus and including oscillator means for selecting any transfer data rate independent of a host unit clock while maintaining compatibility with DDS standard format;
   a digital-to-analog converter, coupled to said serial bus;
   drive means for driving magnetic tape, said drive means coupled to said formatter means by said serial bus through said digital-to-analog converter;
   converter bus means for transmitting analog signals from said drive means to a central processing unit;
   follower means for controlling relative position of said read and write heads with regard to data tracks on magnetic tape, said follower means being coupled to said serial bus, said channel means and said drive means, said read heads providing positioning information to said follower means; and
   said central processing unit coupled to said buffer manager means, said formatter means, said follower means, said drive means, and to said converter bus means.

2. The DDS system of claim 4 wherein said serial bus is a high-speed serial expansion bus means.

3. The DDS system of claim 4 wherein said channel means comprises:
   amplifier means for amplifying data signals from said head drum means, said amplifier means coupled to said formatter bus;
   data separator means for separating clocking information from data, said data separator means coupled to said formatter bus and to said amplifier means; and
   analog channel means for channelling signals between said follower means and said head drum means and for transmitting signals to said central processing unit, said analog channel means coupled to said data separator means, said follower means, and said converter bus means.

4. The DDS system of claim 1 wherein said central processing unit comprises:
   output means for transmitting signals to said formatter means at high speed, said output means coupled to said formatter means;
   input means for receiving signals from said drive means at high speed; and
   analog-to-digital converter means for receiving analog signals from said drive means, said analog-to-digital converter means coupled to said converter bus means.

5. The DDS system of claim 1 wherein said central processing unit further comprises diagnostic port means for interfacing diagnostic equipment.

6. The DDS system of claim 1 wherein said central processing unit further comprises an internal memory and access means for accessing said frame buffer and acting as a scratchpad memory.

7. The DDS system of claim 1 wherein said converter bus means further comprises analog signal conditioner means for conditioning analog signals transmitted to said central processing unit from said drive means.

8. The DDS system of claim 1 wherein said formatter means further comprises:
   formatter internal bus means for providing parallel data paths within said formatter means and to said frame buffer means;
   first error correction code means for providing first and second error correction, said first error correction code means coupled to said formatter internal bus means;
   direct memory access means for providing direct memory access among said frame buffer means, said error correction code means, said buffer manager means and said central processing unit, said direct memory access means coupled to said formatter internal bus means, said buffer manager means, and said central processing unit; and
   coder means for encoding data for transmission to said channel means and for decoding data from said channel means, said coder means coupled to said formatter internal bus means and to said formatter bus.

9. The DDS system of claim 8 wherein said first error correction code means comprises means for correcting single byte first errors on a substantial portion of a track when said drive means is driving magnetic tape.

10. The DDS system of claim 9 wherein said substantial percentage of a track is 38 per cent and less.

11. The DDS system of claim 8 wherein said first error correction code means comprises means for correcting single byte second errors on a substantial portion of a block when said drive means is driving magnetic tape.

12. The DDS system of claim 11 wherein said substantial percentage portion of a block is 44 per cent and less.

13. The DDS system of claim 8 wherein said formatter bus and said formatter internal bus means provide a serial to parallel path from said channel means to said frame buffer means.

14. The DDS system of claim 8 wherein said formatter bus and said formatter internal bus means comprise a parallel to serial path from said frame buffer means to said channel means.

15. The DDS system of claim 8 wherein said serial bus, said formatter bus, said converter bus means, said formatter internal bus means, and said buffer manager bus means all provide loop back capability for diagnostic purposes.

16. The DDS system of claim 1 wherein said buffer manager means comprises:
   buffer manger bus means for transmitting data, said buffer manager bus means coupled to said interface means, said formatter means, and said processor means; and
   an error correction code means for providing error correction, said error correction code means coupled to said buffer manager bus means.

17. The buffer manager means of claim 16 wherein said buffer manager bus means is a high-speed parallel bus.

18. The DDS system of claim 1 further comprising a read-only memory means for providing read-only memory capacity, said read-only memory coupled to said central processing unit.

19. The DDS system of claim 1 wherein said formatter means is an application specific integrated circuit.

20. The DDS system of claim 1 wherein said follower means is an application specific integrated circuit.

21. The DDS system of claim 1 wherein said central processing unit is a single microprocessor.

22. The DDS system of claim 1 wherein said main data buffer means is a dynamic random access memory device.

23. The DDS system of claim 1 wherein said buffer manager means includes an error correction coding means.

24. The DDS system of claim 1 wherein said oscillator means further comprises an external crystal.

25. The DDS system of claim 1, wherein said head drum means comprises:
   a first write head means for writing data to a first track of a first frame;
   a first read head means for reading from a first track of a second frame in order to perform a read-after-write verification of said written data in said first track;
   a second write head means for writing data to a second track of said first frame;
   a second read head means for reading from said second track of said second frame in order to perform a read-after-write verification of said written data in said second track.

26. The head drum means of claim 25 wherein said first and second write heads are disposed at equal relative heights in said head drum means so that said first and second tracks may be written an equal distance apart when magnetic tape is moving at a constant rate past said head drum means in a helical wrap.

27. The DDS system of claim 1 further comprising a memory means for storing non-volatile information.

28. The DDS system of claim 27 wherein said non-volatile information comprises a new-head-became-operational-field for storing head-life-time of said head drum means.

29. The DDS system of claim 27 wherein said non-volatile information comprises a time-the-head-was-cleaned-field for storing power-on-time-value-at-the-end-of-a-head-clean-cycle on said head drum means.

30. The DDS system of claim 29 further comprising counter means for counting how many times said head drum means has been cleaned.

31. The DDS system of claim 27 wherein said non-volatile information comprises a power-on-time-field for storing how long said DDS system has been powered on.

32. The DDS system of claim 31 further comprising at least one counter means for counting power-on-time, said at least one counter means being coupled to said memory means.

33. The DDS system of claim 27 wherein said non-volatile information comprises a head-life-time-field for storing how long said DDS system has been spinning said head drum means.

34. The DDS system of claim 33 further comprising at least one counter means for counting head-lifetime, said at least one counter means being coupled to said memory means.

35. The DDS of claim 27 wherein said non-volatile information comprises a number-of-load/unload-cycles-field for storing how many cassette ejects occur in said DDS system.

36. The DDS system of claim 35 further comprising counter means for counting how many cassette ejects occur in said DDS system.

37. The DDS system of claim 27 wherein said non-volatile information comprises a manufacturing-system-tests field, said manufacturing-system-tests field having a bit assigned for each of a plurality of manufacturing system tests.

38. The DDS system of claim 37 wherein said manufacturing-system-tests field includes a drive serial number.

39. The DDS system of claim 37 wherein said manufacturing-system-tests field includes a drive revision number.

40. The DDS system of claim 37 wherein said manufacturing-system-tests field includes a last-critical-error-number, said last-critical-error-number representing a last detected critical error detected by said DDS system.

41. The DDS system of claim 37 wherein said manufacturing-system-tests field includes a time-final-test-complete field that has local time of day of completion of all of said plurality of manufacturing system tests.

42. The DDS system of claim 37 wherein said manufacturing-system-tests field includes a date-final-test-complete field that has local date of completion of all of said plurality of manufacturing system tests.

43. The DDS system of claim 37 wherein said manufacturing-system-tests field includes a manufacturing-power-on-time field that has how long said DDS system was powered on during said plurality of manufacturing system tests.

44. The DDS system of claim 37 wherein said manufacturing-system-tests field includes a power-on-cycles field that has an incrementing count of how many times said DDS system has been operationally turned on.

45. The DDS system of claim 37 wherein said manufacturing-system-tests field includes a maximum-humidity-field, said maximum-humidity-field storing a largest sensed humidity value.

46. The DDS system of claim 37 wherein said manufacturing-system-tests field includes an electrically erasable programmable read only memory (EEPROM) checksum field that has a summation of said plurality of manufacturing system tests.

* * * * *